(12) United States Patent
Sengupta et al.

(10) Patent No.: US 12,634,952 B2
(45) Date of Patent: May 19, 2026

(54) ENHANCED OUTER CODING FOR BROADCAST COMMUNICATIONS

(71) Applicant: QUALCOMM Incorporated, San Diego, CA (US)

(72) Inventors: Ayan Sengupta, San Diego, CA (US); Alberto Rico Alvarino, San Diego, CA (US); Javier Rodriguez Fernandez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 18/467,299

(22) Filed: Sep. 14, 2023

(65) Prior Publication Data

US 2025/0097954 A1 Mar. 20, 2025

(51) Int. Cl.
| | |
|---|---|
| *H04W 72/23* | (2023.01) |
| *H04W 72/04* | (2023.01) |
| *H04W 72/0446* | (2023.01) |
| *H04W 72/231* | (2023.01) |
| *H04W 72/30* | (2023.01) |
| *H04W 80/02* | (2009.01) |

(52) U.S. Cl.
CPC ..... *H04W 72/231* (2023.01); *H04W 72/0446* (2013.01); *H04W 72/30* (2023.01); *H04W 80/02* (2013.01)

(58) Field of Classification Search
CPC .............. H04W 72/231; H04W 72/30; H04W 72/0446
See application file for complete search history.

(56) References Cited

U.S. PATENT DOCUMENTS

| | | | |
|---|---|---|---|
| 9,246,514 B2 * | 1/2016 | Callard | H03M 13/6525 |
| 2007/0140164 A1 * | 6/2007 | Zeng | H04L 1/0065 |
| 2007/0297319 A1 * | 12/2007 | Roberts | H04N 7/17318 |

(Continued)

FOREIGN PATENT DOCUMENTS

WO WO-2021248405 A1 12/2021

OTHER PUBLICATIONS

International Search Report and Written Opinion—PCT/US2024/043175—ISA/EPO—Dec. 2, 2024.

(Continued)

*Primary Examiner* — Ronald B Abelson
(74) *Attorney, Agent, or Firm* — Paul M. McAdams; Holland & Hart LLP

(57) ABSTRACT

Methods, systems, and devices for wireless communication are described. In some aspects, a network entity may encode, at an application layer, multiple internet protocol (IP) packets with an application level outer code to generate outer encoded IP packets. In such aspects, the network entity may generate, for each of the outer encoded IP packets, a medium access control (MAC) packet data unit (PDU) at a MAC layer. In one aspect, the network entity may map each MAC PDU to a respective code block of a single transport block (TB) and broadcast the TB. Alternatively, the network entity may map each MAC PDU to a single codeblock of a respective TB and broadcast the TB via a single time slot. In some other aspects, the network entity may perform physical or MAC layer outer encoding on the IP packets, where the network entity may perform outer encoding on multiple MAC PDUs.

28 Claims, 24 Drawing Sheets

(56) References Cited

U.S. PATENT DOCUMENTS

| | | | | |
|---|---|---|---|---|
| 2011/0051599 A1* | 3/2011 | Tanigawa | .................. | H04L 1/04 |
| 2011/0216814 A1* | 9/2011 | Browning | ........... | H04L 27/2623 |
| 2012/0121023 A1* | 5/2012 | Antia | ........................ | H04N 7/20 |
| 2012/0230240 A1* | 9/2012 | Nebat | ................... | H04L 12/189 |
| 2014/0098761 A1* | 4/2014 | Lee | ...................... | H04L 5/0053 |
| 2015/0156669 A1* | 6/2015 | Quan | ................... | H04L 1/1838 |
| 2017/0251341 A1* | 8/2017 | Frost | .................... | H04W 72/30 |
| 2021/0135787 A1* | 5/2021 | Sengupta | ............. | H04L 5/0082 |
| 2022/0159785 A1* | 5/2022 | Foukas | ................ | H04W 24/02 |
| 2023/0232451 A1* | 7/2023 | Soleymani | ........ | H04W 74/0808 |

OTHER PUBLICATIONS

Stockhammer T., et al., "Application Layer Forward Error Correction for Mobile Multimedia Broadcasting", Handbook V2.0, 3rd Generation Partnership Project (3GPP), Mobile Competence Centre, 650, Route Des Lucioles, F-06921 Sophia-Antipolis Cedex, France, Jun. 25, 2017, pp. 1-32, XP051310505, section II.

* cited by examiner

Protocol Stack 205
Application-Layer
Packet 210
| H | SDAP SDU 215 |
| H | PDCP SDU 220 |
| H | RLC SDU 225 |
| H | MAC SDU 230 |
MAC PDU 235
Network
Entity
105-a
240
Network
Entity
105-b
 TBs
FIG. 2

FIG. 3

| TB 405-a | TB 405-b | ● ● ● | TB 405-n |
|---|---|---|---|

410-a     410-b     410-n

| TB CRC Attachment | TB CRC Attachment | ● ● ● | TB CRC Attachment |
|---|---|---|---|

415-a     415-b     415-n

| Codeblock Segmentation and CRC Attachment | Codeblock Segmentation and CRC Attachment | ● ● ● | Codeblock Segmentation and CRC Attachment |
|---|---|---|---|

420-a     420-b     420-n

| Channel Coding | Channel Coding | ● ● ● | Channel Coding |
|---|---|---|---|

425

| Rate Matching | Rate Matching | ● ● ● | Rate Matching |
|---|---|---|---|

| Codeblock Concatentation | Codeblock Concatentation | ● ● ● | Codeblock Concatentation |
|---|---|---|---|

430

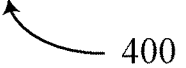

Network
Entity

Transceiver

1210

Antenna

1215

Communications
Manager

1220

Memory

Code

1230

1225

1240

Processor

1235

1205

1200

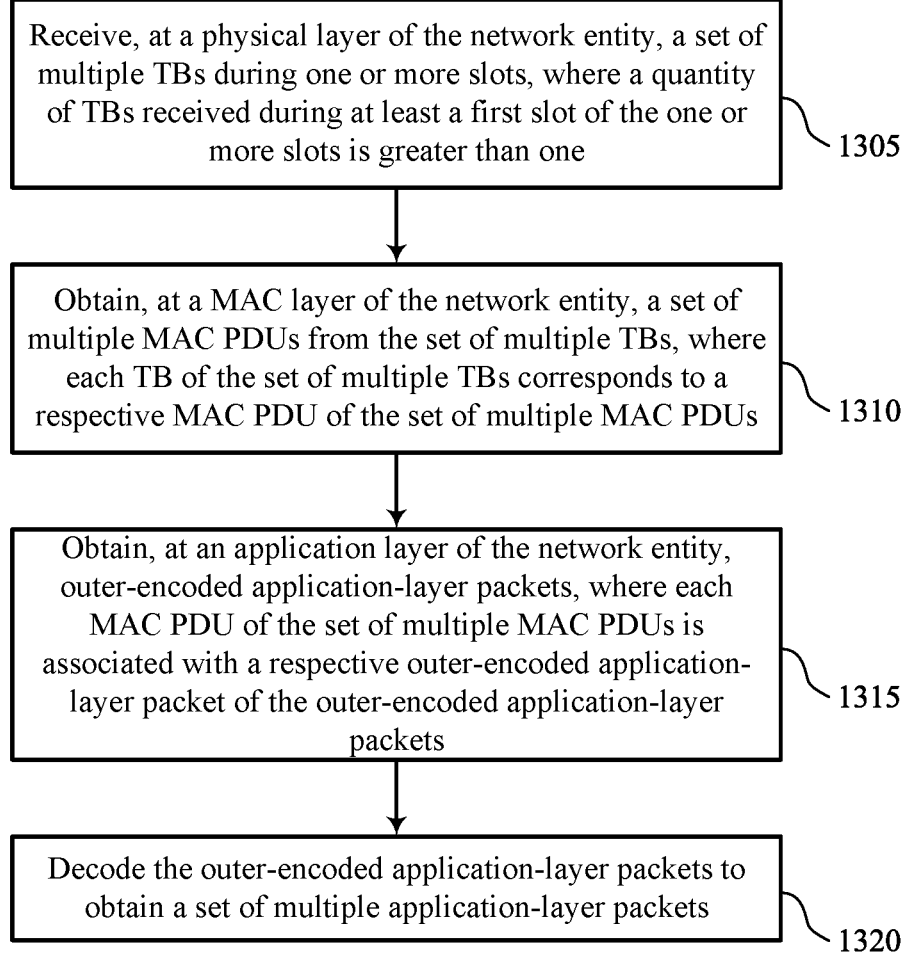

Receive, at a physical layer of the network entity, a set of multiple TBs during one or more slots, where a quantity of TBs received during at least a first slot of the one or more slots is greater than one

1305

Obtain, at a MAC layer of the network entity, a set of multiple MAC PDUs from the set of multiple TBs, where each TB of the set of multiple TBs corresponds to a respective MAC PDU of the set of multiple MAC PDUs

1310

Obtain, at an application layer of the network entity, outer-encoded application-layer packets, where each MAC PDU of the set of multiple MAC PDUs is associated with a respective outer-encoded application-layer packet of the outer-encoded application-layer packets

1315

Decode the outer-encoded application-layer packets to obtain a set of multiple application-layer packets

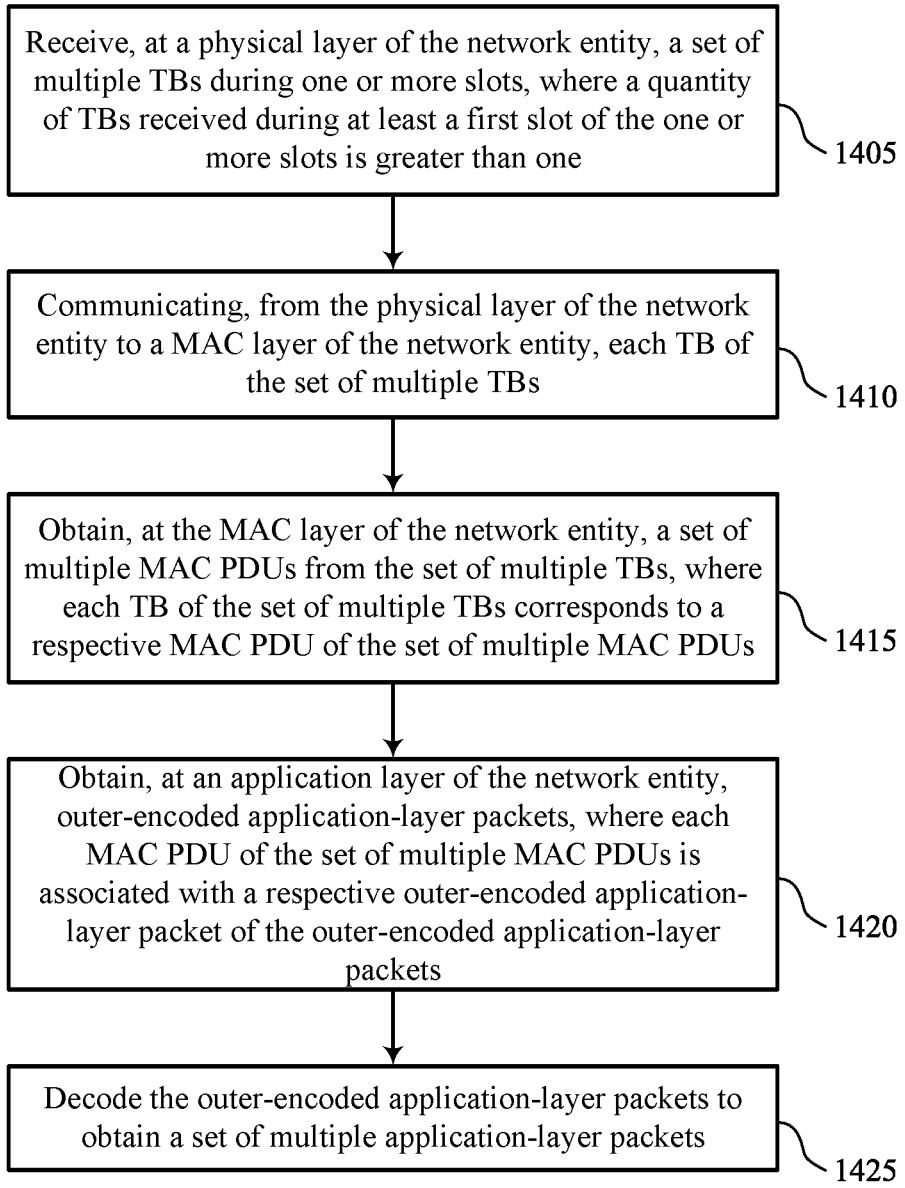

Receive, at a physical layer of the network entity, a set of multiple TBs during one or more slots, where a quantity of TBs received during at least a first slot of the one or more slots is greater than one

1405

Communicating, from the physical layer of the network entity to a MAC layer of the network entity, each TB of the set of multiple TBs

1410

Obtain, at the MAC layer of the network entity, a set of multiple MAC PDUs from the set of multiple TBs, where each TB of the set of multiple TBs corresponds to a respective MAC PDU of the set of multiple MAC PDUs

1415

Obtain, at an application layer of the network entity, outer-encoded application-layer packets, where each MAC PDU of the set of multiple MAC PDUs is associated with a respective outer-encoded application-layer packet of the outer-encoded application-layer packets

1420

Decode the outer-encoded application-layer packets to obtain a set of multiple application-layer packets

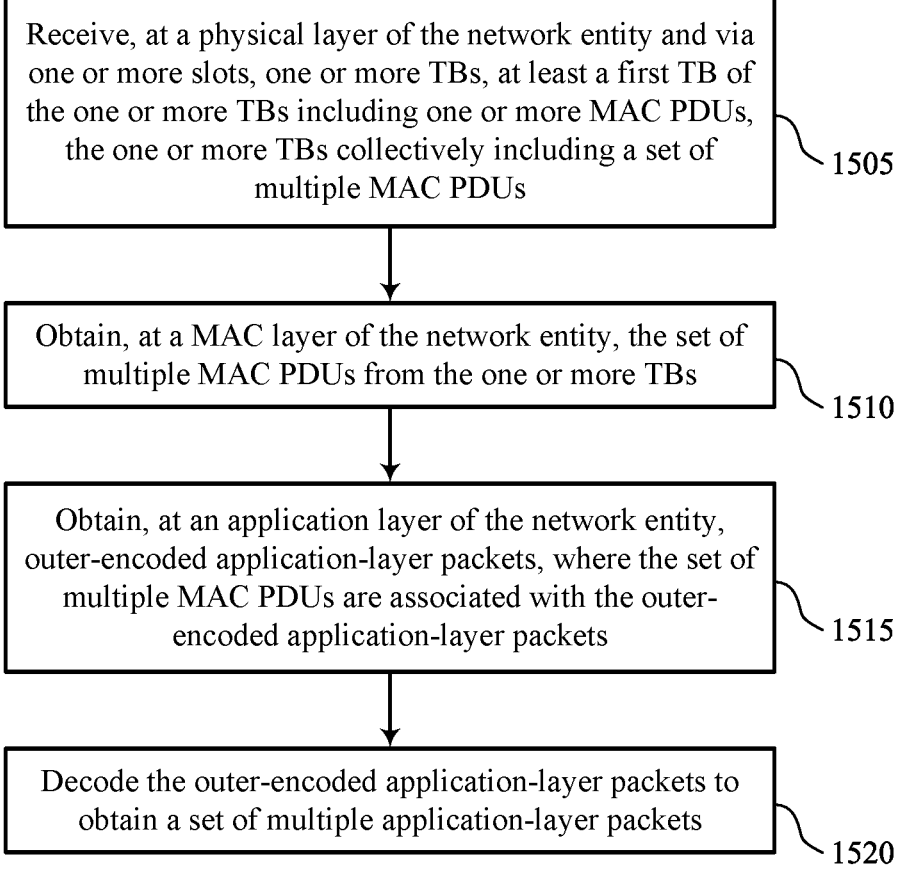

Receive, at a physical layer of the network entity and via one or more slots, one or more TBs, at least a first TB of the one or more TBs including one or more MAC PDUs, the one or more TBs collectively including a set of multiple MAC PDUs ⟍ 1505

Obtain, at a MAC layer of the network entity, the set of multiple MAC PDUs from the one or more TBs ⟍ 1510

Obtain, at an application layer of the network entity, outer-encoded application-layer packets, where the set of multiple MAC PDUs are associated with the outer-encoded application-layer packets ⟍ 1515

Decode the outer-encoded application-layer packets to obtain a set of multiple application-layer packets ⟍ 1520

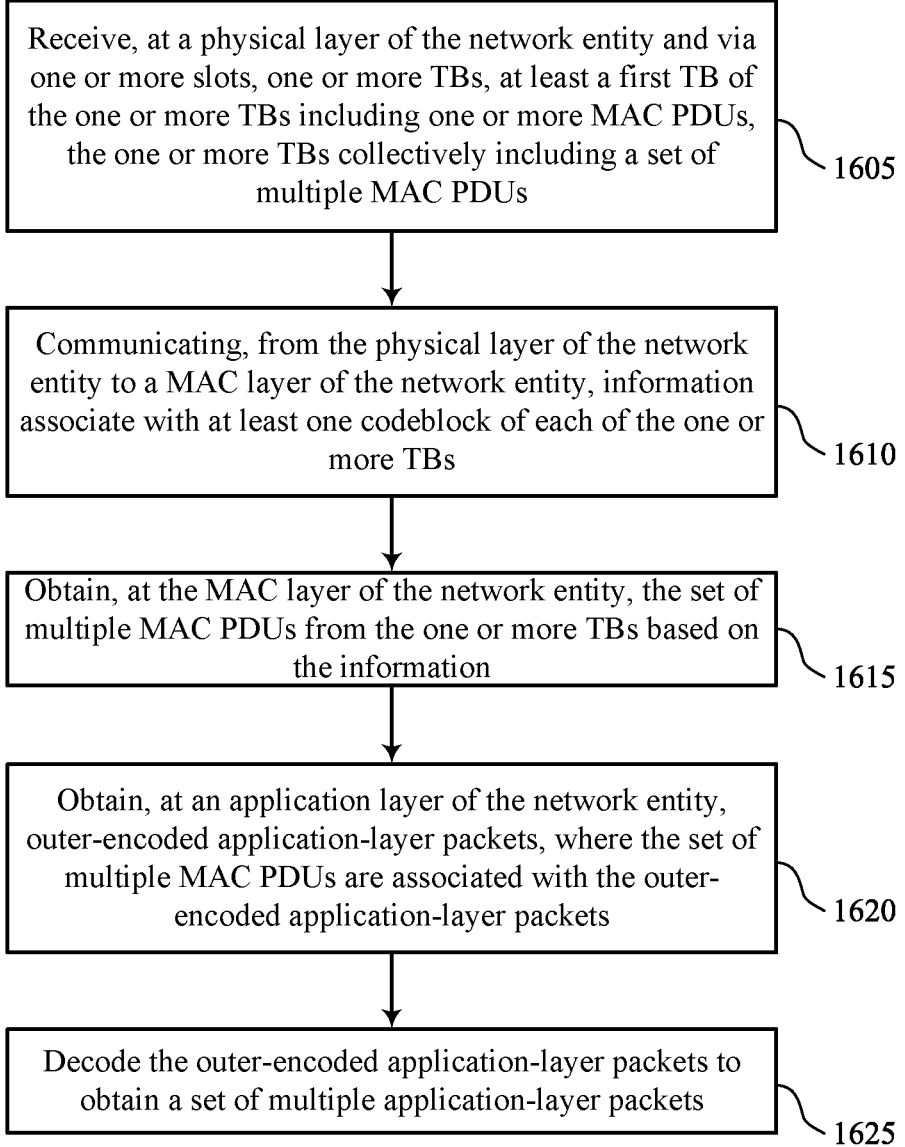

Receive, at a physical layer of the network entity and via one or more slots, one or more TBs, at least a first TB of the one or more TBs including one or more MAC PDUs, the one or more TBs collectively including a set of multiple MAC PDUs

1605

Communicating, from the physical layer of the network entity to a MAC layer of the network entity, information associate with at least one codeblock of each of the one or more TBs

1610

Obtain, at the MAC layer of the network entity, the set of multiple MAC PDUs from the one or more TBs based on the information

1615

Obtain, at an application layer of the network entity, outer-encoded application-layer packets, where the set of multiple MAC PDUs are associated with the outer-encoded application-layer packets

1620

Decode the outer-encoded application-layer packets to obtain a set of multiple application-layer packets

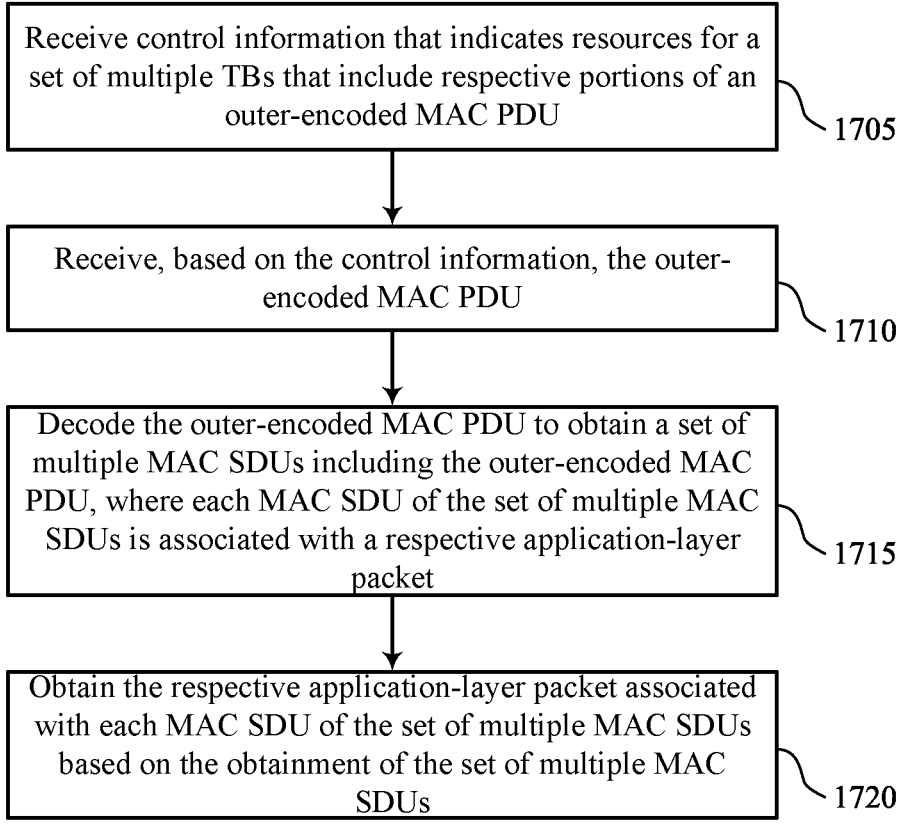

Receive control information that indicates resources for a set of multiple TBs that include respective portions of an outer-encoded MAC PDU

1705

Receive, based on the control information, the outer-encoded MAC PDU

1710

Decode the outer-encoded MAC PDU to obtain a set of multiple MAC SDUs including the outer-encoded MAC PDU, where each MAC SDU of the set of multiple MAC SDUs is associated with a respective application-layer packet

1715

Obtain the respective application-layer packet associated with each MAC SDU of the set of multiple MAC SDUs based on the obtainment of the set of multiple MAC SDUs

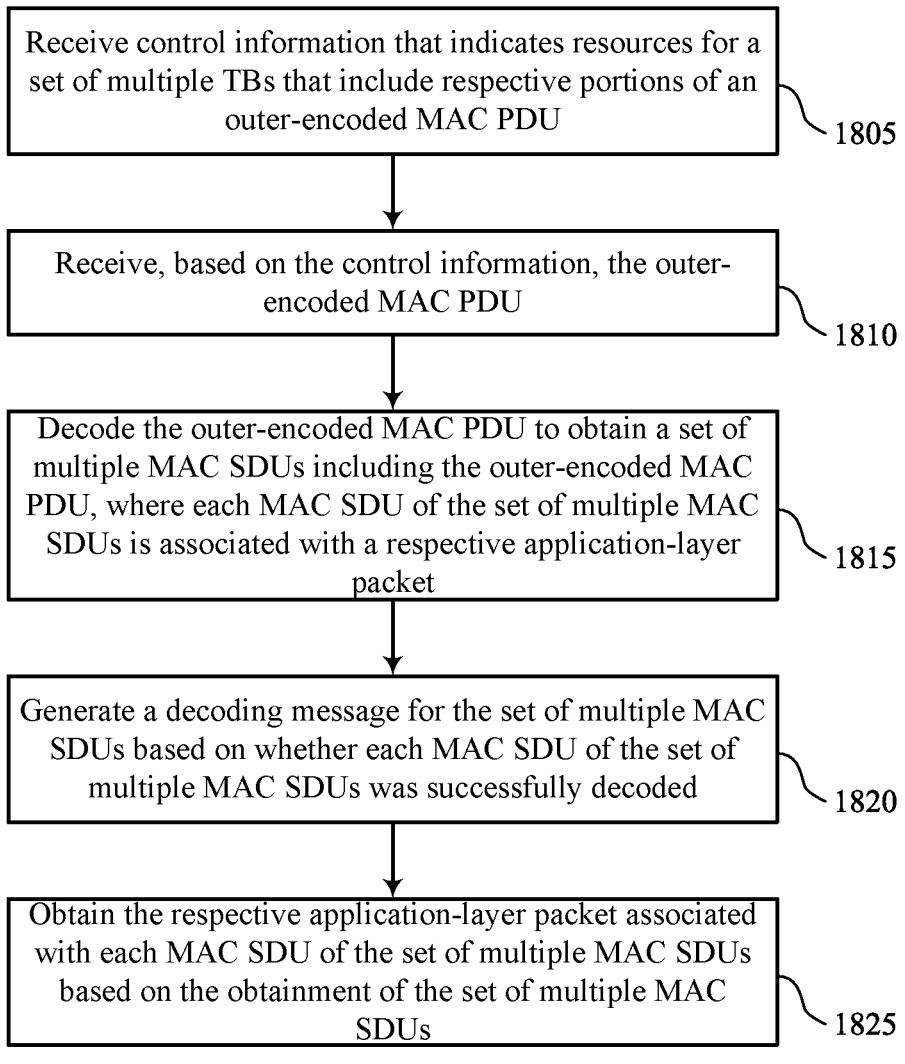

Receive control information that indicates resources for a set of multiple TBs that include respective portions of an outer-encoded MAC PDU

1805

Receive, based on the control information, the outer-encoded MAC PDU

1810

Decode the outer-encoded MAC PDU to obtain a set of multiple MAC SDUs including the outer-encoded MAC PDU, where each MAC SDU of the set of multiple MAC SDUs is associated with a respective application-layer packet

1815

Generate a decoding message for the set of multiple MAC SDUs based on whether each MAC SDU of the set of multiple MAC SDUs was successfully decoded

1820

Obtain the respective application-layer packet associated with each MAC SDU of the set of multiple MAC SDUs based on the obtainment of the set of multiple MAC SDUs

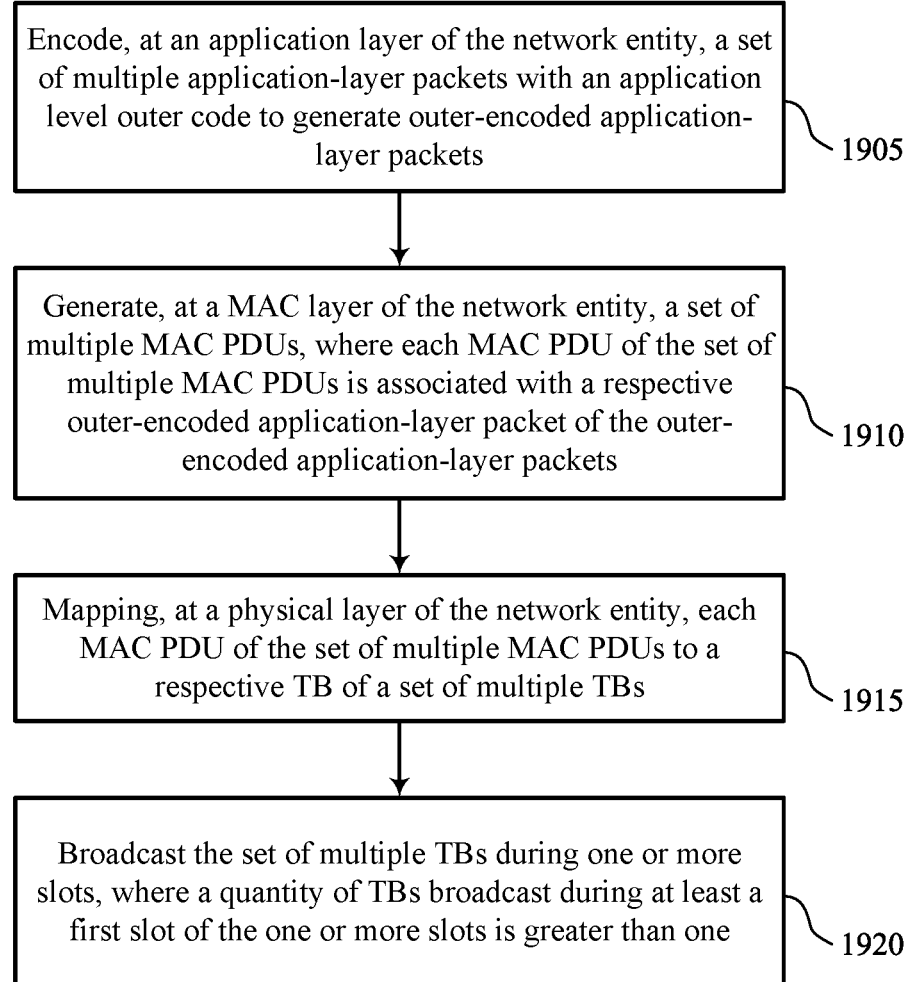

Encode, at an application layer of the network entity, a set of multiple application-layer packets with an application level outer code to generate outer-encoded application-layer packets ⟍ 1905

Generate, at a MAC layer of the network entity, a set of multiple MAC PDUs, where each MAC PDU of the set of multiple MAC PDUs is associated with a respective outer-encoded application-layer packet of the outer-encoded application-layer packets ⟍ 1910

Mapping, at a physical layer of the network entity, each MAC PDU of the set of multiple MAC PDUs to a respective TB of a set of multiple TBs ⟍ 1915

Broadcast the set of multiple TBs during one or more slots, where a quantity of TBs broadcast during at least a first slot of the one or more slots is greater than one ⟍ 1920

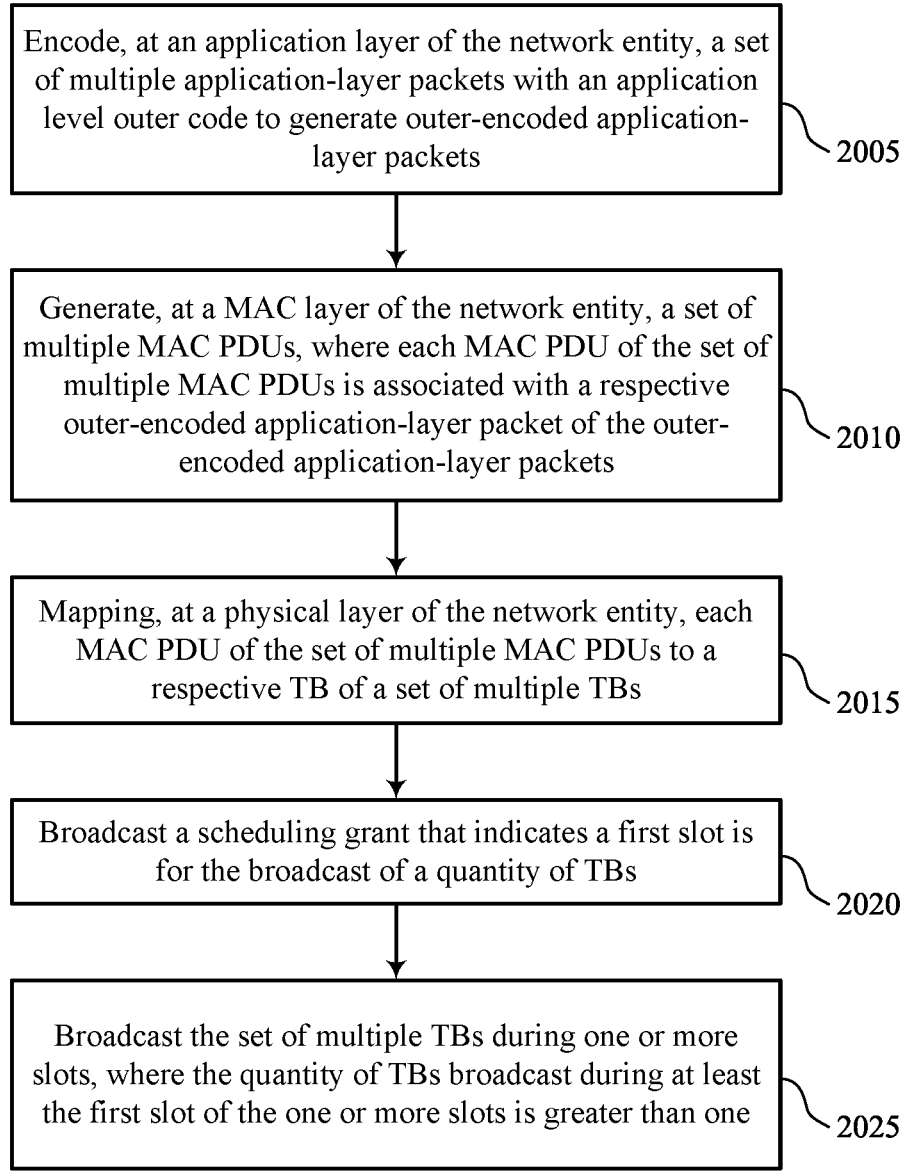

Encode, at an application layer of the network entity, a set of multiple application-layer packets with an application level outer code to generate outer-encoded application-layer packets

2005

Generate, at a MAC layer of the network entity, a set of multiple MAC PDUs, where each MAC PDU of the set of multiple MAC PDUs is associated with a respective outer-encoded application-layer packet of the outer-encoded application-layer packets

2010

Mapping, at a physical layer of the network entity, each MAC PDU of the set of multiple MAC PDUs to a respective TB of a set of multiple TBs

2015

Broadcast a scheduling grant that indicates a first slot is for the broadcast of a quantity of TBs

2020

Broadcast the set of multiple TBs during one or more slots, where the quantity of TBs broadcast during at least the first slot of the one or more slots is greater than one

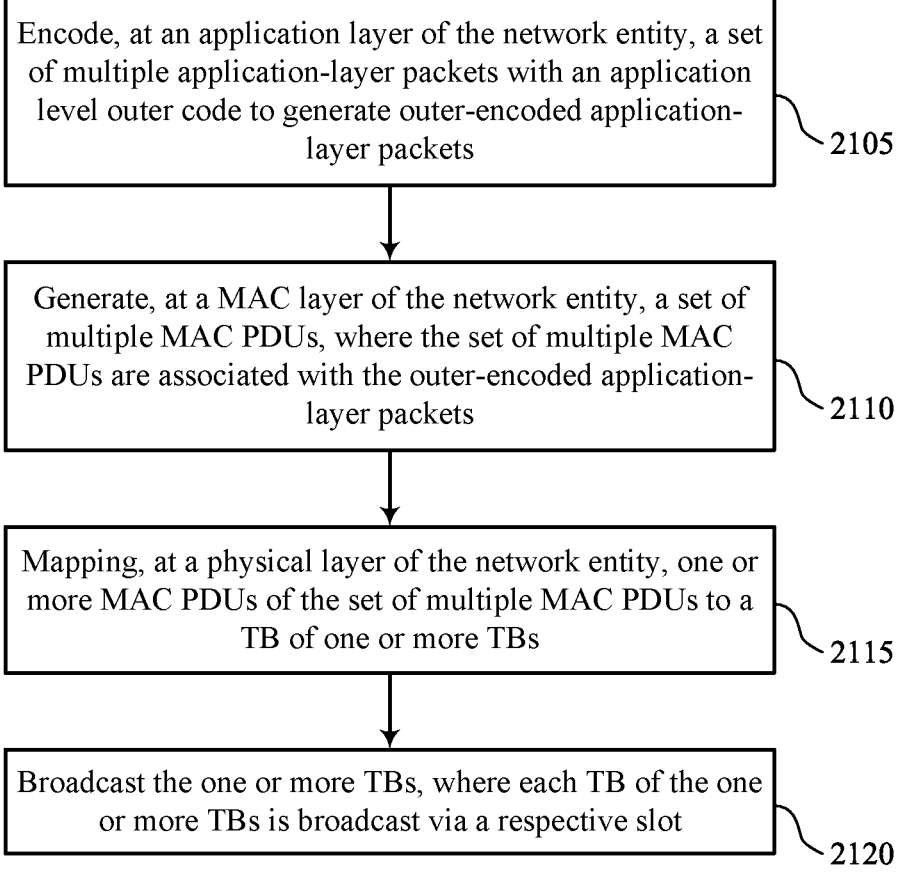

Encode, at an application layer of the network entity, a set of multiple application-layer packets with an application level outer code to generate outer-encoded application-layer packets ⟍2105

Generate, at a MAC layer of the network entity, a set of multiple MAC PDUs, where the set of multiple MAC PDUs are associated with the outer-encoded application-layer packets ⟍2110

Mapping, at a physical layer of the network entity, one or more MAC PDUs of the set of multiple MAC PDUs to a TB of one or more TBs ⟍2115

Broadcast the one or more TBs, where each TB of the one or more TBs is broadcast via a respective slot ⟍2120

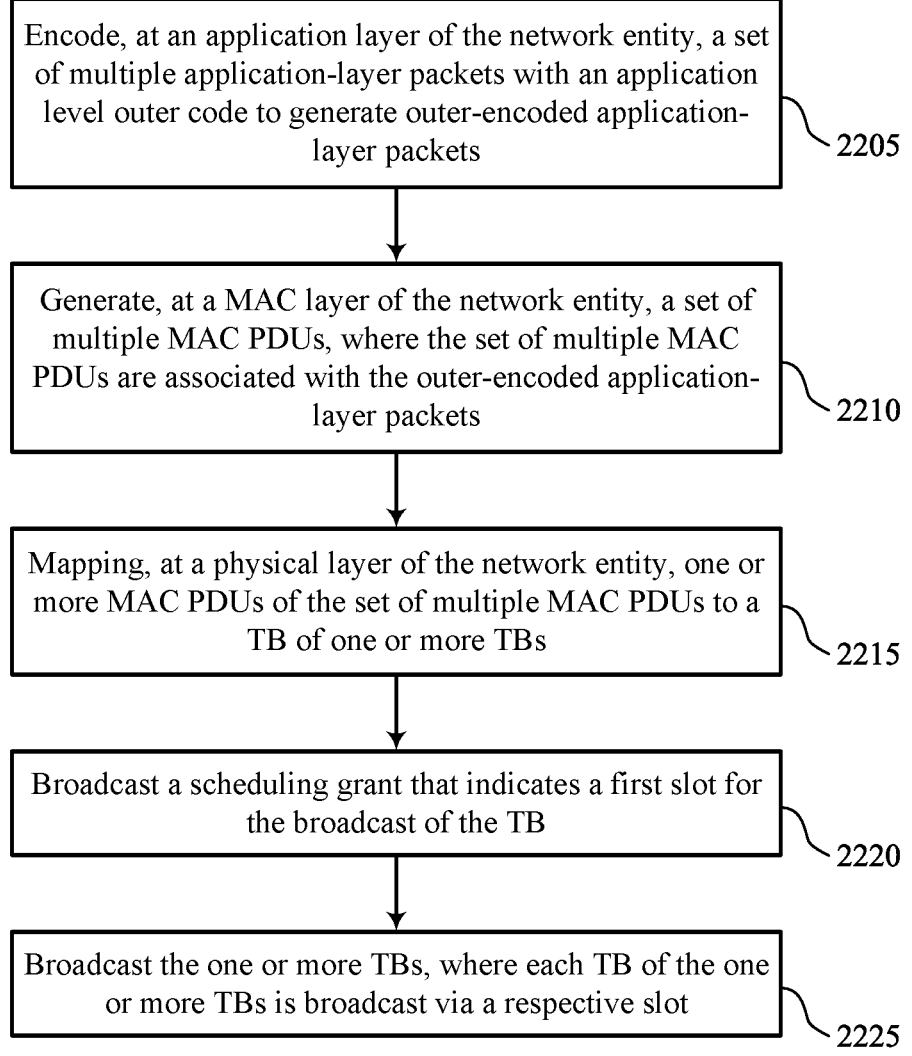

Encode, at an application layer of the network entity, a set of multiple application-layer packets with an application level outer code to generate outer-encoded application-layer packets — 2205

Generate, at a MAC layer of the network entity, a set of multiple MAC PDUs, where the set of multiple MAC PDUs are associated with the outer-encoded application-layer packets — 2210

Mapping, at a physical layer of the network entity, one or more MAC PDUs of the set of multiple MAC PDUs to a TB of one or more TBs — 2215

Broadcast a scheduling grant that indicates a first slot for the broadcast of the TB — 2220

Broadcast the one or more TBs, where each TB of the one or more TBs is broadcast via a respective slot — 2225

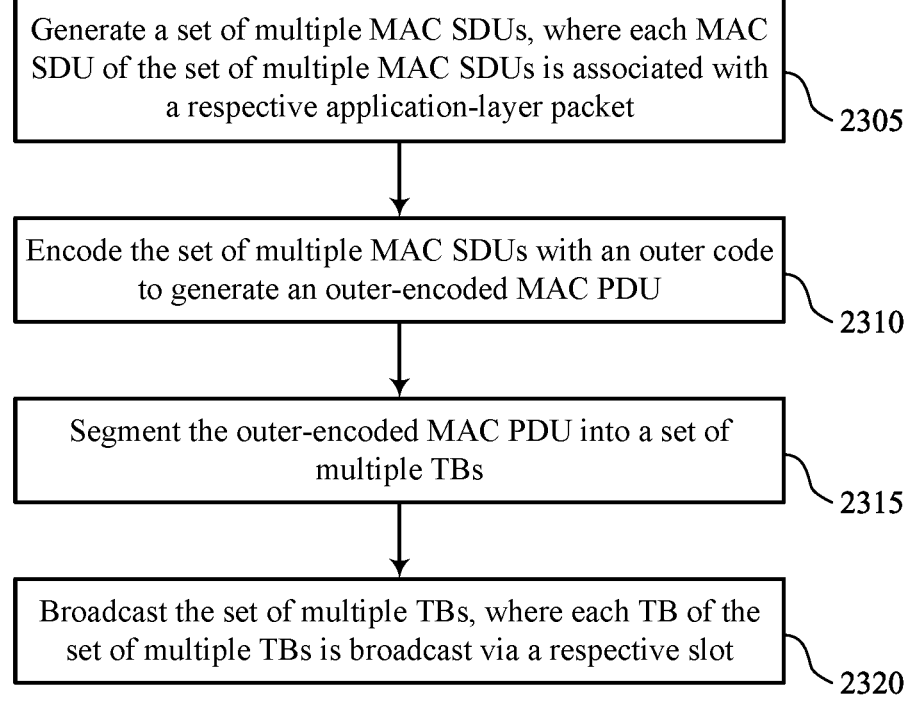

Generate a set of multiple MAC SDUs, where each MAC SDU of the set of multiple MAC SDUs is associated with a respective application-layer packet ⟍ 2305

Encode the set of multiple MAC SDUs with an outer code to generate an outer-encoded MAC PDU ⟍ 2310

Segment the outer-encoded MAC PDU into a set of multiple TBs ⟍ 2315

Broadcast the set of multiple TBs, where each TB of the set of multiple TBs is broadcast via a respective slot ⟍ 2320

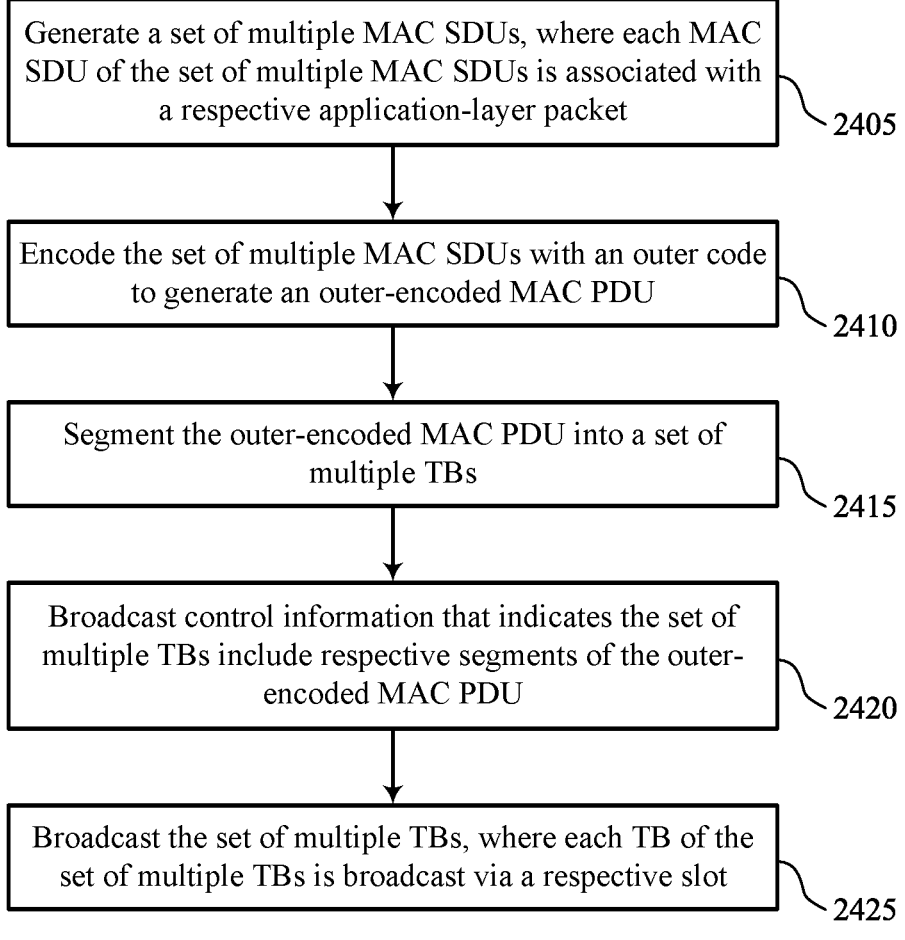

Generate a set of multiple MAC SDUs, where each MAC SDU of the set of multiple MAC SDUs is associated with a respective application-layer packet

2405

Encode the set of multiple MAC SDUs with an outer code to generate an outer-encoded MAC PDU

2410

Segment the outer-encoded MAC PDU into a set of multiple TBs

2415

Broadcast control information that indicates the set of multiple TBs include respective segments of the outer-encoded MAC PDU

2420

Broadcast the set of multiple TBs, where each TB of the set of multiple TBs is broadcast via a respective slot

ENHANCED OUTER CODING FOR BROADCAST COMMUNICATIONS

INTRODUCTION

The following relates to wireless communications, including enhanced outer coding for broadcast communications.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support enhanced outer coding for broadcast communications. For example, the described techniques provide for enhanced application layer outer coding, physical or MAC layer outer coding, or both, which may lead to improved reliability in broadcast transmissions. In some aspects, a network entity may encode, at an application layer, multiple application-layer packets with an application level outer code to generate outer-encoded application-layer packets. In such aspects, the network entity may generate, for each of the outer-encoded application-layer packets, a medium access control (MAC) packet data unit (PDU) at a MAC layer. In one aspect, the network entity may map each MAC PDU to a respective codeblock of a single transport block (TB) and broadcast the TB. Alternatively, the network entity may map each MAC PDU to a single codeblock of a respective TB and broadcast the TB via a single time slot. In some other aspects, the network entity may perform physical or MAC layer outer encoding on the application-layer packets, where the network entity may perform outer encoding on multiple MAC service data units (SDUs) to generate an outer-encoded MAC PDU.

A method for wireless communication by a network entity is described. The method may include receiving, at a physical layer of the network entity, a set of multiple TBs during one or more slots, where a quantity of TBs received during at least a first slot of the one or more slots is greater than one, obtaining, at a MAC layer of the network entity, a set of multiple MAC PDUs from the set of multiple TBs, where each TB of the set of multiple TBs corresponds to a respective MAC PDU of the set of multiple MAC PDUs, obtaining, at an application layer of the network entity, outer-encoded application-layer packets, where each MAC PDU of the set of multiple MAC PDUs is associated with a respective outer-encoded application-layer packet of the outer-encoded application-layer packets, and decoding the outer-encoded application-layer packets to obtain a set of multiple application-layer packets.

A network entity for wireless communication is described. The network entity may include a processing system, and the processing system may include one or more memories storing processor executable code, and one or more processors coupled with the one or more memories. The one or more processors may individually or collectively operable to execute the code to cause the network entity to receive, at a physical layer of the network entity, a set of multiple TBs during one or more slots, where a quantity of TBs received during at least a first slot of the one or more slots is greater than one, obtain, at a MAC layer of the network entity, a set of multiple MAC PDUs from the set of multiple TBs, where each TB of the set of multiple TBs corresponds to a respective MAC PDU of the set of multiple MAC PDUs, obtain, at an application layer of the network entity, outer-encoded application-layer packets, where each MAC PDU of the set of multiple MAC PDUs is associated with a respective outer-encoded application-layer packet of the outer-encoded application-layer packets, and decode the outer-encoded application-layer packets to obtain a set of multiple application-layer packets.

Another network entity for wireless communication is described. The network entity may include means for receiving, at a physical layer of the network entity, a set of multiple TBs during one or more slots, where a quantity of TBs received during at least a first slot of the one or more slots is greater than one, means for obtaining, at a MAC layer of the network entity, a set of multiple MAC PDUs from the set of multiple TBs, where each TB of the set of multiple TBs corresponds to a respective MAC PDU of the set of multiple MAC PDUs, means for obtaining, at an application layer of the network entity, outer-encoded application-layer packets, where each MAC PDU of the set of multiple MAC PDUs is associated with a respective outer-encoded application-layer packet of the outer-encoded application-layer packets, and means for decoding the outer-encoded application-layer packets to obtain a set of multiple application-layer packets.

A non-transitory computer-readable medium storing code for wireless communication is described. The code may include instructions executable by a processor to receive, at a physical layer of the network entity, a set of multiple TBs during one or more slots, where a quantity of TBs received during at least a first slot of the one or more slots is greater than one, obtain, at a MAC layer of the network entity, a set of multiple MAC PDUs from the set of multiple TBs, where each TB of the set of multiple TBs corresponds to a respective MAC PDU of the set of multiple MAC PDUs, obtain, at an application layer of the network entity, outer-encoded application-layer packets, where each MAC PDU of the set of multiple MAC PDUs is associated with a respective outer-encoded application-layer packet of the outer-encoded application-layer packets, and decode the outer-encoded application-layer packets to obtain a set of multiple application-layer packets.

In some aspects of the method, network entities, and non-transitory computer-readable medium described herein, obtaining the set of multiple MAC PDUs may include operations, features, means, or instructions for communicating, from the physical layer of the network entity to the MAC layer of the network entity, each TB of the set of multiple TBs.

In some aspects of the method, network entities, and non-transitory computer-readable medium described herein, each TB of the set of multiple TBs corresponds to one or more respective codeblock.

In some aspects of the method, network entities, and non-transitory computer-readable medium described herein, respective codeblocks of each TB of the quantity of TBs may be received via the first slot in a sequential order.

Some aspects of the method, network entities, and non-transitory computer-readable medium described herein may further include operations, features, means, or instructions for receiving a scheduling grant that indicates the first slot may be for a reception of the quantity of TBs.

In some aspects of the method, network entities, and non-transitory computer-readable medium described herein, each TB of the quantity of TBs received via the first slot may be rate matched based on a total quantity of codeblocks mapped to the first slot.

In some aspects of the method, network entities, and non-transitory computer-readable medium described herein, codeblocks of each TB of the quantity of TBs received via the first slot may be concatenated based on a sequential order of the quantity of TBs.

In some aspects of the method, network entities, and non-transitory computer-readable medium described herein, to receive the scheduling grant, the network entity may be configured to receive the scheduling grant via control signaling, the control signaling may be a downlink control information (DCI) message or a multicast scheduling (MSI) message, and the quantity of TBs may be received via a physical downlink shared channel (PDSCH) or a physical multicast channel (PMCH).

In some aspects of the method, network entities, and non-transitory computer-readable medium described herein, each MAC PDU of the set of multiple MAC PDUs includes a set of multiple headers, each header of the set of multiple headers being associated with a respective layer of a set of multiple layers that includes a MAC layer and other layers above the MAC layer; and one or more headers of the set of multiple headers for each MAC PDU of the set of multiple MAC PDUs may be compressed.

In some aspects of the method, network entities, and non-transitory computer-readable medium described herein, the outer-encoded application-layer packets collectively include the set of multiple application-layer packets and one or more parity application-layer packets.

A method for wireless communication by a network entity is described. The method may include receiving, at a physical layer of the network entity and via one or more slots, one or more TBs, at least a first TB of the one or more TBs including one or more MAC PDUs, the one or more TBs collectively including a set of multiple MAC PDUs, obtaining, at a MAC layer of the network entity, the set of multiple MAC PDUs from the one or more TBs, obtaining, at an application layer of the network entity, outer-encoded application-layer packets, where the set of multiple MAC PDUs are associated with the outer-encoded application-layer packets, and decoding the outer-encoded application-layer packets to obtain a set of multiple application-layer packets.

A network entity for wireless communication is described. The network entity may include a processing system, and the processing system may include one or more memories storing processor executable code, and one or more processors coupled with the one or more memories. The one or more processors may individually or collectively operable to execute the code to cause the network entity to receive, at a physical layer of the network entity and via one or more slots, one or more TBs, at least a first TB of the one or more TBs including one or more MAC PDUs, the one or more TBs collectively including a set of multiple MAC PDUs, obtain, at a MAC layer of the network entity, the set of multiple MAC PDUs from the one or more TBs, obtain, at an application layer of the network entity, outer-encoded application-layer packets, where the set of multiple MAC PDUs are associated with the outer-encoded application-layer packets, and decode the outer-encoded application-layer packets to obtain a set of multiple application-layer packets.

Another network entity for wireless communication is described. The network entity may include means for receiving, at a physical layer of the network entity and via one or more slots, one or more TBs, at least a first TB of the one or more TBs including one or more MAC PDUs, the one or more TBs collectively including a set of multiple MAC PDUs, means for obtaining, at a MAC layer of the network entity, the set of multiple MAC PDUs from the one or more TBs, means for obtaining, at an application layer of the network entity, outer-encoded application-layer packets, where the set of multiple MAC PDUs are associated with the outer-encoded application-layer packets, and means for decoding the outer-encoded application-layer packets to obtain a set of multiple application-layer packets.

A non-transitory computer-readable medium storing code for wireless communication is described. The code may include instructions executable by a processor to receive, at a physical layer of the network entity and via one or more slots, one or more TBs, at least a first TB of the one or more TBs including one or more MAC PDUs, the one or more TBs collectively including a set of multiple MAC PDUs, obtain, at a MAC layer of the network entity, the set of multiple MAC PDUs from the one or more TBs, obtain, at an application layer of the network entity, outer-encoded application-layer packets, where the set of multiple MAC PDUs are associated with the outer-encoded application-layer packets, and decode the outer-encoded application-layer packets to obtain a set of multiple application-layer packets.

In some aspects of the method, network entities, and non-transitory computer-readable medium described herein, obtaining the set of multiple MAC PDUs may include operations, features, means, or instructions for communicating, from the physical layer of the network entity to the MAC layer of the network entity, information associated with at least one codeblock of each of the one or more TBs.

In some aspects of the method, network entities, and non-transitory computer-readable medium described herein, each application-layer packet of the set of multiple application-layer packets corresponds to one or more codeblocks of a TB among the one or more TBs.

In some aspects of the method, network entities, and non-transitory computer-readable medium described herein, each MAC PDU of the set of multiple MAC PDUs includes a set of multiple headers, each header of the set of multiple headers being associated with a respective layer of a set of multiple layers; and one or more headers of the set of multiple headers for each MAC PDU of the set of multiple MAC PDUs may be compressed.

In some aspects of the method, network entities, and non-transitory computer-readable medium described herein, the outer-encoded application-layer packets collectively include the set of multiple application-layer packets and one or more parity application-layer packets.

A method for wireless communication by a network entity is described. The method may include receiving control information that indicates resources for a set of multiple TBs that include respective portions of an outer-encoded MAC PDU, receiving, based on the control information, the outer-encoded MAC PDU, decoding the outer-encoded MAC PDU to obtain a set of multiple MAC SDUs including the outer-encoded MAC PDU, where each MAC SDU of the set of multiple MAC SDUs is associated with a respective application-layer packet, and obtaining the respective application-layer packet associated with each MAC SDU of the set of multiple MAC SDUs based on the obtainment of the set of multiple MAC SDUs.

A network entity for wireless communication is described. The network entity may include a processing system, and the processing system may include one or more memories storing processor executable code, and one or more processors coupled with the one or more memories. The one or more processors may individually or collectively operable to execute the code to cause the network entity to receive control information that indicates resources for a set of multiple TBs that include respective portions of an outer-encoded MAC PDU, receive, based on the control information, the outer-encoded MAC PDU, decode the outer-encoded MAC PDU to obtain a set of multiple MAC SDUs including the outer-encoded MAC PDU, where each MAC SDU of the set of multiple MAC SDUs is associated with a respective application-layer packet, and obtain the respective application-layer packet associated with each MAC SDU of the set of multiple MAC SDUs based on the obtainment of the set of multiple MAC SDUs.

Another network entity for wireless communication is described. The network entity may include means for receiving control information that indicates resources for a set of multiple TBs that include respective portions of an outer-encoded MAC PDU, means for receiving, based on the control information, the outer-encoded MAC PDU, means for decoding the outer-encoded MAC PDU to obtain a set of multiple MAC SDUs including the outer-encoded MAC PDU, where each MAC SDU of the set of multiple MAC SDUs is associated with a respective application-layer packet, and means for obtaining the respective application-layer packet associated with each MAC SDU of the set of multiple MAC SDUs based on the obtainment of the set of multiple MAC SDUs.

A non-transitory computer-readable medium storing code for wireless communication is described. The code may include instructions executable by a processor to receive control information that indicates resources for a set of multiple TBs that include respective portions of an outer-encoded MAC PDU, receive, based on the control information, the outer-encoded MAC PDU, decode the outer-encoded MAC PDU to obtain a set of multiple MAC SDUs including the outer-encoded MAC PDU, where each MAC SDU of the set of multiple MAC SDUs is associated with a respective application-layer packet, and obtain the respective application-layer packet associated with each MAC SDU of the set of multiple MAC SDUs based on the obtainment of the set of multiple MAC SDUs.

Some aspects of the method, network entities, and non-transitory computer-readable medium described herein may further include operations, features, means, or instructions for generating a decoding message for the set of multiple MAC SDUs based on whether each MAC SDU of the set of multiple MAC SDUs was successfully decoded.

In some aspects of the method, network entities, and non-transitory computer-readable medium described herein, the decoding message may be a success message indicative that each MAC SDU of the set of multiple MAC SDUs was successfully decoded.

In some aspects of the method, network entities, and non-transitory computer-readable medium described herein, the decoding message may be a failure message indicative that one or more MAC SDUs of the set of multiple MAC SDUs were unsuccessfully decoded.

In some aspects of the method, network entities, and non-transitory computer-readable medium described herein, the control information further indicates at least one of respective indices of the set of multiple TBs, an indication of an outer code used for the outer-encoded MAC PDU, or a coding rate of the outer code.

In some aspects of the method, network entities, and non-transitory computer-readable medium described herein, the outer code includes one of a Raptor code, a RaptorQ code, or a modified XOR code.

In some aspects of the method, network entities, and non-transitory computer-readable medium described herein, the outer code may be a supplemental error correction code (ECC).

In some aspects of the method, network entities, and non-transitory computer-readable medium described herein, receiving the control information may include operations, features, means, or instructions for receiving one or more repetitions of the control information.

In some aspects of the method, network entities, and non-transitory computer-readable medium described herein, a modulation and coding scheme used for the control information may be associated with a lower useful transmitted bit-to-total transmitted bit ratio than a second modulation and coding scheme used for a second control information that may be not associated with the outer-encoded MAC PDU.

In some aspects of the method, network entities, and non-transitory computer-readable medium described herein, the control information may be MSI.

In some aspects of the method, network entities, and non-transitory computer-readable medium described herein, the outer-encoded MAC PDU includes a concatenation of the set of multiple MAC SDUs that may be appended with a set of multiple parity bits.

In some aspects of the method, network entities, and non-transitory computer-readable medium described herein, a quantity of bits of the outer-encoded MAC PDU may be based on a quantity of the set of multiple TBs, a quantity of a set of multiple codeblocks in a TB, and a quantity of a set of multiple parity bits.

In some aspects of the method, network entities, and non-transitory computer-readable medium described herein, the quantity of the set of multiple parity bits may be an integer multiple of a quantity of bits of a codeblock.

A method for wireless communication by a network entity is described. The method may include encoding, at an application layer of the network entity, a set of multiple application-layer packets with an application level outer code to generate outer-encoded application-layer packets, generating, at a MAC layer of the network entity, a set of multiple MAC PDUs, where each MAC PDU of the set of multiple MAC PDUs is associated with a respective outer-encoded application-layer packet of the outer-encoded application-layer packets, mapping, at a physical layer of the network entity, each MAC PDU of the set of multiple MAC PDUs to a respective TB of a set of multiple TBs, and broadcasting the set of multiple TBs during one or more slots, where a quantity of TBs broadcast during at least a first slot of the one or more slots is greater than one.

A network entity for wireless communication is described. The network entity may include a processing system, and the processing system may include one or more memories storing processor executable code, and one or more processors coupled with the one or more memories.

The one or more processors may individually or collectively operable to execute the code to cause the network entity to encode, at an application layer of the network entity, a set of multiple application-layer packets with an application level outer code to generate outer-encoded application-layer packets, generate, at a MAC layer of the network entity, a set of multiple MAC PDUs, where each MAC PDU of the set of multiple MAC PDUs is associated with a respective outer-encoded application-layer packet of the outer-encoded application-layer packets, mapping, at a physical layer of the network entity, each MAC PDU of the set of multiple MAC PDUs to a respective TB of a set of multiple TBs, and broadcast the set of multiple TBs during one or more slots, where a quantity of TBs broadcast during at least a first slot of the one or more slots is greater than one.

Another network entity for wireless communication is described. The network entity may include means for encoding, at an application layer of the network entity, a set of multiple application-layer packets with an application level outer code to generate outer-encoded application-layer packets, means for generating, at a MAC layer of the network entity, a set of multiple MAC PDUs, where each MAC PDU of the set of multiple MAC PDUs is associated with a respective outer-encoded application-layer packet of the outer-encoded application-layer packets, means for mapping, at a physical layer of the network entity, each MAC PDU of the set of multiple MAC PDUs to a respective TB of a set of multiple TBs, and means for broadcasting the set of multiple TBs during one or more slots, where a quantity of TBs broadcast during at least a first slot of the one or more slots is greater than one.

A non-transitory computer-readable medium storing code for wireless communication is described. The code may include instructions executable by a processor to encode, at an application layer of the network entity, a set of multiple application-layer packets with an application level outer code to generate outer-encoded application-layer packets, generate, at a MAC layer of the network entity, a set of multiple MAC PDUs, where each MAC PDU of the set of multiple MAC PDUs is associated with a respective outer-encoded application-layer packet of the outer-encoded application-layer packets, mapping, at a physical layer of the network entity, each MAC PDU of the set of multiple MAC PDUs to a respective TB of a set of multiple TBs, and broadcast the set of multiple TBs during one or more slots, where a quantity of TBs broadcast during at least a first slot of the one or more slots is greater than one.

In some aspects of the method, network entities, and non-transitory computer-readable medium described herein, each MAC PDU of the set of multiple MAC PDUs corresponds to a one or more respective codeblocks.

Some aspects of the method, network entities, and non-transitory computer-readable medium described herein may further include operations, features, means, or instructions for performing, on a slot-by-slot basis, rate matching across TBs mapped to a slot of the one or more slots, where the rate matching across the TBs may be based on a total quantity of codeblocks mapped to the slot.

Some aspects of the method, network entities, and non-transitory computer-readable medium described herein may further include operations, features, means, or instructions for concatenating, based on a sequential order of the set of multiple TBs, each codeblock within a slot of the one or more slots in preparation for broadcast of the set of multiple TBs.

Some aspects of the method, network entities, and non-transitory computer-readable medium described herein may further include operations, features, means, or instructions for broadcasting a scheduling grant that indicates the first slot may be for the broadcast of the quantity of TBs.

In some aspects of the method, network entities, and non-transitory computer-readable medium described herein, to broadcast the scheduling grant, the network entity may be configured to broadcast the scheduling grant via control signaling, the control signaling may be a DCI message or a MSI message, and the quantity of TBs may be broadcast via a PDSCH or a PMCH.

In some aspects of the method, network entities, and non-transitory computer-readable medium described herein, and the method, apparatuses, and non-transitory computer-readable medium may include further operations, features, means, or instructions for compress one or more headers for each MAC PDU of the set of multiple MAC PDUs.

In some aspects of the method, network entities, and non-transitory computer-readable medium described herein, the outer-encoded application-layer packets collectively include the set of multiple application-layer packets and one or more parity application-layer packets.

In some aspects of the method, network entities, and non-transitory computer-readable medium described herein, the application level outer code may be a supplemental ECC.

A method for wireless communication by a network entity is described. The method may include encoding, at an application layer of the network entity, a set of multiple application-layer packets with an application level outer code to generate outer-encoded application-layer packets, generating, at a MAC layer of the network entity, a set of multiple MAC PDUs, where the set of multiple MAC PDUs are associated with the outer-encoded application-layer packets, mapping, at a physical layer of the network entity, one or more MAC PDUs of the set of multiple MAC PDUs to a TB of one or more TBs, and broadcasting the one or more TBs, where each TB of the one or more TBs is broadcast via a respective slot.

A network entity for wireless communication is described. The network entity may include a processing system, and the processing system may include one or more memories storing processor executable code, and one or more processors coupled with the one or more memories. The one or more processors may individually or collectively operable to execute the code to cause the network entity to encode, at an application layer of the network entity, a set of multiple application-layer packets with an application level outer code to generate outer-encoded application-layer packets, generate, at a MAC layer of the network entity, a set of multiple MAC PDUs, where the set of multiple MAC PDUs are associated with the outer-encoded application-layer packets, mapping, at a physical layer of the network entity, one or more MAC PDUs of the set of multiple MAC PDUs to a TB of one or more TBs, and broadcast the one or more TBs, where each TB of the one or more TBs is broadcast via a respective slot.

Another network entity for wireless communication is described. The network entity may include means for encoding, at an application layer of the network entity, a set of multiple application-layer packets with an application level outer code to generate outer-encoded application-layer packets, means for generating, at a MAC layer of the network entity, a set of multiple MAC PDUs, where the set of multiple MAC PDUs are associated with the outer-encoded application-layer packets, means for mapping, at a physical layer of the network entity, one or more MAC PDUs of the set of multiple MAC PDUs to a TB of one or more TBs, and means for broadcasting the one or more TBs, where each TB of the one or more TBs is broadcast via a respective slot.

A non-transitory computer-readable medium storing code for wireless communication is described. The code may include instructions executable by a processor to encode, at an application layer of the network entity, a set of multiple application-layer packets with an application level outer code to generate outer-encoded application-layer packets, generate, at a MAC layer of the network entity, a set of multiple MAC PDUs, where the set of multiple MAC PDUs are associated with the outer-encoded application-layer packets, mapping, at a physical layer of the network entity, one or more MAC PDUs of the set of multiple MAC PDUs to a TB of one or more TBs, and broadcast the one or more TBs, where each TB of the one or more TBs is broadcast via a respective slot.

In some aspects of the method, network entities, and non-transitory computer-readable medium described herein, each application layer packet of the set of multiple application-layer packets corresponds to one or more codeblocks of a single TB among the one or more TBs.

Some aspects of the method, network entities, and non-transitory computer-readable medium described herein may further include operations, features, means, or instructions for broadcasting a scheduling grant that indicates a first slot for the broadcast of the TB.

In some aspects of the method, network entities, and non-transitory computer-readable medium described herein, to broadcast the scheduling grant, the network entity may be configured to broadcast the scheduling grant via control signaling, the control signaling may be a DCI message or a MSI message, and the TB may be broadcast via a PDSCH or a PMCH.

In some aspects of the method, network entities, and non-transitory computer-readable medium described herein, and the method, apparatuses, and non-transitory computer-readable medium may include further operations, features, means, or instructions for compress one or more headers for each MAC PDU of the set of multiple MAC PDUs.

In some aspects of the method, network entities, and non-transitory computer-readable medium described herein, the outer-encoded application-layer packets collectively include the set of multiple application-layer packets and one or more parity application-layer packets.

In some aspects of the method, network entities, and non-transitory computer-readable medium described herein, the application level outer code may be a supplemental ECC.

A method for wireless communication by a network entity is described. The method may include generating a set of multiple MAC SDUs, where each MAC SDU of the set of multiple MAC SDUs is associated with a respective application-layer packet, encoding the set of multiple MAC SDUs with an outer code to generate an outer-encoded MAC PDU, segmenting the outer-encoded MAC PDU into a set of multiple TBs, and broadcasting the set of multiple TBs, where each TB of the set of multiple TBs is broadcast via a respective slot.

A network entity for wireless communication is described. The network entity may include a processing system, and the processing system may include one or more memories storing processor executable code, and one or more processors coupled with the one or more memories. The one or more processors may individually or collectively operable to execute the code to cause the network entity to generate a set of multiple MAC SDUs, where each MAC SDU of the set of multiple MAC SDUs is associated with a respective application-layer packet, encode the set of multiple MAC SDUs with an outer code to generate an outer-encoded MAC PDU, segment the outer-encoded MAC PDU into a set of multiple TBs, and broadcast the set of multiple TBs, where each TB of the set of multiple TBs is broadcast via a respective slot.

Another network entity for wireless communication is described. The network entity may include means for generating a set of multiple MAC SDUs, where each MAC SDU of the set of multiple MAC SDUs is associated with a respective application-layer packet, means for encoding the set of multiple MAC SDUs with an outer code to generate an outer-encoded MAC PDU, means for segmenting the outer-encoded MAC PDU into a set of multiple TBs, and means for broadcasting the set of multiple TBs, where each TB of the set of multiple TBs is broadcast via a respective slot.

A non-transitory computer-readable medium storing code for wireless communication is described. The code may include instructions executable by a processor to generate a set of multiple MAC SDUs, where each MAC SDU of the set of multiple MAC SDUs is associated with a respective application-layer packet, encode the set of multiple MAC SDUs with an outer code to generate an outer-encoded MAC PDU, segment the outer-encoded MAC PDU into a set of multiple TBs, and broadcast the set of multiple TBs, where each TB of the set of multiple TBs is broadcast via a respective slot.

Some aspects of the method, network entities, and non-transitory computer-readable medium described herein may further include operations, features, means, or instructions for broadcasting control information that indicates the set of multiple TBs include respective segments of the outer-encoded MAC PDU.

In some aspects of the method, network entities, and non-transitory computer-readable medium described herein, the control information may be MSI and further indicates respective indices of the set of multiple TBs, an indication of the outer code, or a coding rate of the outer code.

In some aspects of the method, network entities, and non-transitory computer-readable medium described herein, broadcasting the control information may include operations, features, means, or instructions for broadcasting one or more repetitions of the control information.

In some aspects of the method, network entities, and non-transitory computer-readable medium described herein, a modulation and coding scheme used for the control information may be associated with a lower useful transmitted bit-to-total transmitted bit ratio than a second modulation and coding scheme used for a second control information that may be not associated with the outer-encoded MAC PDU.

In some aspects of the method, network entities, and non-transitory computer-readable medium described herein, encoding the set of multiple MAC SDUs with the outer code may include operations, features, means, or instructions for concatenating the set of multiple MAC SDUs to generate a concatenated MAC SDU, encoding the concatenated MAC SDU with the outer code to generate a set of multiple parity bits, and appending the concatenated MAC SDU with the set of multiple parity bits to generate the outer-encoded MAC PDU, where the outer-encoded MAC PDU includes the concatenated MAC SDU and the set of multiple parity bits.

In some aspects of the method, network entities, and non-transitory computer-readable medium described herein, the outer code includes one of a Raptor code, a RaptorQ code, or a modified XOR code.

In some aspects of the method, network entities, and non-transitory computer-readable medium described herein, the outer code may be a supplemental ECC.

In some aspects of the method, network entities, and non-transitory computer-readable medium described herein, a quantity of bits of the outer-encoded MAC PDU may be based on a quantity of the set of multiple TBs, a quantity of a set of multiple codeblocks in a TB, and a quantity of a set of multiple parity bits.

BRIEF DESCRIPTION OF THE DRAWINGS

FIG. 2 shows an aspect of a wireless communication system that supports enhanced outer coding for broadcast communications in accordance with one or more aspects of the present disclosure.

FIG. 3 shows an aspect of a protocol stack that supports enhanced outer coding for broadcast communications in accordance with one or more aspects of the present disclosure.

FIG. 4 shows an aspect of a process flow that supports enhanced outer coding for broadcast communications in accordance with one or more aspects of the present disclosure.

FIGS. 13 through 24 show flowcharts illustrating methods that support enhanced outer coding for broadcast communications in accordance with one or more aspects of the present disclosure.

DETAILED DESCRIPTION

Figure 1:
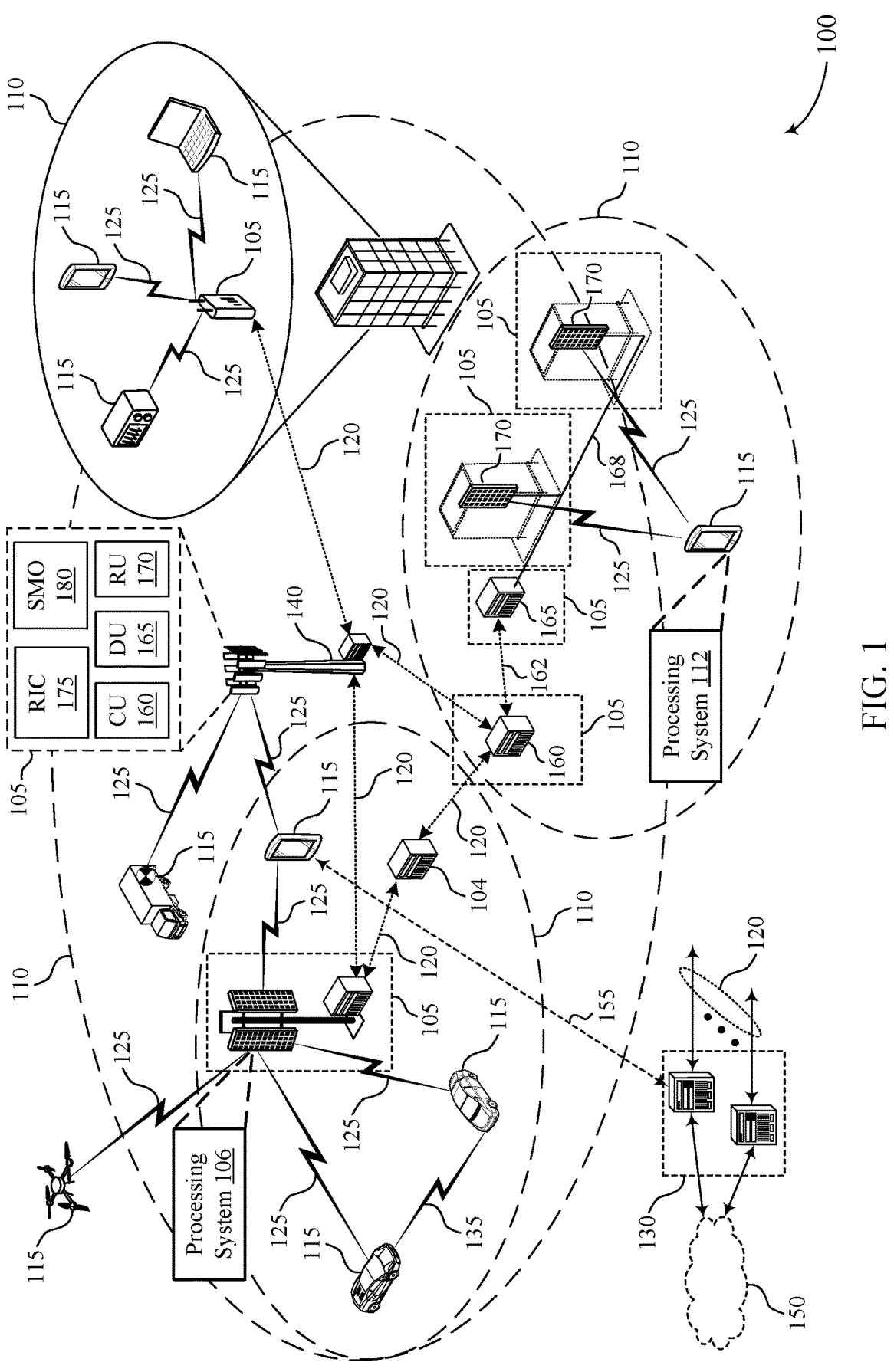
FIG. 1 shows an aspect of a wireless communication system that supports enhanced outer coding for broadcast communications in accordance with one or more aspects of the present disclosure.

In some wireless communication systems, a network entity may perform broadcast communications where, to facilitate such communications, the network entity may implement a communication protocol stack. For example, the network entity may generate an application-layer packet at an application layer of the protocol stack, which may be mapped to a medium access control (MAC) packet data unit (PDU) at a MAC layer of the protocol stack. The network entity may map the MAC PDU to various codeblocks of a transport block (TB) and subsequently broadcast the TB at a physical layer of the protocol stack.

To increase reliability of the broadcast transmission, the network entity may perform application layer outer coding. For example, at the application layer, the network entity may encode a combination of multiple application-layer packets with an outer code. Subsequently, at a physical layer, the network entity may encode multiple TBs, each of which is associated with a respective application-layer packet, with an inner code, such as a low density parity check code (LDPC) or Turbo code. Such inner coding may be referred to as channel coding.

In such cases, however, the flexibility of such outer codes may not enable the receiver of the broadcast transmission to identify various failed codeblocks within one or more TBs. That is, because the outer encoding is performed at the application layer, rather than at the physical or MAC layer, the receiver may be able to determine which of the multiple application-layer packets have failed (e.g., at the application layer) based on the application layer outer coding, but may not be able to identify and correct failed codeblocks of a single TB (e.g., at the physical or MAC layer), which may lead to decreased communication reliability in broadcast transmissions.

The techniques, methods, and devices described herein may provide for enhancements to application outer encoding, implementation of physical or MAC layer outer coding, or both in order to provide increased granularity for outer encoding. In some aspects, the network entity (e.g., broadcaster or transmitter) may implement various enhancements to application layer outer coding to improve performance of the broadcast transmission. The network entity may encode, at an application layer, multiple application-layer packets with an application layer outer code to generate outer-encoded application-layer packets. Based on applying the outer code to the application-layer packets, the network entity may generate, multiple MAC PDUs that are each associated with a respective application-layer packet of the outer-encoded application-layer packets. In such aspects, each MAC PDU may correspond to a single codeblock in terms of size (in bits).

In one aspect, the network entity may map each of the MAC PDUs to a single codeblock of a respective TB and broadcast each of the plurality of TBs in a first time slot. In another aspect, the network entity may map each of the MAC PDUs to respective codeblocks of a single TB and broadcast the single TB. In this way, because each of the MAC PDUs (e.g., and associated application-layer packets) is mapped to a single codeblock, the receiver of the broadcast transmission may be able to identify and correct errors in the broadcast transmission at the codeblock level using the application layer outer decoder.

In some other aspects, the network entity may implement physical layer or MAC layer outer coding to improve performance and reliability of broadcast transmission. For example, the network entity may generate multiple MAC PDUs, where each MAC PDU is associated with a respective application-layer packet. In response to generating the MAC PDUs, the network entity may concatenate the multiple MAC PDUs, encode the concatenated MAC PDUs with the outer code (e.g., such as a Raptor code, RaptorQ code, or the like) to generate parity bits, and subsequently append the concatenated MAC PDUs with the parity bits to generate an outer-encoded MAC PDU.

In response to generating the outer-encoded MAC PDU, the network entity may segment the outer-encoded MAC PDU into multiple TBs and broadcast each of the multiple TBs via respective time slots. In this way, because the parity bits correspond to codeblocks of the MAC PDUs, the receiver of the broadcast transmission may be able to identify and correct failed codeblocks within transmission of the multiple MAC PDUs.

Aspects of the disclosure are initially described in the context of wireless communication systems. Aspects of the disclosure are then described in the context of protocol stacks, resource diagrams, and process flows. Aspects of the disclosure are further illustrated by and described with reference to apparatus diagrams, system diagrams, and flowcharts that relate to enhanced outer coding for broadcast communications.

FIG. 1 shows an aspect of a wireless communication system 100 that supports enhanced outer coding for broadcast communications in accordance with one or more aspects of the present disclosure. The wireless communication system 100 may include one or more network entities 105, one or more UEs 115, and a core network 130. In some aspects, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the wireless communication system 100. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity (e.g., network entity 105) may include a processing system 106. Similarly, the network entity (e.g., UE 115) may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol, Packet Data Convergence Protocol). The CU 160 may be connected to one or more DUs 165 or RUs 170, and the one or more DUs 165 or RUs 170 may host lower protocol layers, such as layer 1 (L1) (e.g., physical layer) or L2 (e.g., radio link control layer MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communication systems (e.g., wireless communication system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support enhanced outer coding for broadcast communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other aspects, which may be implemented in various objects such as appliances, or vehicles, meters, among other aspects.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other aspects, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communication systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some aspects, the TTI duration (e.g., a quantity of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may be configured to support ultra-reliable communications or low-latency communications, or various combinations thereof. For example, the wireless communication system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 may perform broadcast communications, where, to facilitate such communications, the network entity 105 may implement a communication protocol stack. For example, the network entity 105 may generate an application-layer packet at an application layer of the protocol stack, which may be mapped to a MAC PDU at a MAC layer of the protocol stack. The network entity 105 may map the MAC PDU to various codeblocks of a TB and subsequently broadcast the TB at a physical layer of the protocol stack.

To increase reliability of the broadcast transmission, the network entity 105 may perform application layer outer coding. For example, at the application layer, the network entity 105 may encode a combination of multiple application-layer packets with an outer code. Subsequently, at a physical layer, the network entity 105 may encode multiple TBs, each of which is associated with a respective application-layer packet, with an inner code, such as a LDPC or Turbo code. Such inner coding may be referred to as channel coding.

In such cases, however, the flexibility of such outer codes may not enable the receiver of the broadcast transmission to identify various failed codeblocks within one or more TBs. That is, because the outer encoding is performed at the application layer, rather than at the physical or MAC layer, the receiver may be able to determine which of the multiple application-layer packets have failed (e.g., at the application layer) based on the application layer outer coding, but may not be able to identify and correct failed codeblocks of a single TB (e.g., at the physical or MAC layer), which may lead to decreased communication reliability in broadcast transmissions.

The techniques, methods, and devices described herein may provide for enhancements to application outer encoding, implementation of physical or MAC layer outer coding, or both in order to provide increased granularity for outer encoding. In some aspects, the network entity 105 (e.g., broadcaster or transmitter) may implement various enhancements to application layer outer coding to improve performance of the broadcast transmission. The network entity 105 may encode, at an application layer, multiple application-layer packets with an application layer outer code to generate outer-encoded application-layer packets. Based on applying the outer code to the application-layer packets, the network entity 105 may generate, multiple MAC PDUs that are each associated with a respective application-layer packet of the outer-encoded application-layer packets. In such aspects, each MAC PDU may correspond to a single codeblock in terms of size (in bits).

In one aspect, the network entity 105 may map each of the MAC PDUs to a single codeblock of a respective TB and broadcast each of the plurality of TBs in a first time slot. In another aspect, the network entity 105 may map each of the MAC PDUs to respective codeblocks of a single TB and broadcast the single TB. In this way, because each of the MAC PDUs (e.g., and associated application-layer packets) is mapped to a single codeblock, the receiver of the broadcast transmission may be able to identify and correct errors in the broadcast transmission at the codeblock level using the application layer outer decoder.

In some other aspects, the network entity 105 may implement physical layer or MAC layer outer coding to improve performance and reliability of broadcast transmission. For example, the network entity 105 may generate multiple MAC PDUs, where each MAC PDU is associated with a respective application-layer packet. In response to generating the MAC PDUs, the network entity 105 may concatenate the multiple MAC PDUs, encode the concatenated MAC PDUs with the outer code (e.g., such as a Raptor code, RaptorQ code, or the like) to generate parity bits, and subsequently append the concatenated MAC PDUs with the parity bits to generate an outer-encoded MAC PDU.

In response to generating the outer-encoded MAC PDU, the network entity 105 may segment the outer-encoded MAC PDU into multiple TBs and broadcast each of the multiple TBs via respective time slots. In this way, because the parity bits correspond to codeblocks of the MAC PDUs, the receiver of the broadcast transmission may be able to identify and correct failed codeblocks within transmission of the multiple MAC PDUs.

FIG. 2 shows an aspect of a wireless communication system 200 that supports enhanced outer coding for broadcast communications in accordance with one or more aspects of the present disclosure. Aspects of the wireless communication system 200 may implement, or be implemented by, aspects of the wireless communication system 100 as described herein with reference to FIG. 1. For example, the wireless communication system 200 may include a network entity 105-*a* (e.g., a broadcaster) and a network entity 105-*b* (e.g., a receiver), which may be an aspect of the network entity 105 as described herein. The techniques described in the context of the wireless communication system 200 may enable the network entity 105-*a* to increase the reliability of 5G broadcast communications by implementing enhanced outer coding techniques.

To facilitate broadcast communications, the network entity 105-*a* may implement a protocol stack 205. For example, the network entity 105-*a* may generate, at an application layer, an application-layer packet 210 that contains data to be broadcasted. In such examples, the application-layer packet 210 may be an example of an internet protocol (IP) packet, among other types of information. Based on generating the application-layer packet 210, the network entity 105-*a* may forward the application-layer packet 210 to a service data adaptation protocol (SDAP) layer. At the SDAP layer, the network entity 105-*a* may encode the application-layer packet 210, which may be referred to as an SDAP service data unit (SDU) 215, to generate an SDU header (e.g., H) and concatenate the SDAP SDU 215 with the header to generate an SDAP packet data unit (PDU). As used herein, a PDU and an SDU may be used in a general sense to identify units of application layer packets, including with headers, at each layer of the protocol stack 205. Such definitions of a PDU and an SDU may not be restricted by current nomenclature, nor governed by prior references to the same terms.

The network entity 105-*a* may forward the SDAP PDU to a packet data convergence protocol (PDCP) layer, where the network entity 105-*a* may encode the SDAP PDU, otherwise referred to as a PDCP SDU 220, to generate an PDCP header and concatenate the PDCP SDU 220 with the header to generate a PDCP PDU. The network entity 105-*a* may forward the PDCP PDU to a radio link control (RLC) layer, encode the PDCP PDU, otherwise referred to as an RLC SDU 225, to generate an RLC header and concatenate the RLC SDU 225 with the header to generate an RLC PDU. The network entity 105-*a* may forward the RLC PDU to a MAC layer, where the network entity 105-*a* may encode the RLC PDU, otherwise referred to as a MAC SDU 230, to generate a MAC header and concatenate the MAC SDU 230 with the header to generate a MAC PDU 235.

In response to generating the MAC PDU 235, the network entity 105-*a* may map, at a physical layer of the network entity, the MAC PDU 235 to multiple codeblocks within a TB 240, encode the TBs with an inner code, such as LDPC or turbo code, map the TB 240 to a slot (e.g., a time slot) and frequency resource, and broadcast the TB 240. The network entity 105-*b* may receive the TB 240 and proceed to decode the TB 240 at the physical layer to obtain the MAC PDU 235 and transmit the MAC PDU 235 to the MAC layer of the network entity 105-*b*.

At the MAC layer, the network entity 105-*b* may decode the MAC PDU 235 using the MAC header to obtain the MAC SDU 230 (e.g., RLC PDU) and forward the MAC SDU 230 to the RLC layer. The network entity 105-*b* may, at the RLC layer, decode the MAC SDU 230 using the RLC header to obtain the RLC SDU 225 (e.g., PDCP PDU) and forward the RLC SDU 225 to the PDCP layer. The network entity 105-*b* may decode the RLC SDU 225 using the PDCP header to obtain PDCP SDU 220 (e.g., SDAP PDU) and forward the PDCP SDU 220 to the SDAP layer, where the network entity 105-b may decode the PDCP SDU 220 using the SDAP header to obtain the SDAP SDU 215 (e.g., application-layer packet 210) and forward the SDAP SDU 215 to the application layer. At the application layer, the network entity 105-b may decode the application-layer packet 210 to obtain the broadcasted data. In this way, the network entity 105-a and the network entity 105-b may perform broadcast communications using the protocol stack 205.

To improve broadcast communication reliability, the network entity 105-a may perform outer coding. As described herein, an outer code may be an example of a secondary, or supplementary, error correction code (ECC) applied to data prior to an inner code (e.g., a main ECC code), such that the inner code would first be decoded prior to decoding the outer-encoded data. By using outer encoding, the network entity 105-a may achieve quasi error-free (QEF) broadcast transmissions.

Using current 5G terrestrial broadcast techniques, the network entity 105-a may support application-layer outer coding, but the flexibility of the current application-layer outer coding may be limited relative to other techniques. For example, the network entity 105-a may encode a combination of the multiple application-layer packets 210 with an outer code, such that the outer code operates across the multiple application-layer packets 210. Subsequently, at the physical layer, the network entity 105-a may encode multiple TBs 240 with an inner code. In such cases, however, the flexibility of such outer codes may not enable the receiver of the broadcast transmission to identify various failed codeblocks within one or more TBs 240.

That is, if the network entity 105-a broadcasts multiple TBs 240 (e.g., each encapsulating a respective application-layer packet 210) that each contain multiple codeblocks, then the network entity 105-b (e.g., receiver) may not be able to exploit codeblock level cyclic redundancy checks (CRCs). For example, because the outer encoding is performed at the application layer level, rather than at the physical or MAC layer, the network entity 105-b may only be able to determine which application-layer packets 210 have failed and not be able to identify and correct which codeblocks of each TB 240 (e.g., carrying a respective application-layer packet 210) have failed, which may lead to decreased communication reliability in broadcast transmissions. Thus, in such situations, the network entity 105-b may not be able to identify and correct which codeblocks carrying data associated with an application-layer packet 210 have failed, leading to failure to decode the application-layer packet 210.

In order to exploit codeblock level CRCs for broadcast transmissions, a physical or MAC layer outer code may be implemented. However, using current 5G terrestrial broadcast techniques (e.g., outlined in the 3GPP standards), the network entity 105-a may not support physical layer or MAC layer outer coding leading to the network entity 105-a being unable to perform the broadcast communications with the QEF transmissions (e.g., one packet error per hour of time). That is, the network entity 105-a may be unable to obtain QEF transmissions, due to the relatively low physical block error rates (BLER) required by QEF transmissions, using single coding techniques, such as Turbo or LDPC codes or the current application layer outer encoding techniques. Thus, it may be desirable for the network entity 105-a to implement enhanced application layer outer coding techniques, implement a physical layer or MAC layer outer coding, or both, to exploit codeblock level CRCs.

In accordance with the techniques described herein, the network entity 105-a may implement physical layer or MAC layer outer coding, implement enhanced (e.g., modified versions) of the application layer outer coding, or both, to exploit codeblock level CRCs. In some aspects, the network entity 105-a may implement various enhancements to application layer outer coding to improve performance of the broadcast transmission.

For example, the network entity 105-a may encode, at the application layer, multiple application-layer packets 210 with an application layer outer code to generate outer-encoded application-layer packets. Based on applying the outer code to the application-layer packets 210, the network entity 105-a may generate, multiple MAC PDUs 235 that are each associated with a respective application-layer packet 210 of the outer-encoded application-layer packets, where each MAC PDU 235 corresponds to a single respective codeblock in size. That is, each MAC PDU 235 may include a quantity of bits equal to a predefined codeblock size in bits. In one aspect, the network entity 105-a may map each of the MAC PDUs 235 to a single codeblock of a respective TB 240 and broadcast each of the plurality of TBs 240 in a first time slot (e.g., multiple TBs 240 broadcasted in a single slot). In another aspect, the network entity 105-a may map each of the MAC PDUs 235 to respective codeblocks of a single TB 240 and broadcast the single TB 240. In this way, because each MAC PDU 235 (e.g., and corresponding application-layer packet 210) corresponds to a single codeblock, the network entity 105-b may decode the broadcast transmission and be able to identify errors in the broadcast transmission at the codeblock level. Techniques to enhance application layer outer encoding may be further described herein with reference to FIGS. 3 and 4.

Additionally, or alternatively, the network entity 105-a may implement physical layer or MAC layer outer coding to improve performance and reliability of broadcast transmission. For example, the network entity 105-a may generate multiple MAC PDUs 235, where each MAC PDU 235 is associated with a respective application-layer packet 210. In response to generating the MAC PDUs 235, the network entity 105-a may concatenate the multiple MAC PDUs 235, encode the concatenated MAC PDUs 235 with the outer code (e.g., such as a Raptor code, RaptorQ code, or the like) to generate parity bits, and subsequently append the concatenated MAC PDUs 235 with the parity bits to generate an outer-encoded MAC PDU. In response to generating the outer-encoded MAC PDU, the network entity 105-a may segment the outer-encoded MAC PDU into multiple TBs 240 and broadcast each of the multiple TBs 240 via respective time slots. In this way, because the parity bits correspond to codeblocks of the MAC PDUs 235, the network entity 105-b may be able to identify and correct failed codeblocks while decoding the multiple MAC PDUs 235.

Figure 3:
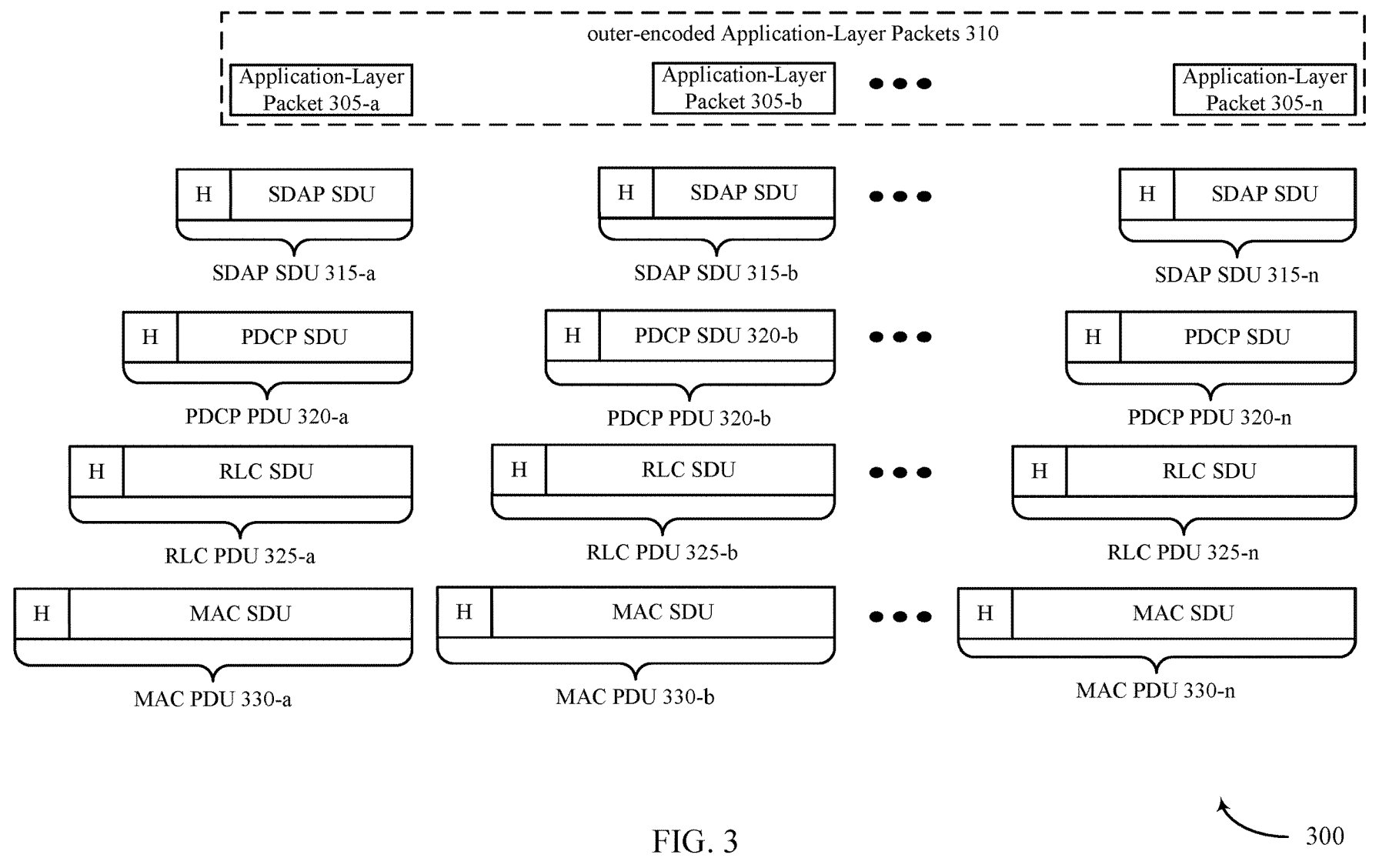

FIG. 3 shows an aspect of a protocol stack 300 that supports enhanced outer coding for broadcast communications in accordance with one or more aspects of the present disclosure. Aspects of the protocol stack 300 may implement, or be implemented by, aspects of the wireless communication system 100 and the wireless communication system 200 as described herein with reference to FIGS. 1 and 2. The techniques described in the context of the protocol stack 300 may provide enhancements to application layer outer encoding.

In accordance with the techniques described herein, the network entity may implement application-layer outer coding across application-layer packets 305, where each application-layer packet 305 (and corresponding MAC PDU 330) may correspond to a single codeblock (e.g., or a few codeblocks). Performing the outer encoding at the application layer on application-layer packets 305 that correspond to a single codeblock (in size) may enable communication from the physical layer to other layers within the protocol stack to be equivalent to codeblocks, such that the outer decoding may occur at the application layer. As such, the network entity may exploit the physical layer codeblock level granularity of success or failure indications.

For example, the network entity may generate multiple application-layer packets 305 (e.g., an application-layer packet 305-a through an application-layer packet 305-n). In response to generating the multiple application-layer packets 305, the network entity, at the application layer, may encode a combination of the multiple application-layer packets 305 with an outer code to generate outer-encoded application-layer packets 310. In such aspects, the outer-encoded application-layer packets 310 may include each of the multiple application-layer packets 305 (e.g., the application-layer packet 305-a, the application-layer packet 305-b, up to the application-layer packet 305-n) in addition to one or more parity application-layer packets 305 generated by the application layer outer code.

As an illustrative example, the network entity may generate 100 application-layer packets 305 (e.g., n=100) and subsequently apply the outer code across all of the 100 application-layer packets to generate, as an example, 5 parity application-layer packets 305. As such, the outer-encoded application-layer packets 310 may have a quantity of 105 application-layer packets 305, including the 100 original application-layer packets 305 and the 5 parity application-layer packets 305.

In response to generating the outer-encoded application-layer packets 310, the network entity may begin to encode the outer-encoded application-layer packets 310 at each layer of the protocol stack. For example, the network entity may generate an SDAP PDU 315 for each of the outer-encoded application-layer packets 310 (e.g., an SDAP PDU 315-a, an SDAP PDU 315-b, up to an SDAP PDU 315-n), generate PDCP PDUs 320 based on each of the SDAP PDUs 315 (e.g., an PDCP PDU 320-a, an PDCP PDU 320-b, up to an PDCP PDU 320-n), and generate RLC PDUs 325 based on each of the PDCP PDUs 320 (e.g., an RLC PDU 325-a, an RLC PDU 325-b, up to an RLC PDU 325-n). In response to generating the PDCP PDUs 320 for each of the outer-encoded application-layer packets 310, the network entity may generate, at the MAC layer, a MAC PDU 330 for each of the outer-encoded application-layer packets 310 based on the RLC PDUs 325.

As an illustrative example, the network entity may generate a MAC PDU 330-a that corresponds to the application-layer packet 305-a, generate a MAC PDU 330-b that corresponds to the application-layer packet 305-b, and generate a MAC PDU 330-n that corresponds to the application-layer packet 305-n. In this way, the network entity may generate respective MAC PDUs 330 for each of the outer-encoded application-layer packets 310. To avoid increased overhead due to a respective header being applied to the application-layer packets 305 at each layer, the network entity may implement header compression techniques, such as robust header compression (ROHC), at one or more layers of the protocol stack. That is, because the application-layer packets 305 may have decreased size relative to other application-layer packets (e.g., in order for the corresponding MAC PDUs 330 to correspond in size to a single codeblock), the MAC PDUs 330 may suffer from increased overhead due to each header being applied to the application-layer packets 305. As such, the network entity may implement ROHC.

In some aspects, based on generating each of the MAC PDUs 330, the network entity may map each of the MAC PDUs 330 to a respective TB, where each TB includes a single codeblock. For example, the network entity, at the physical layer, may map the MAC PDU 330-a to a single codeblock of a first TB, map the MAC PDU 330-b to a single codeblock of a second TB, and map the MAC PDU 330-n to a single codeblock of an $n^{th}$ TB.

Based on mapping each of the MAC PDUs 330 to the respective TBs, the network entity may map the TBs to one or more slots at the physical layer, where a quantity of TBs mapped to at least a first slot of the one or more slots is greater than one. In a first illustrative aspect, the network entity may map each of the TBs to a first slot. In another aspect, the network entity may map a first portion of the TBs to the first slot, where a quantity of the first portion of the TBs is greater than one and map a remaining portion of the TBs to a second slot. In another aspect, the network entity may map multiple portions of the TBs to a respective slot, such that a first portion of the TBs may be mapped to a first slot, a second portion of the TBs may be mapped to a second slot, a third portion of the TBs may be mapped to a third slot, and so on.

To broadcast multiple TBs within a single slot, the network entity may jointly perform rate matching and codeblock concatenation for all TBs mapped to the single slot. For example, at the physical layer, the network entity may perform rate matching for each of the TBs on a slot-by-slot basis, where the rate matching may be based on a total quantity of codeblocks for broadcast in a respective slot. Additionally, the network entity may concatenate each codeblock within the single slot in preparation for transmissions, where the concatenation is performed in a sequential order.

As an illustrative example, if the network entity maps a first TB corresponding to the application-layer packet 305-a and a second TB corresponding to the application-layer packet 305-b to a first slot, then the network entity may jointly perform rate matching for the first and second TBs, where the rate matching may be based on the quantity of TBs mapped to the first slot (e.g., two). Based on jointly rate matching the first and second TBs, the network entity may concatenate, in a sequential order, the first and second TBs in preparation for the broadcast transmission. As such, because the application-layer packet 305-a precedes the application-layer packet 305-b (e.g., in generation time, in data continuity, or the like), then the network entity may append the second TB to the end of the first TB, such that the data associated with the application-layer packet 305-a precedes the data associated with the application-layer packet 305-b. Joint rate matching and concatenation may be further described herein with reference to FIG. 4.

In such aspects (e.g., multiple TBs mapped to a single slot), the broadcasting network entity may transmit a respective control message (e.g., downlink control information (DCI) for physical downlink shared channel (PDSCH) transmissions or multicast scheduling information (MSI) for physical multicast channel (PMCH) transmissions) allocating the same time slot for each of the multiple TBs. As an illustrative example, if the network entity maps the first TB associated with the application-layer packet 305-a and the second TB associated with the application-layer packet 305-b to a first slot, then the network entity may transmit a first control message allocating the first slot for the application-layer packet 305-a and transmit a second control message allocating the first slot for the application-layer packet 305-*b*. In this way, the network entity may schedule the time resources for the multiple TBs broadcasted via the first slot.

In some other aspects, based on generating each of the MAC PDUs 330, the network entity may map each of the MAC PDUs to a respective codeblock within one or more transport blocks. For example, the network entity may map the MAC PDU 330-*a* to a first codeblock of a first TB, map the MAC PDU 330-*b* to a second codeblock of the first TB, and map the MAC PDU 330-*n* to an $n^{th}$ codeblock of the first TB. Alternatively, the network entity may map a first portion of the MAC PDUs 330 to respective codeblocks of a first TB and map the remaining portion of the MAC PDUs 330 to respective codeblocks of a second TB. In some aspects, the network entity may map a first portion of the MAC PDUs 330 to respective codeblocks of a first TB, map a second portion of the MAC PDUs 330 to respective codeblocks of a second TB, map a third portion of the MAC PDUs 330 to respective codeblocks of a third TB, and so on.

In such aspects, based on mapping the MAC PDUs 330 to the respective codeblocks of the one or more TBs, the network entity may broadcast the one or more TBs via respective slots. For example, the network entity may transmit a single TB, including the equivalent of multiple code-blocks (e.g., MAC PDUs) via a single slot (e.g., a single TB-per-slot basis).

As described herein, each of the MAC PDUs 330 (e.g., each application-layer packet 305 together with the different headers) may correspond to a single respective codeblock. That is, the size, in bits, of each of the MAC PDUs 330 may be equal to or less than a predefined size of a codeblock. In this way, each of the MAC PDUs 330 may be mapped to a respective codeblock, thereby enabling the receiving network entity to exploit codeblock level CRCs when performing the outer decoding at the application layer. In general, while a correspondence between the application-layer packet 305 and a single codeblock (e.g., a single codeblock based correspondence) is described as a canonical example, it should be understood that a relatively small application-layer packet (in size of bits) may map to a relatively reduced quantity of codeblocks of a transport block.

A network entity may receive the broadcasted transmission and decode MAC PDUs. For example, the receiving network entity may receive, at the physical layer, the mul-tiple TBs and decode the TBs to retrieve the codeblocks corresponding to the MAC PDUs 330. The network entity may transfer the codeblocks (e.g., MAC PDUs 330) from the physical layer to the MAC layer or information associated the codeblocks from the physical layer to the MAC layer, such that the network entity may begin to decode the MAC PDUs 330 to obtain the application-layer packets 305. For example, the network entity may indicate, from the physical layer to the MAC layer, which codeblocks were successfully received and decoded (e.g., passed) and which codeblocks were unsuccessfully received and decoded (e.g., failed) at the physical layer. In some aspects, the network entity may indicate, from the physical to the MAC layer, information associated with codeblock groups, the codeblocks, or a subset of codeblocks that make up the application-layer packets 305, such as whether the codeblock group, each codeblock, or the subset of codeblocks were successfully decoded or not.

The network entity may decode the MAC PDUs 330 at the MAC layer to obtain the RLC PDUs 325 and pass the RLC PDUs 325 to the RLC layer, where the network entity may decode the RLC PDUs 325 to obtain the PDCP PDUs 320.

The network entity may, at the PDCP layer, decode the PDCP PDUs 320 to obtain the SDAP PDUs 315 and transfer the SDAP PDUs 315 to the SDAP layer. At the SDAP layer, the network entity may decode the SDAP PDUs 315 to obtain the outer-encoded application-layer packets 310. At the application layer, the network entity may perform outer decoding on the outer-encoded application-layer packets 310 to obtain each of the original application-layer packets 305. Based on performing the outer decoding, the network entity may be able to verify, at the codeblock level, which application-layer packets 305 were fully decoded by the protocol stack or have failed to be decoded. That is, because each application-layer packet 305 was associated with a respective codeblock, the receiving network entity may be able to identify which codeblocks (e.g., application-layer packets 305) failed based on the generated parity applica-tion-layer packets 305, thereby exploiting codeblock level CRCs while performing application layer outer coding.

FIG. 4 shows an aspect of a process flow 400 that supports enhanced outer coding for broadcast communications in accordance with one or more aspects of the present disclo-sure. The process flow 400 may implement, or be imple-mented by, aspects of the wireless communication system 100, the wireless communication system 200, and the pro-tocol stack 300 as described herein with reference to FIGS. 1 through 3. The techniques described in the context of the process flow 400 may enable the network entity to map multiple TBs 405 to a single slot for a broadcast transmis-sion.

As described herein, in some aspects, the network entity may map multiple MAC PDUs (e.g., such as MAC PDUs 330) to a single codeblock of respective TBs 405, such that each TB 405 corresponds to a single MAC PDU. In such aspects, to avoid decreasing throughput of the broadcast transmission, the network entity may map multiple TBs 405 to a single slot (e.g., similar to MIMO or URLLC transmis-sions). To broadcast the multiple TBs via a single slot, the network entity may perform a rate matching procedure and codeblock concatenation procedure, leading to resource element mapping, jointly for all TBs 405 in the single slot. In essence, the network entity creates a concatenated TB 405, where in the concatenated TB 405, the codeblock of the TB 405-*a* is immediately followed by the codeblock of the TB 405-*b* during mapping to resource elements. That is, the network entity may combine the single codeblocks from each of the TBs 405 into a single concatenated TB 405 in a sequential order, thereby enabling the network entity to map the concatenated TB 405 to a slot.

For example, the network entity may map, at a physical layer, a first MAC PDU to a TB 405-*a*, a second MAC PDU to a TB 405-*b*, and an $n^{th}$ MAC PDU to a single codeblock of a TB 405-*n* in accordance with the techniques described herein with reference to FIG. 3. In response to mapping the MAC PDUs to the TBs 405, the network entity may begin resource element to TB mapping in order to map the TBs 405 (e.g., TB 405-*a* through the TB 405-*n*) to a first slot.

For example, at 410, the network entity may perform a TB CRC attachment procedure individually for all TBs 405. As an illustrative example, at 410-*a*, the network entity may perform a TB CRC attachment procedure for the TB 405-*a*, while at 410-*b* the network entity may separately perform a TB CRC attachment procedure for the TB 405-*b*. Similarly, at 410-*n*, the network entity may perform the TB CRC attachment procedure for the TB 405-*n*.

At 415, the network entity may perform a codeblock segmentation and CRC attachment procedure individually for all TBs 405. As an illustrative example, at 415-*a*, the network entity may perform the codeblock segmentation and CRC attachment procedure on the codeblock associated with the TB 405-*a*, while, at 415-*b*, the network entity may perform codeblock segmentation and CRC attachment procedure on the codeblock associated with the TB 405-*b*. Similarly, at 415-*n*, the network entity may perform the TB CRC attachment procedure for the TB 405-*n*.

At 420, the network entity may perform a channel coding procedure individually for all TBs 405. As an illustrative example, at 420-*a*, the network entity may perform the channel coding procedure on the codeblock associated with the TB 405-*a*, while, at 420-*b*, the network entity may perform channel coding procedure on the codeblock associated with the TB 405-*b*. Similarly, at 420-*n*, the network entity may perform the TB CRC attachment procedure for the TB 405-*n*.

At 425, the network entity may perform rate matching for each of the TBs 405 jointly, where the rate matching is based on a total quantity of codeblocks for broadcast in the first slot that the TBs 405 are mapped. For example, the network entity may perform the rate matching, where the input to a formula used to perform the rate matching across the TBs 405 may be the total quantity of codeblocks across all the TBs 405 to be mapped to the first slot. That is, the network entity may perform the rate matching for each TB 405 accounting for the total quantity of codeblocks to be transmitted via the first slot.

As an illustrative example, if the network entity mapped 100 MAC PDUs to respective codeblocks of 100 TBs (e.g., 100 codeblocks), then the network entity may perform the rate matching for each TB 405 using an input of 100 codeblocks. In this way, the network entity may perform rate matching for each TB 405 based on the total quantity of codeblocks mapped to the slot.

At 430, the network entity may concatenate the codeblocks from each of the TBs 405 serially to generate a sequential set of codeblocks that correspond to all the TBs 405 mapped to the first slot. For example, the network entity may concatenate each codeblock within the first slot in preparation for broadcast of the TBs 405, where the network entity may perform the concatenation in a sequential order of the TBs 405. As an illustrative example, if the TB 405-*a* precedes the TB 405-*b*, then the network entity may append the codeblock of the TB 405-*b* to the end of the codeblock of the TB 405-*a*, such that the data associated with the TB 405-*a* precedes the data associated with the TB 405-*b*. In this way, the network entity may generate the concatenated TB 405, including multiple codeblocks of distinct TBs 405, for broadcast transmission in a single slot.

Figure 5:
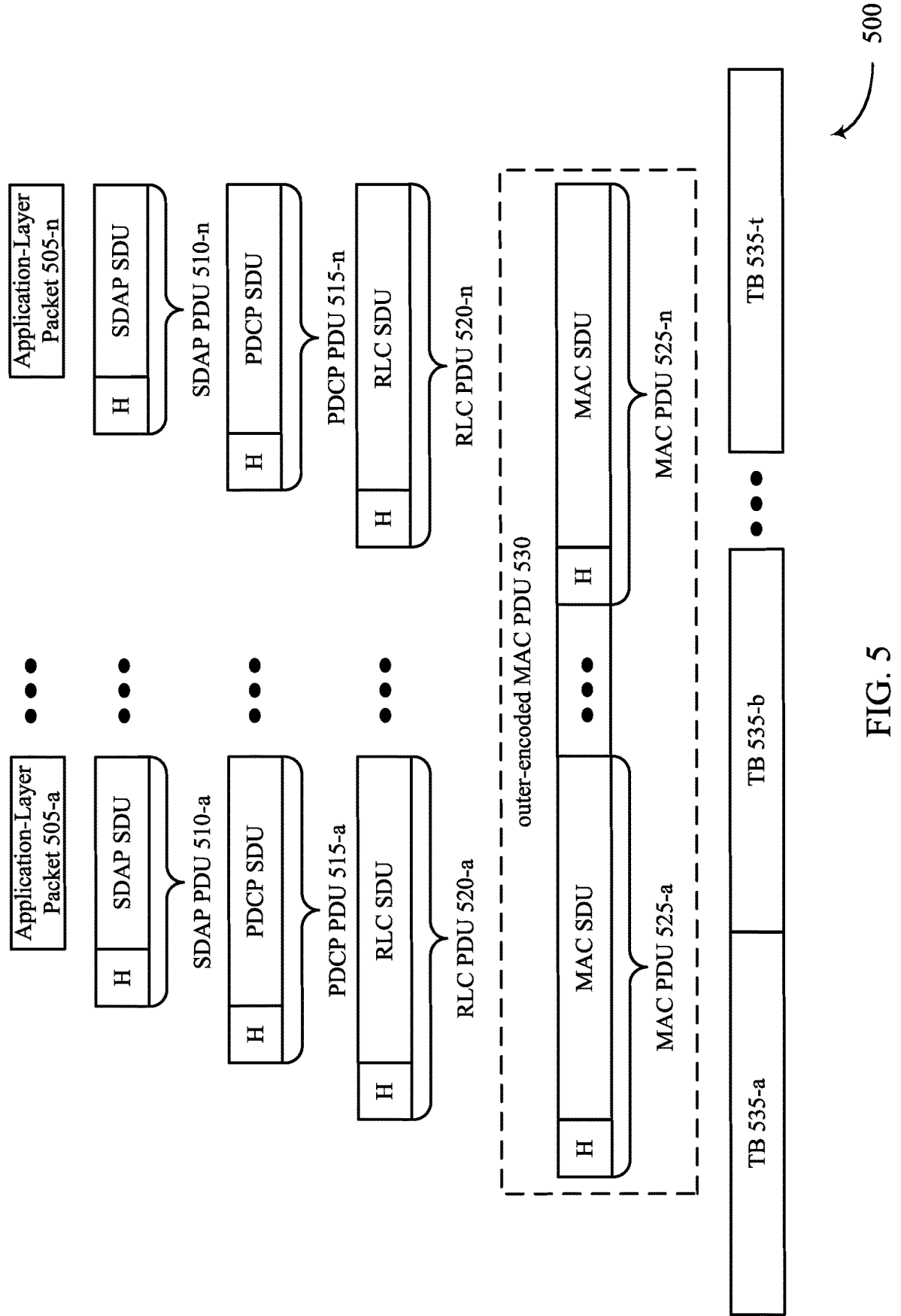
FIG. 5 shows an aspect of a protocol stack that supports enhanced outer coding for broadcast communications in accordance with one or more aspects of the present disclosure.

FIG. 5 shows an aspect of a protocol stack 500 that supports enhanced outer coding for broadcast communications in accordance with one or more aspects of the present disclosure. Aspects of the protocol stack 500 may implement, or be implemented by, aspects of the wireless communication system 100, the wireless communication system 200, the protocol stack 300, and the process flow 400 as described herein with reference to FIGS. 1 through 4. The techniques described in the context of the protocol stack 500 may enable a network entity (e.g., such as the network entity 105-*a*) to perform physical or MAC layer outer encoding for broadcast transmissions.

For example, the network entity (e.g., broadcasting network entity) may generate multiple application-layer packets 505 (e.g., an application-layer packet 505-*a* through an application-layer packet 505-*n*) to broadcast. Based on generating the multiple application-layer packets 505, the network entity may encode the application-layer packets 505 using a protocol stack. For example, the network entity may generate, at an SDAP layer, SDAP PDUs 510 for each of the application-layer packets 505 (e.g., an SDAP PDU 510-*a* through an SDAP PDU 510-*n*). The network entity may generate, at a PDCP layer, PDCP PDUs 515 for each of the SDAP PDUs 510 (e.g., an PDCP PDU 515-*a* through an PDCP PDU 515-*n*) and generate, at an RLC layer, RLC PDUs 520 for each of the PDCP PDUs 515 (e.g., an RLC PDU 520-*a* through an RLC PDU 520-*n*).

At a MAC layer, the network entity may generate multiple MAC PDUs 525 for each of the RLC PDUs 520. That is, the network entity may generate a MAC PDU 525 for each application-layer packet 505. As an illustrative example, the network entity may generate a MAC PDU 525-*a* that corresponds to, or otherwise includes, the data of the application-layer packet 505-*a*. Similarly, the network entity may generate a MAC PDU 525-*n* that corresponds to, or otherwise includes, the data of the application-layer packet 505-*n*.

To increase reliability and achieve QEF transmissions for broadcasting, the network entity may apply an outer code to the multiple MAC PDUs 525 to generate an outer-encoded MAC PDU 530 at an outer encoder layer between the physical layer and the MAC layer, at the physical layer, or at the MAC layer. For example, the network entity may combine (e.g., concatenate) each of the MAC PDUs 525 (e.g., the MAC PDU 525-*a* up to the MAC PDU 525-*n*) to generate a concatenated MAC PDU 525.

In such aspects, a quantity of bits of the concatenated MAC PDU 525 may be based on a quantity of TBs 535 allocated for the broadcast transmission, a quantity of codeblocks per TB 535, and a quantity of parity bits associated with the outer coding. That is, to perform the concatenation, the network entity may identify a quantity of MAC PDUs 525 (e.g., application-layer packet 505-*a* through application-layer packet 505-*n*) whose size, in bits, is equal to $(T{\times}C)-C_{parity}$ bits, where T denotes the quantity of TBs 535 allocated for a broadcast transmission, C denotes the quantity of codeblocks in a TB 535 (e.g., in bits), and $C_{parity}$ denotes the quantity of parity codeblocks (e.g., in bits) that may be appended to the concatenated MAC PDU 525 to generate the outer-encoded MAC PDU 530.

The network entity may concatenate the identified quantity of MAC PDUs 525 to generate the concatenated MAC PDU 525. The network entity may encode the concatenated MAC PDU 525 with an outer code to generate multiple parity codeblocks (e.g., $C_{parity}$ bits). That is, the network entity may generate multiple parity bits using an erasure correcting code (e.g., outer code), such as a Raptor code, RaptorQ code, modified XOR code, or a combination thereof. The network entity may append the concatenated MAC PDU 525 with the multiple parity codeblocks (e.g., bits) to generate the outer-encoded MAC PDU 530.

In response to generating the outer-encoded MAC PDU 530, the network entity may segment the outer-encoded MAC PDU 530 into the quantity of TBs 535 allocated for the broadcast transmission (e.g., T TBs) for transmission by the physical layer. As an illustrative example, the network entity may segment the outer-encoded MAC PDU 530 into t segments, where each of the t segments may be mapped to a respective TB 535 and include data associated with one or more MAC PDUs 525.

Based on segmenting the outer-encoded MAC PDU 530, the network entity may map each segment of the outer-encoded MAC PDU 530 to a respective TB 535, map each respective TB 535 to a frequency resource (e.g., single frequency network (SFN)) and slot (e.g., subframe), encode each TB 535 with an inner code (e.g., perform channel coding using LDPC or Turbo codes), and broadcast the multiple TBs 535. Continuing with the aforementioned illustrative example, the network entity may map a first segment of the outer-encoded MAC PDU 530 to a TB 535-*a*, map a second segment of the outer-encoded MAC PDU 530 to a TB 535-*b*, and map a $t^{th}$ segment of the outer-encoded MAC PDU 530 to a TB 535-*t* and broadcast each of the t TBs 535 via respective time and frequency resources. In this way, the network entity may perform physical layer or MAC layer outer encoding, thereby improving broadcast communication reliability.

Such outer encoding operations may be performed by an outer encoding layer of the network entity that operates between the MAC layer and the physical layer. Additionally, or alternatively, the MAC layer of the network entity, the physical layer of the network entity, or a combination thereof may perform all or a portion of the aforementioned outer encoding operations.

In this way, the outer encoding layer (e.g., layer that performs outer coding) may have access to the physical layer codeblock level CRCs, thereby enabling the decoder of the broadcast transmission to exploit the codeblock level CRCs for decoding the broadcast transmission. For example, during decoding, the receiving network entity may, at the outer encoding layer, decode the outer-encoded MAC PDU 530 to obtain each of the MAC PDUs 525, thereby exploiting the codeblock CRCs, and generate a decoding message based on whether the codeblocks associated with the outer-encoded MAC PDU 530 were successfully decoded (e.g., whether the N MAC SDUs were successfully decoded). For example, the network entity may generate a success message (e.g., all success) if each codeblock associated with the outer-encoded MAC PDU was successfully decoded. Alternatively, the network entity may generate a failure message (e.g., all failure) if the codeblocks associated with the outer-encoded MAC PDU 530 were unsuccessfully decoded. Based on decoding the outer-encoded MAC PDU 530, the outer encoding layer may transmit the MAC PDUs 525 and the decoding message (e.g., success or failure message) to the MAC layer. The MAC layer may then begin the process of decoding each of the MAC PDUs 525 to pass up the protocol stack.

In this way, because the parity bits were generated based on codeblock level MAC PDUs 525, the receiving network entity may be able to exploit the codeblock level parity bits to identify which, if any, codeblocks were unsuccessfully transmitted. As such, the receiving network entity, at the outer encoding layer, may be able to pass the success or failure message to the MAC layer, such that the MAC layer may have an indication of which codeblocks (e.g., MAC PDUs 525) were unsuccessfully or successfully decoded.

In order to perform the decoding operation, the broadcasting network entity may broadcast control signaling indicating outer encoding information associated with the outer encoding of the broadcast transmission. For example, the broadcasting network entity may broadcast, as part of the outer encoding information, respective indices associated with each of the TBs 535 (e.g., to identify the order in which the TBs 535 are to be decoded), an indication of the outer code used to generate the outer-encoded MAC PDU 530, an indication of the coding rate used to generate the outer-encoded MAC PDU 530, or a combination thereof. As such, the receiving network entity may utilize the outer encoding information to decode the outer-encoded MAC PDU 530.

The broadcasting network entity may broadcast the outer encoding information via scheduling or control signaling from the MAC layer, such as via MSI signaling. In some aspects, the broadcasting network entity may broadcast an MSI formatted for physical or MAC layer outer coding. Because the operational cost of losing such a signal is relatively high, the broadcasting network entity may transmit the MSI with a relatively higher reliability compared to current MSI transmissions for broadcast. For example, if the receiving network entity fails to receive the MSI associated with the broadcast transmission of the TBs 535, the entire set of n application-layer packets 505 may be lost. To mitigate such failures, the broadcasting network entity may broadcast the MSI to the receiving network entity repeatedly.

As an illustrative example, the broadcasting network entity may broadcast an original MSI and multiple repetitions of the MSI to ensure successful receipt of the MSI by the receiving network entity. Additionally, or alternatively, to mitigate losing the MSI, the network entity may broadcast the MSI with a modulation and coding scheme (MCS) that is lower relative to the MSCs used for current MSI broadcast transmissions. MSI indications may be further described herein with reference to FIG. 6.

Figure 6:
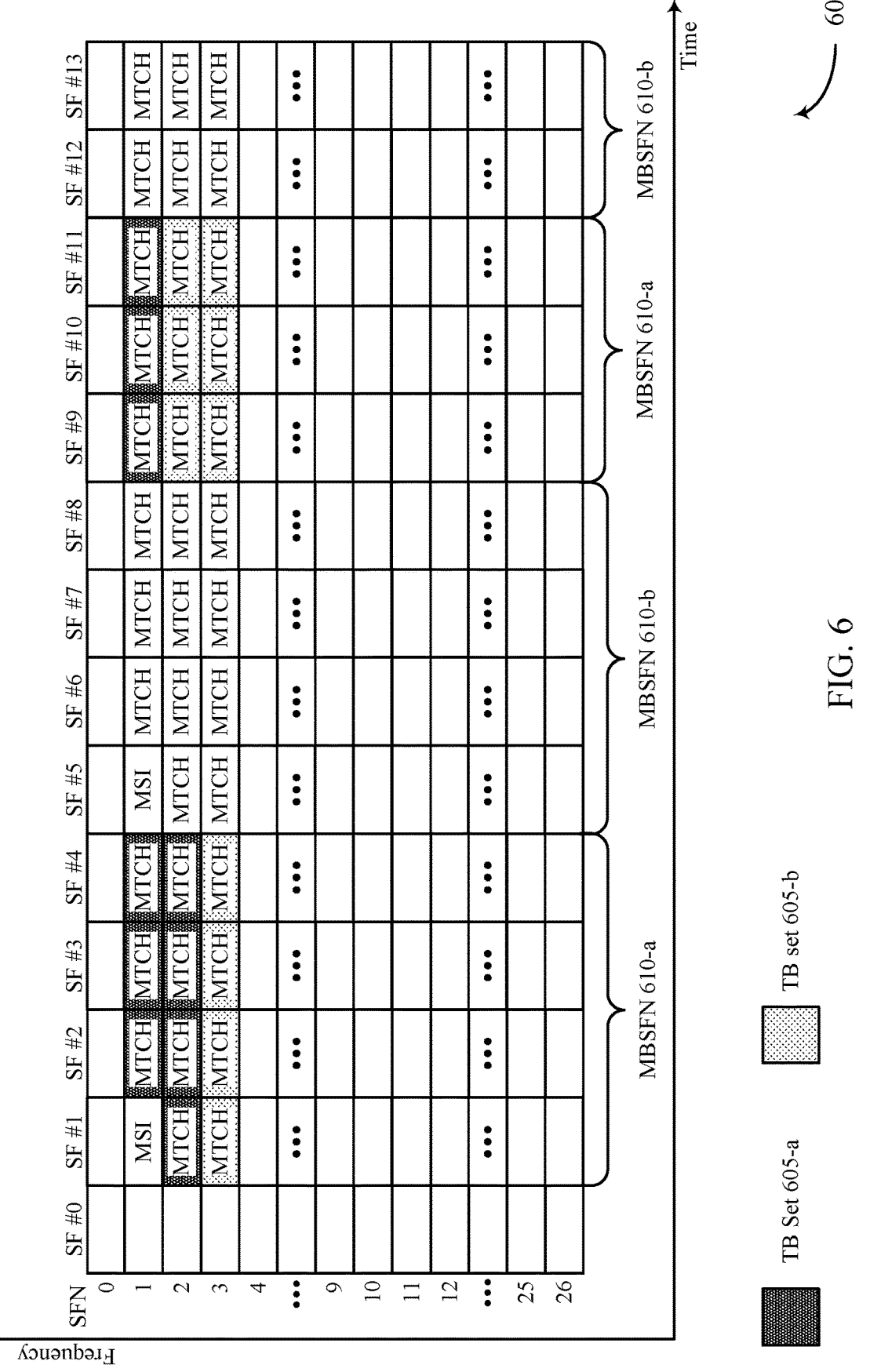
FIG. 6 shows an aspect of a resource diagram that supports enhanced outer coding for broadcast communications in accordance with one or more aspects of the present disclosure.

FIG. 6 shows an aspect of a resource diagram 600 that supports enhanced outer coding for broadcast communications in accordance with one or more aspects of the present disclosure. Aspects of the resource diagram 600 may implement, or be implemented by, aspects of the wireless communication system 100, the wireless communication system 200, the protocol stack 300, the process flow 400, and the protocol stack 500 as described herein with reference to FIGS. 1 through 5. For example, the resource diagram 600 may be an example of a broadcast transmission that includes a TB set 605-*a* and a TB set 605-*b*, where the TB set 605-*a* may include data associated with a first outer-encoded MAC PDU and the TB set 605-*b* include data associated with a second outer-encoded MAC PDU.

The resource diagram 600 may include one or more SFNs (e.g., SFN 0 through SFN 26), where a single SFN may span a frequency bandwidth and be used for broadcast communications. Each SFN may be segmented into multiple subframes (SF) (e.g., SF #0 through SF #13), where a subframe may include multiple time slots for which multicast channels (MTCH) (e.g., data channels) or multicast control channels (MCCH) may be broadcasted.

Additionally, the resource diagram 600 may be segmented into various multimedia broadcast multicast service single frequency networks (MBSFNs) 610, where each MBSFN 610 may span multiple SFs. As an illustrative example, SFs 1 through 4 and SFs 9 through 11 may be allocated for the MBSFN 610-*a*, while the SFs 5 through 8 and SFs 12 and 13 may be allocated for the MBSFN 610-*b*.

As described herein, a broadcasting network entity may perform physical layer or MAC layer outer encoding to exploit codeblock level CRCs in broadcast transmissions. For example, the broadcasting network entity may encode, with an outer code, multiple MAC PDUs (e.g., MAC PDUs 525) to generate a first outer-encoded MAC PDU (e.g., an outer-encoded MAC PDU 530) and also encode, with the outer code, multiple second MAC PDUs to generate a second outer-encoded MAC PDU. The broadcasting network entity may map the first outer-encoded MAC PDU to the TB set 605-*a* and map the second outer-encoded MAC PDU to the TB set 605-*b* in accordance with the techniques described herein with reference to FIG. 5.

Based on mapping the outer-encoded MAC PDUs to the respective TB sets 605, the broadcasting network entity may map the TB sets 605 to a MBSFN 610 and respective MTCHs that span various SFs and SFNs of the MBSFN 610. As an illustrative example, the broadcasting network entity may map the TB set 605-*a*, associated with the first outer-encoded MAC PDU, to the SF #2, the SF #3, the SF #4, the SF #9, the SF #10, and the SF #11 of the first SFN and the SF #1, the SF #2, the SF #3, and the SF #4 of the second SFN. Similarly, the broadcasting network may map the TB set 605-*b*, associated with the second outer-encoded MAC PDU, to the SF #9, the SF #10, the SF #11, of the second SFN and the SF #1, the SF #2, the SF #3, the SF #4, the SF #9, the SF #10, and the SF #11 of the third SFN. The network entity may broadcast the TB sets 605 via respective MTCHs based on the mapping.

In accordance with the techniques described herein, for the receiver of the broadcast transmission to decode the TB sets 605, the broadcasting network entity may broadcast MSI (potentially with repetitions), for the MBSFN 610-*a* and for a given MBMS service, to indicate the outer coding architecture across the scheduled MTCHs (data TB sets 605). For example, the broadcasting network entity may broadcast the MSI that indicates outer encoding information, such as respective indices associated with each of TB sets 605, an indication of the outer code used to generate the outer-encoded MAC PDU, an indication of the coding rate used to generate the outer-encoded MAC PDU, or a combination thereof.

As an illustrative example, the broadcasting network entity may broadcast MSI via the SF #1 of the first SFN, where the broadcasting network entity may indicate that the MTCHs (e.g., TB set 605-*a*) broadcasted via the SF #2, the SF #3, the SF #4, the SF #9, the SF #10, and the SF #11 of the first SFN and the SF #1, the SF #2, the SF #3, and the SF #4 of the second SFN are associated with the first outer-encoded MAC PDU, while the MTCHs (e.g., TB set 605-*a*) broadcasted via the SF #9, the SF #10, the SF #11, of the second SFN and the SF #1, the SF #2, the SF #3, the SF #4, the SF #9, the SF #10, and the SF #11 of the third SFN are associated with the second outer-encoded MAC PDU. In this way, the broadcasting network entity may indicate, via the MSI, which TBs are associated with the same outer-encoded MAC PDU, thereby enabling the receiving network entity to receive, identify, and decode each outer-encoded MAC PDU.

Figure 7:
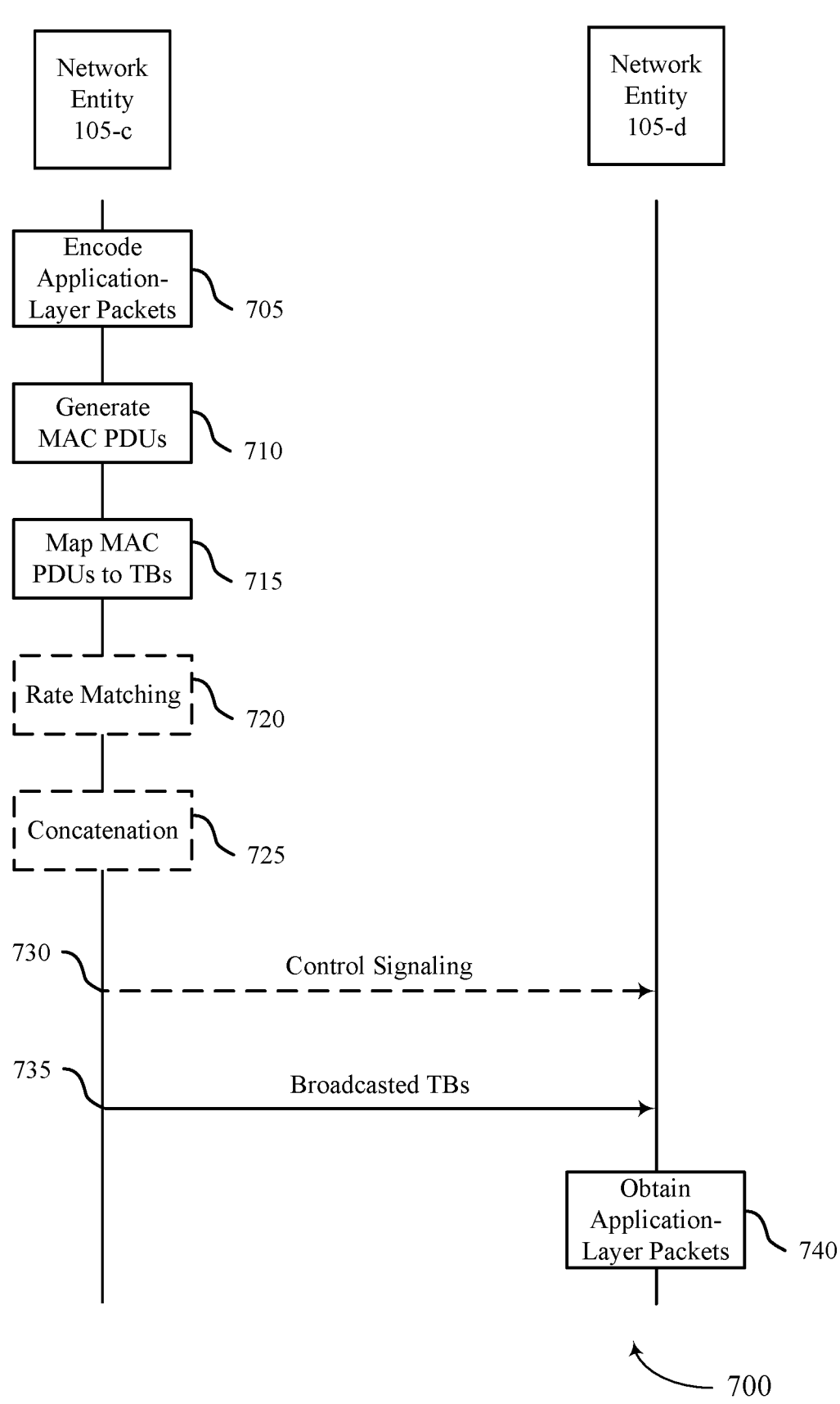
FIG. 7 shows an aspect of a process flow that supports enhanced outer coding for broadcast communications in accordance with one or more aspects of the present disclosure.

FIG. 7 shows an aspect of a process flow 700 that supports enhanced outer coding for broadcast communications in accordance with one or more aspects of the present disclosure. Aspects of the process flow 700 may implement, or be implemented by, aspects of the wireless communication system 100, the wireless communication system 200, the protocol stack 300, the process flow 400, the protocol stack 500, and the resource diagram 600 as described herein with reference to FIGS. 1 through 6. The process flow 700 may include a network entity 105-*c*, which may be an example of a broadcasting network entity or the network entity 105-*a*. The process flow 700 may also include a network entity 105-*d*, which may be an example of a receiving network entity or the network entity 105-*b*. The techniques described in the context of the process flow 700 may enable the network entity 105-*c* to enhance application layer outer coding, for example, as described herein with reference to FIGS. 3 and 4.

At 705, the network entity 105-*c* may encode, at an application layer, multiple application-layer packets (e.g., application-layer packets 305) with an application level outer code to generate outer-encoded application-layer packets (e.g., outer-encoded application-layer packets 310) in accordance with the techniques described herein with reference to FIG. 3.

At 710, the network entity 105-*c* may generate, at a MAC layer, multiple MAC PDUs, where each MAC PDU may be associated with a respective outer-encoded application-layer packet. For example, the network entity 105-*c* may encode each application-layer packet via various layers of the protocol stack to generate the multiple MAC PDUs.

At 715, in one aspect, the network entity 105-*c* may map, at a physical layer, each MAC PDU of the plurality of MAC PDUs to a respective TB in accordance with the techniques described herein with reference to FIG. 3. In another aspect, the network entity 105-*c* may map each MAC PDU to one or more codeblocks of a single TB as described herein with reference to FIG. 3. In either aspect, each MAC PDU may correspond, in size, to a respective single codeblock. That is, each MAC PDU may include a quantity of bits equal to a predefined size of bits of a codeblock.

At 720, if the network entity 105-*c* may map each MAC PDU to a single codeblock of a single TB (e.g., TB includes a single codeblock), then the network entity 105-*c* may perform, on a slot-by-slot basis, rate matching across TBs mapped to a slot of the one or more slots, where the rate matching across the TBs is based on a total quantity of codeblocks mapped to the slot. Additionally, at 725, the network entity 105-*c* may concatenate, based on a sequential order of the TBs mapped to a single slot, each codeblock within a slot of the one or more slots in preparation for broadcast of the plurality of transport blocks. Such rate matching and concatenation may be performed as described herein with reference to 425 and 430 of FIG. 4.

In some aspects, at 730, the network entity 105-*c* may broadcast a scheduling grant that indicates slots (time resources) for the broadcast transmission. For example, if the network entity 105-*a* maps multiple MAC PDUs to a single TB, then the network entity may indicate, via the scheduling grant, that a first slot is used for the multiple TBs. Alternatively, if the network entity 105-*a* maps each MAC PDU to a respective slot, then the network entity may indicate, via the scheduling grant, an allocation of multiple slots for the broadcast transmission, where a single slot of the multiple slots is used for the broadcast of a single TB. As described herein, the network entity may broadcast the scheduling grant via control signaling, wherein the control signaling is one of a DCI or MSI message. At 735, the network entity 105-*c* may broadcast the multiple TBs.

At 740, the network entity 105-*d* may obtain the application-layer packets. In some aspects, based on receiving the TBs, the network entity 105-*d* may obtain multiple MAC PDUs from the TBs. In one aspects, to obtain the MAC PDUs, the network entity 105-*d* may communicate, from the physical layer to the MAC layer, each transport block of the multiple TBs. In another aspect, the network entity 105-*d* may communicate, from the physical layer to the MAC layer, information for at least one codeblock of a TB. The network entity 105-*d* may then obtain, at an application layer of the network entity 105-*d*, the outer-encoded application-layer packets. Based on obtaining the outer-encoded application-layer packet, the network entity 105-*d* may perform outer decoding to obtain each of the original application-layer packets.

Figure 8:
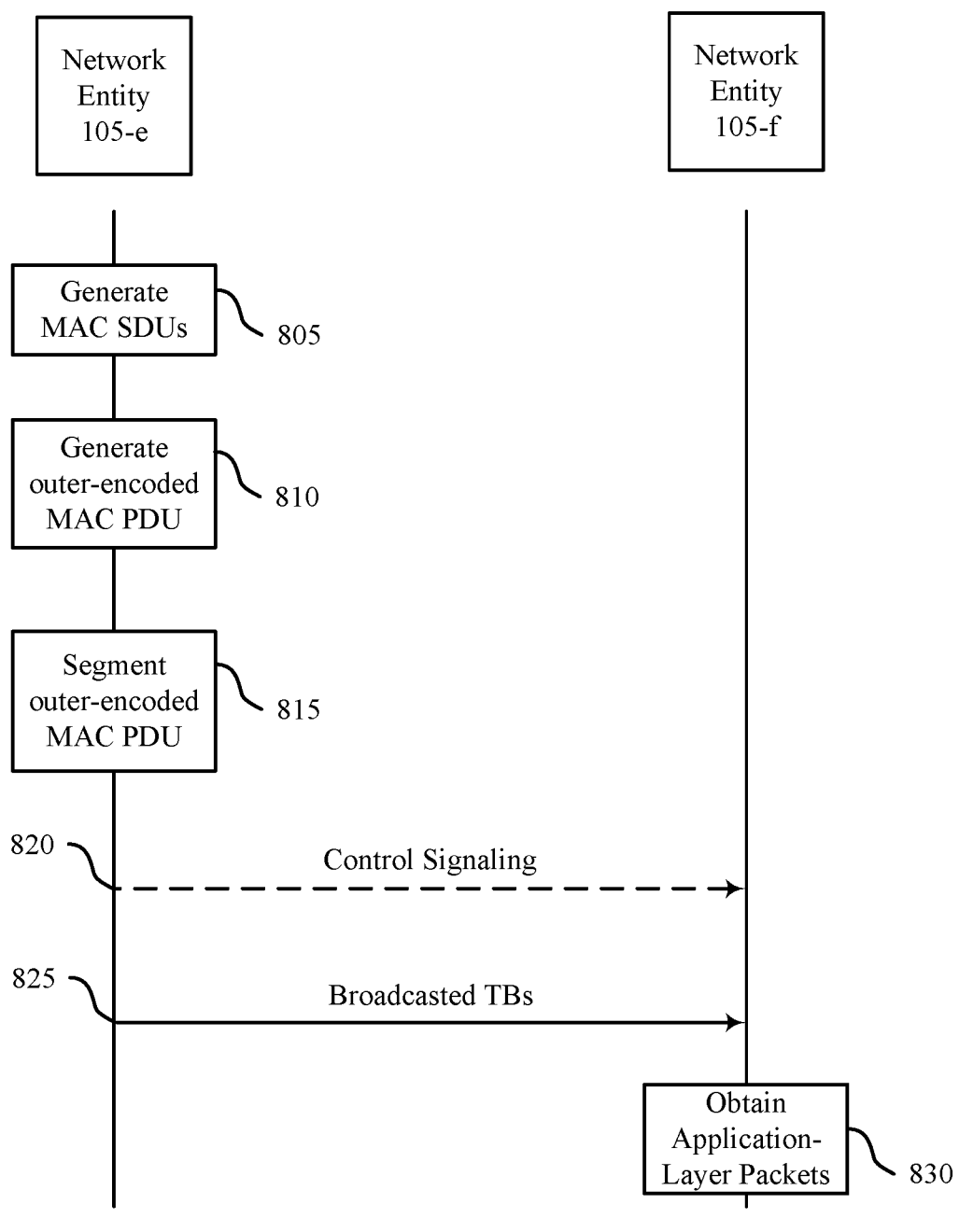
FIG. 8 shows an aspect of a process flow that supports enhanced outer coding for broadcast communications in accordance with one or more aspects of the present disclosure.

FIG. 8 shows an aspect of a process flow 800 that supports enhanced outer coding for broadcast communications in accordance with one or more aspects of the present disclosure. Aspects of the process flow 800 may implement, or be implemented by, aspects of the wireless communication system 100, the wireless communication system 200, the protocol stack 300, the process flow 400, the protocol stack 500, the resource diagram 600, and the process flow 700 as described herein with reference to FIGS. 1 through 7. The process flow 800 may include a network entity 105-*e*, which may be an example of a broadcasting network entity or the network entity 105-*a*. The process flow 800 may also include a network entity 105-*f*, which may be an example of a receiving network entity or the network entity 105-*b*. The techniques described in the context of the process flow 800 may enable the network entity 105-*e* to implement physical or MAC layer outer coding, for example, as described herein with reference to FIGS. 5 and 6.

At 805, the network entity 105-*e* may generate multiple MAC PDUs (e.g., MAC PDUs 525) based on respective application-layer packets. For example, the network entity 105-*e* may generate application-layer packets (e.g., application-layer packets 505), encode each application-layer packet at each layer of the protocol stack, and generate the MAC PDUs.

At 810, the network entity 105-*e* may encode the multiple MAC PDUS with an outer code (e.g., a Raptor code, RaptorQ code, or modified XOR code) to generate an outer-encoded MAC PDU (e.g., the outer-encoded MAC PDU 530). To encode the multiple MAC PDUs, the network entity 105-*e* may first concatenate the multiple MAC PDUs to generate a concatenated MAC PDU. In such aspects, a quantity of bits of the concatenated MAC PDU may be equal to a quantity of TBs allocated to the broadcast transmission, a quantity of codeblocks per TB, a quantity of parity bits, or a combination thereof. Based on generating the concatenated MAC PDU, the network entity 105-*e* may encode the concatenated MAC PDU with the outer code to generate multiple parity bits (e.g., multiple parity codeblocks) and append the concatenated MAC PDU with the multiple parity bits to generate the outer-encoded MAC PDU.

At 815, the network entity 105-*e* may segment the outer-outer encoded MAC PDU into multiple TBs. For example, the network entity 105-*e* may segment the outer-encoded MAC PDU into a quantity of segments that is equivalent to the quantity of TBs allocated to the broadcast transmission. In response to segmenting the outer-encoded MAC PDU, the network entity 105-*e* may perform inner (channel) coding on each of the TBs using a turbo or LDPC code. The network entity 105-*e* may map each of the encoded TBs to a respective time and frequency resource.

At 820, the network entity 105-*e* may broadcast control signaling, such as multicast scheduling information, that indicates which TBs comprise respective segments of the outer encoded MAC PDU. For example, the network entity 105-*e* may broadcast the multicast scheduling information, where the multicast scheduling information indicates one or more SF and SFNs that carry segments of the outer encoded MAC PDU as described herein with reference to FIG. 6.

In some aspects, the network entity 105-*e* may indicate, via the multicast scheduling information, indices associated with each TB, an indication of the outer code used to generate the outer-encoded MAC PDU (e.g., whether a Raptor, RaptorQ, modified XOR, or other code was used), an indication of the coding rate of the outer code, or a combination thereof, such that the network entity 105-*f* may use such indications to decode each TB, obtain the outer-encoded MAC PDU, and decode the outer-encoded MAC PDU.

In some aspects, to increase reliability of the broadcast of the multicast scheduling information, the network entity 105-*e* may broadcast the MSI repeatedly, such that the network entity 105-*f* may receive an initial MSI and one or more repetitions of the MSI. Additionally, or alternatively, the network entity 105-*e* may broadcast the MSI using a MCS that is less than a second MCS used for a second MSI.

At 825, the network entity 105-*e* may broadcast the multiple TBs, where each TB is broadcast via a respective slot. In some aspects, the network entity 105-*f* may receive each TB via the respective slot, obtain, after performing inner decoding, each segment of the outer-encoded MAC PDU from each TB, and performing outer decoding on the MAC PDU based on the information received via the MSI. The network entity 105-*f* may generate a decoding message based on whether the network entity 105-*f* successfully decoded each segment of the outer-encoded MAC PDU (e.g., each MAC PDU of the multiple MAC PDUs). For example, the network entity 105-*f* may generate a success message indicating that each segment of the outer-encoded MAC PDU was successfully decoded and obtained and indicate the success message from the physical or outer decoding layer to the MAC layer. Alternatively, the network entity 105-*f* may generate a failure message indicating that one or more segments of the outer encoded MAC PDU was unsuccessfully decoded and indicate the failure message from the physical or outer decoding layer to the MAC layer.

At 830, the network entity 105-*f* may obtain the application-layer packets. For example, the network entity 105-*f* may decode the outer-encoded MAC PDU to obtain multiple MAC PDUs (e.g., or MAC SDUs) that make-up the outer-encoded MAC PDU, where each MAC SDU may be associated with a respective application-layer packet. Based on decoding the outer-encoded MAC PDU, the network entity 105-*f* may obtain the respective application-layer packets.

Figure 9:
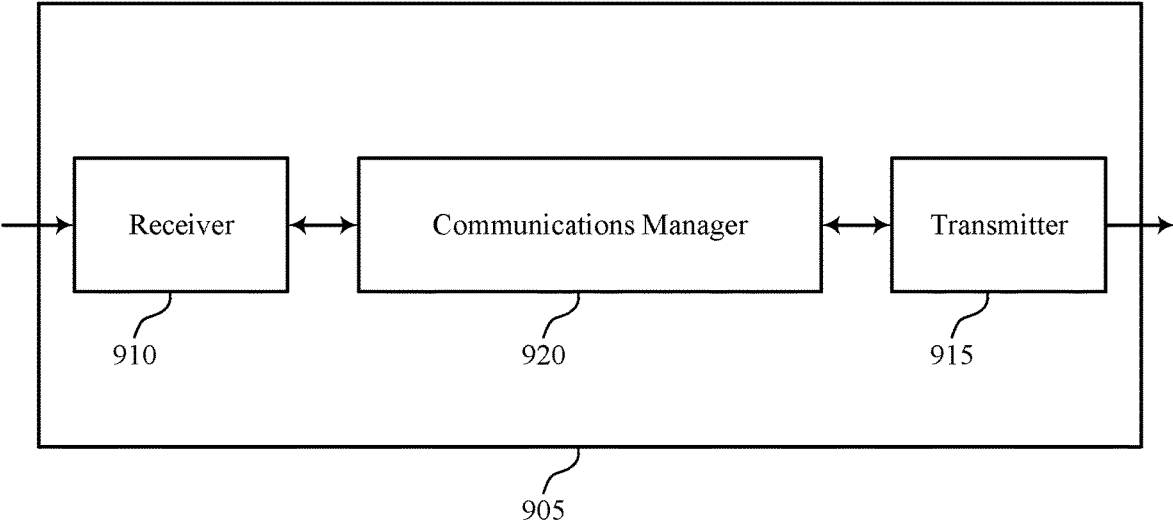
FIGS. 9 and 10 show block diagrams of devices that support enhanced outer coding for broadcast communications in accordance with one or more aspects of the present disclosure.

FIG. 9 shows a block diagram 900 of a device 905 that supports enhanced outer coding for broadcast communications in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some aspects, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some aspects, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of enhanced outer coding for broadcast communications as described herein. For example, the communications manager 920, the receiver 910, the transmitter 915, or various combinations or components thereof may be capable of performing one or more of the functions described herein.

In some aspects, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some aspects, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for receiving, at a physical layer of the network entity, a set of multiple TBs during one or more slots, where a quantity of TBs received during at least a first slot of the one or more slots is greater than one. The communications manager 920 is capable of, configured to, or operable to support a means for obtaining, at a MAC layer of the network entity, a set of multiple MAC PDUs from the set of multiple TBs, where each TB of the set of multiple TBs corresponds to a respective MAC PDU of the set of multiple MAC PDUs. The communications manager 920 is capable of, configured to, or operable to support a means for obtaining, at an application layer of the network entity, outer-encoded application-layer packets, where each MAC PDU of the set of multiple MAC PDUs is associated with a respective outer-encoded application-layer packet of the outer-encoded application-layer packets. The communications manager 920 is capable of, configured to, or operable to support a means for decoding the outer-encoded application-layer packets to obtain a set of multiple application-layer packets.

Additionally, or alternatively, the communications manager 920 may support wireless communication in accordance with examples as disclosed herein. For example, the communications manager 920 is capable of, configured to, or operable to support a means for receiving, at a physical layer of the network entity and via one or more slots, one or more TBs, at least a first TB of the one or more TBs including one or more MAC PDUs, the one or more TBs collectively including a set of multiple MAC PDUs. The communications manager 920 is capable of, configured to, or operable to support a means for obtaining, at a MAC layer of the network entity, the set of multiple MAC PDUs from the one or more TBs. The communications manager 920 is capable of, configured to, or operable to support a means for obtaining, at an application layer of the network entity, outer-encoded application-layer packets, where the set of multiple MAC PDUs are associated with the outer-encoded application-layer packets. The communications manager 920 is capable of, configured to, or operable to support a means for decoding the outer-encoded application-layer packets to obtain a set of multiple application-layer packets.

Additionally, or alternatively, the communications manager 920 may support wireless communication in accordance with examples as disclosed herein. For example, the communications manager 920 is capable of, configured to, or operable to support a means for receiving control information that indicates resources for a set of multiple TBs that include respective portions of an outer-encoded MAC PDU. The communications manager 920 is capable of, configured to, or operable to support a means for receiving, based on the control information, the outer-encoded MAC PDU. The communications manager 920 is capable of, configured to, or operable to support a means for decoding the outer-encoded MAC PDU to obtain a set of multiple MAC SDUs including the outer-encoded MAC PDU, where each MAC SDU of the set of multiple MAC SDUs is associated with a respective application-layer packet. The communications manager 920 is capable of, configured to, or operable to support a means for obtaining the respective application-layer packet associated with each MAC SDU of the set of multiple MAC SDUs based on the obtainment of the set of multiple MAC SDUs.

Additionally, or alternatively, the communications manager 920 may support wireless communication in accordance with examples as disclosed herein. For example, the communications manager 920 is capable of, configured to, or operable to support a means for encoding, at an application layer of the network entity, a set of multiple application-layer packets with an application level outer code to generate outer-encoded application-layer packets. The communications manager 920 is capable of, configured to, or operable to support a means for generating, at a MAC layer of the network entity, a set of multiple MAC PDUs, where each MAC PDU of the set of multiple MAC PDUs is associated with a respective outer-encoded application-layer packet of the outer-encoded application-layer packets. The communications manager 920 is capable of, configured to, or operable to support a means for mapping, at a physical layer of the network entity, each MAC PDU of the set of multiple MAC PDUs to a respective TB of a set of multiple TBs. The communications manager 920 is capable of, configured to, or operable to support a means for broadcasting the set of multiple TBs during one or more slots, where a quantity of TBs broadcast during at least a first slot of the one or more slots is greater than one.

Additionally, or alternatively, the communications manager 920 may support wireless communication in accordance with examples as disclosed herein. For example, the communications manager 920 is capable of, configured to, or operable to support a means for encoding, at an application layer of the network entity, a set of multiple application-layer packets with an application level outer code to generate outer-encoded application-layer packets. The communications manager 920 is capable of, configured to, or operable to support a means for generating, at a MAC layer of the network entity, a set of multiple MAC PDUs, where the set of multiple MAC PDUs are associated with the outer-encoded application-layer packets. The communications manager 920 is capable of, configured to, or operable to support a means for mapping, at a physical layer of the network entity, one or more MAC PDUs of the set of multiple MAC PDUs to a TB of one or more TBs. The communications manager 920 is capable of, configured to, or operable to support a means for broadcasting the one or more TBs, where each TB of the one or more TBs is broadcast via a respective slot.

Additionally, or alternatively, the communications manager 920 may support wireless communication in accordance with examples as disclosed herein. For example, the communications manager 920 is capable of, configured to, or operable to support a means for generating a set of multiple MAC SDUs, where each MAC SDU of the set of multiple MAC SDUs is associated with a respective application-layer packet. The communications manager 920 is capable of, configured to, or operable to support a means for encoding the set of multiple MAC SDUs with an outer code to generate an outer-encoded MAC PDU. The communications manager 920 is capable of, configured to, or operable to support a means for segmenting the outer-encoded MAC PDU into a set of multiple TBs. The communications manager 920 is capable of, configured to, or operable to support a means for broadcasting the set of multiple TBs, where each TB of the set of multiple TBs is broadcast via a respective slot.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for enhanced application layer outer coding, physical or MAC layer outer coding, or both, which may lead a more efficient utilization of communication resources.

Figure 10:
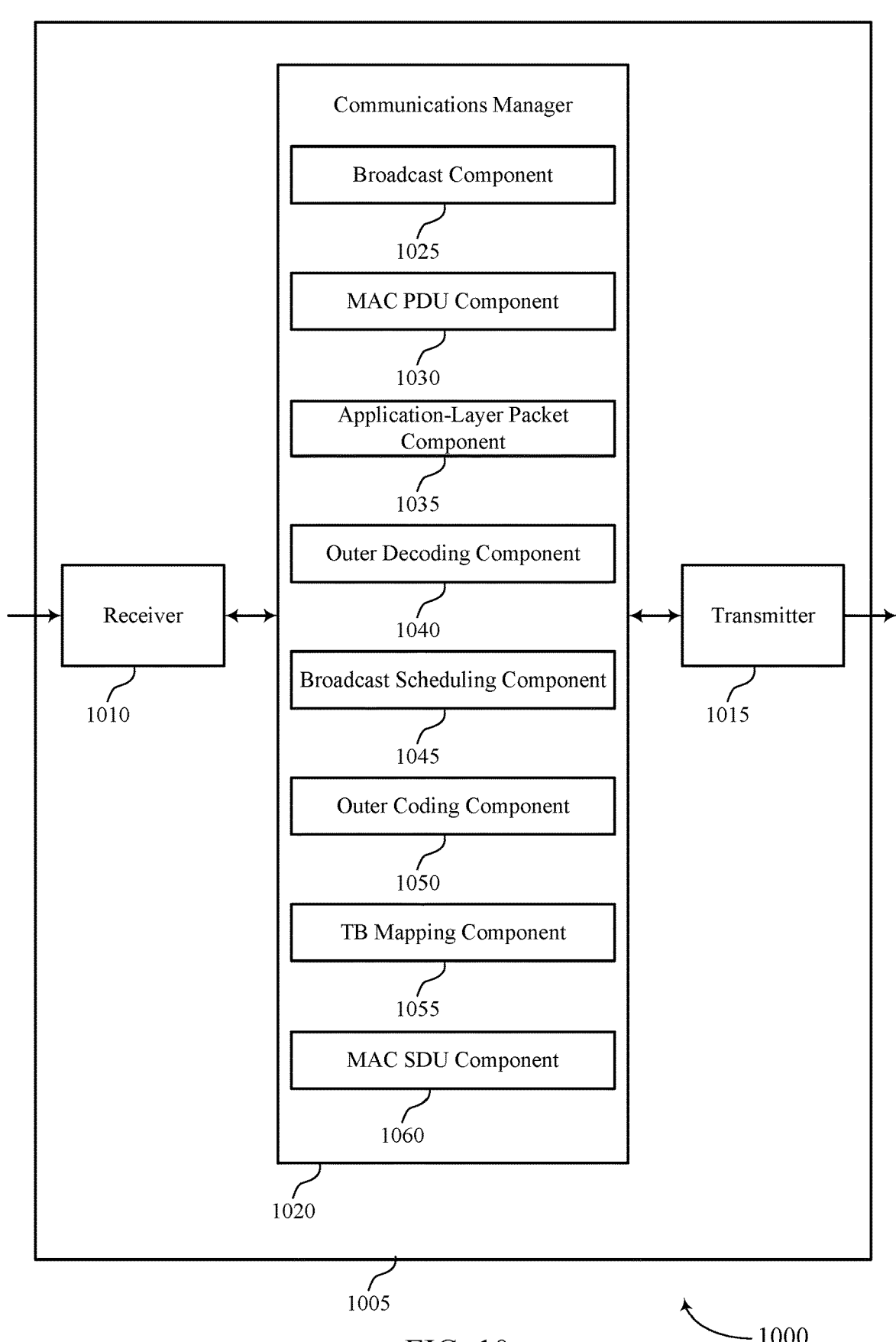

FIG. 10 shows a block diagram 1000 of a device 1005 that supports enhanced outer coding for broadcast communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some aspects, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some aspects, the transmitter 1015 and the receiver 1010 may be co-located in a transceiver, which may include or be coupled with a modem.

The device 1005, or various components thereof, may be an example of means for performing various aspects of enhanced outer coding for broadcast communications as described herein. For example, the communications manager 1020 may include a broadcast component 1025, a MAC PDU component 1030, an application-layer packet component 1035, an outer decoding component 1040, a broadcast scheduling component 1045, an outer coding component 1050, a TB mapping component 1055, a MAC SDU component 1060, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The broadcast component 1025 is capable of, configured to, or operable to support a means for receiving, at a physical layer of the network entity, a set of multiple TBs during one or more slots, where a quantity of TBs received during at least a first slot of the one or more slots is greater than one. The MAC PDU component 1030 is capable of, configured to, or operable to support a means for obtaining, at a MAC layer of the network entity, a set of multiple MAC PDUs from the set of multiple TBs, where each TB of the set of multiple TBs corresponds to a respective MAC PDU of the set of multiple MAC PDUs. The application-layer packet component 1035 is capable of, configured to, or operable to support a means for obtaining, at an application layer of the network entity, outer-encoded application-layer packets, where each MAC PDU of the set of multiple MAC PDUs is associated with a respective outer-encoded application-layer packet of the outer-encoded application-layer packets. The outer decoding component 1040 is capable of, configured to, or operable to support a means for decoding the outer-encoded application-layer packets to obtain a set of multiple application-layer packets.

Additionally, or alternatively, the communications manager 1020 may support wireless communication in accordance with examples as disclosed herein. The broadcast component 1025 is capable of, configured to, or operable to support a means for receiving, at a physical layer of the network entity and via one or more slots, one or more TBs, at least a first TB of the one or more TBs including one or more MAC PDUs, the one or more TBs collectively including a set of multiple MAC PDUs. The MAC PDU component 1030 is capable of, configured to, or operable to support a means for obtaining, at a MAC layer of the network entity, the set of multiple MAC PDUs from the one or more TBs. The application-layer packet component 1035 is capable of, configured to, or operable to support a means for obtaining, at an application layer of the network entity, outer-encoded application-layer packets, where the set of multiple MAC PDUs are associated with the outer-encoded application-layer packets. The outer decoding component 1040 is capable of, configured to, or operable to support a means for decoding the outer-encoded application-layer packets to obtain a set of multiple application-layer packets.

Additionally, or alternatively, the communications manager 1020 may support wireless communication in accordance with examples as disclosed herein. The broadcast scheduling component 1045 is capable of, configured to, or operable to support a means for receiving control information that indicates resources for a set of multiple TBs that include respective portions of an outer-encoded MAC PDU. The MAC PDU component 1030 is capable of, configured to, or operable to support a means for receiving, based on the control information, the outer-encoded MAC PDU. The outer decoding component 1040 is capable of, configured to, or operable to support a means for decoding the outer-encoded MAC PDU to obtain a set of multiple MAC SDUs including the outer-encoded MAC PDU, where each MAC SDU of the set of multiple MAC SDUs is associated with a respective application-layer packet. The application-layer packet component 1035 is capable of, configured to, or operable to support a means for obtaining the respective application-layer packet associated with each MAC SDU of the set of multiple MAC SDUs based on the obtainment of the set of multiple MAC SDUs.

Additionally, or alternatively, the communications manager 1020 may support wireless communication in accordance with examples as disclosed herein. The outer coding component 1050 is capable of, configured to, or operable to support a means for encoding, at an application layer of the network entity, a set of multiple application-layer packets with an application level outer code to generate outer-encoded application-layer packets. The MAC PDU component 1030 is capable of, configured to, or operable to support a means for generating, at a MAC layer of the network entity, a set of multiple MAC PDUs, where each MAC PDU of the set of multiple MAC PDUs is associated with a respective outer-encoded application-layer packet of the outer-encoded application-layer packets. The TB mapping component 1055 is capable of, configured to, or operable to support a means for mapping, at a physical layer of the network entity, each MAC PDU of the set of multiple MAC PDUs to a respective TB of a set of multiple TBs. The broadcast component 1025 is capable of, configured to, or operable to support a means for broadcasting the set of multiple TBs during one or more slots, where a quantity of TBs broadcast during at least a first slot of the one or more slots is greater than one.

Additionally, or alternatively, the communications manager 1020 may support wireless communication in accordance with examples as disclosed herein. The outer coding component 1050 is capable of, configured to, or operable to support a means for encoding, at an application layer of the network entity, a set of multiple application-layer packets with an application level outer code to generate outer-encoded application-layer packets. The MAC PDU component 1030 is capable of, configured to, or operable to support a means for generating, at a MAC layer of the network entity, a set of multiple MAC PDUs, where the set of multiple MAC PDUs are associated with the outer-encoded application-layer packets. The TB mapping component 1055 is capable of, configured to, or operable to support a means for mapping, at a physical layer of the network entity, one or more MAC PDUs of the set of multiple MAC PDUs to a TB of one or more TBs. The broadcast component 1025 is capable of, configured to, or operable to support a means for broadcasting the one or more TBs, where each TB of the one or more TBs is broadcast via a respective slot.

Additionally, or alternatively, the communications manager 1020 may support wireless communication in accordance with examples as disclosed herein. The MAC SDU component 1060 is capable of, configured to, or operable to support a means for generating a set of multiple MAC SDUs, where each MAC SDU of the set of multiple MAC SDUs is associated with a respective application-layer packet. The outer coding component 1050 is capable of, configured to, or operable to support a means for encoding the set of multiple MAC SDUs with an outer code to generate an outer-encoded MAC PDU. The TB mapping component 1055 is capable of, configured to, or operable to support a means for segmenting the outer-encoded MAC PDU into a set of multiple TBs. The broadcast component 1025 is capable of, configured to, or operable to support a means for broadcasting the set of multiple TBs, where each TB of the set of multiple TBs is broadcast via a respective slot.

Figure 11:
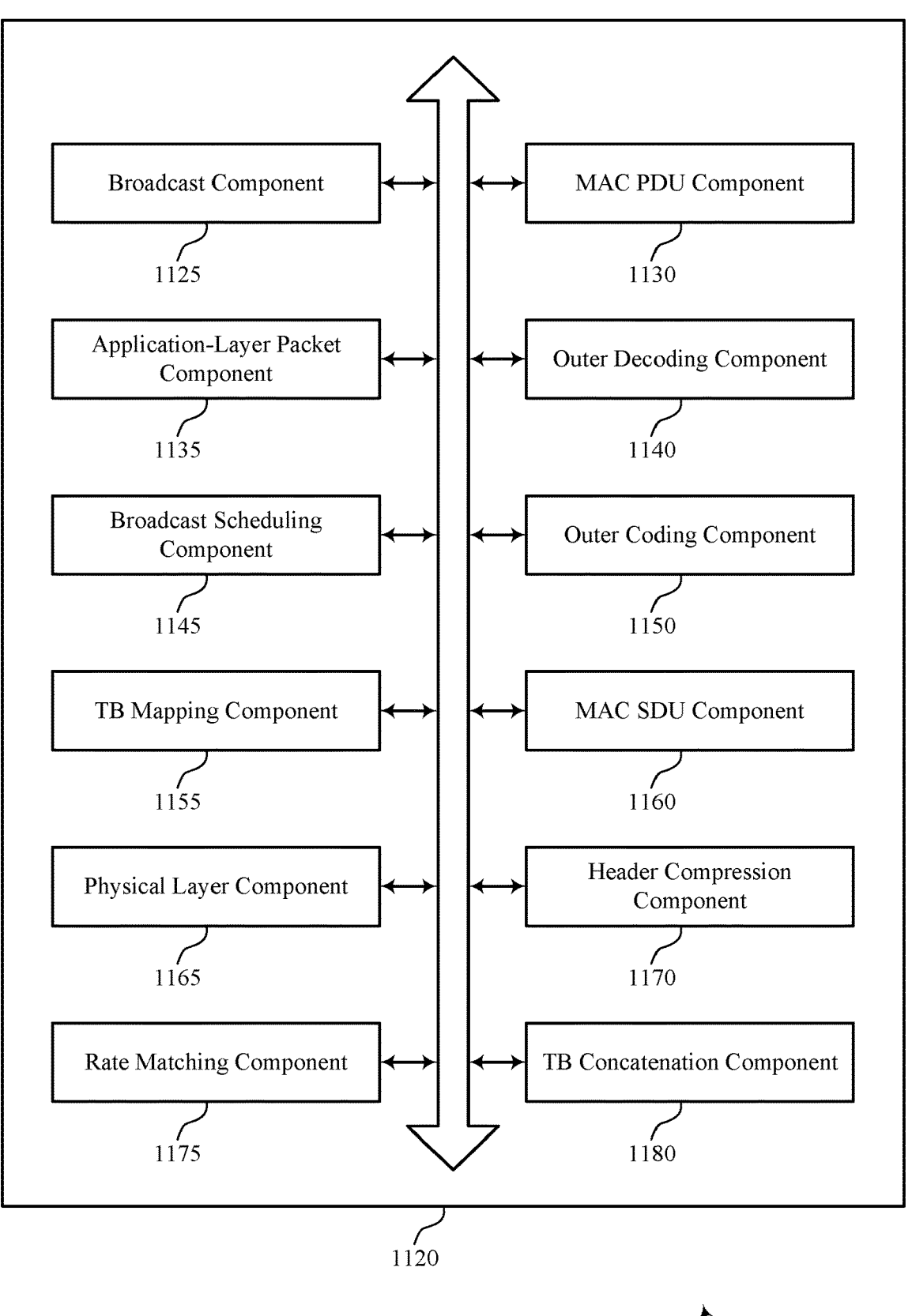
FIG. 11 shows a block diagram of a communications manager that supports enhanced outer coding for broadcast communications in accordance with one or more aspects of the present disclosure.

FIG. 11 shows a block diagram 1100 of a communications manager 1120 that supports enhanced outer coding for broadcast communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of enhanced outer coding for broadcast communications as described herein. For example, the communications manager 1120 may include a broadcast component 1125, a MAC PDU component 1130, an application-layer packet component 1135, an outer decoding component 1140, a broadcast scheduling component 1145, an outer coding component 1150, a TB mapping component 1155, a MAC SDU component 1160, a physical layer component 1165, a header compression component 1170, a rate matching component 1175, a TB concatenation component 1180, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The broadcast component 1125 is capable of, configured to, or operable to support a means for receiving, at a physical layer of the network entity, a set of multiple TBs during one or more slots, where a quantity of TBs received during at least a first slot of the one or more slots is greater than one. The MAC PDU component 1130 is capable of, configured to, or operable to support a means for obtaining, at a MAC layer of the network entity, a set of multiple MAC PDUs from the set of multiple TBs, where each TB of the set of multiple TBs corresponds to a respective MAC PDU of the set of multiple MAC PDUs. The application-layer packet component 1135 is capable of, configured to, or operable to support a means for obtaining, at an application layer of the network entity, outer-encoded application-layer packets, where each MAC PDU of the set of multiple MAC PDUs is associated with a respective outer-encoded application-layer packet of the outer-encoded application-layer packets. The outer decoding component 1140 is capable of, configured to, or operable to support a means for decoding the outer-encoded application-layer packets to obtain a set of multiple application-layer packets.

In some aspects, to support obtaining the set of multiple MAC PDUs, the physical layer component 1165 is capable of, configured to, or operable to support a means for communicating, from the physical layer of the network entity to the MAC layer of the network entity, each TB of the set of multiple TBs.

In some aspects, each TB of the set of multiple TBs corresponds to one or more respective codeblock.

In some aspects, respective codeblocks of each TB of the quantity of TBs are received via the first slot in a sequential order.

In some aspects, the broadcast scheduling component 1145 is capable of, configured to, or operable to support a means for receiving a scheduling grant that indicates the first slot is for a reception of the quantity of TBs.

In some aspects, each TB of the quantity of TBs received via the first slot are rate matched based on a total quantity of codeblocks mapped to the first slot.

In some aspects, codeblocks of each TB of the quantity of TBs received via the first slot are concatenated based on a sequential order of the quantity of TBs.

In some aspects, to receive the scheduling grant, the network entity is configured to receive the scheduling grant via control signaling. In some aspects, the control signaling is a DCI message or a MSI message. In some aspects, the quantity of TBs is received via a PDSCH or a PMCH.

In some aspects, each MAC PDU of the set of multiple MAC PDUs includes a set of multiple headers, each header of the set of multiple headers being associated with a respective layer of a set of multiple layers that includes a MAC layer and other layers above the MAC layer; and one or more headers of the set of multiple headers for each MAC PDU of the set of multiple MAC PDUs are compressed.

In some aspects, the outer-encoded application-layer packets collectively include the set of multiple application-layer packets and one or more parity application-layer packets.

Additionally, or alternatively, the communications manager 1120 may support wireless communication in accordance with examples as disclosed herein. In some aspects, the broadcast component 1125 is capable of, configured to, or operable to support a means for receiving, at a physical layer of the network entity and via one or more slots, one or more TBs, at least a first TB of the one or more TBs including one or more MAC PDUs, the one or more TBs collectively including a set of multiple MAC PDUs. In some aspects, the MAC PDU component 1130 is capable of, configured to, or operable to support a means for obtaining, at a MAC layer of the network entity, the set of multiple MAC PDUs from the one or more TBs. In some aspects, the application-layer packet component 1135 is capable of, configured to, or operable to support a means for obtaining, at an application layer of the network entity, outer-encoded application-layer packets, where the set of multiple MAC PDUs are associated with the outer-encoded application-layer packets. In some aspects, the outer decoding component 1140 is capable of, configured to, or operable to support a means for decoding the outer-encoded application-layer packets to obtain a set of multiple application-layer packets.

In some aspects, to support obtaining the set of multiple MAC PDUs, the physical layer component 1165 is capable of, configured to, or operable to support a means for communicating, from the physical layer of the network entity to the MAC layer of the network entity, information associated with at least one codeblock of each of the one or more TBs.

In some aspects, each application-layer packet of the set of multiple application-layer packets corresponds to one or more codeblocks of a TB among the one or more TBs.

In some aspects, each MAC PDU of the set of multiple MAC PDUs includes a set of multiple headers, each header of the set of multiple headers being associated with a respective layer of a set of multiple layers; and one or more headers of the set of multiple headers for each MAC PDU of the set of multiple MAC PDUs are compressed.

In some aspects, the outer-encoded application-layer packets collectively include the set of multiple application-layer packets and one or more parity application-layer packets.

Additionally, or alternatively, the communications manager 1120 may support wireless communication in accordance with examples as disclosed herein. The broadcast scheduling component 1145 is capable of, configured to, or operable to support a means for receiving control information that indicates resources for a set of multiple TBs that include respective portions of an outer-encoded MAC PDU. In some aspects, the MAC PDU component 1130 is capable of, configured to, or operable to support a means for receiving, based on the control information, the outer-encoded MAC PDU. In some aspects, the outer decoding component 1140 is capable of, configured to, or operable to support a means for decoding the outer-encoded MAC PDU to obtain a set of multiple MAC SDUs including the outer-encoded MAC PDU, where each MAC SDU of the set of multiple MAC SDUs is associated with a respective application-layer packet. In some aspects, the application-layer packet component 1135 is capable of, configured to, or operable to support a means for obtaining the respective application-layer packet associated with each MAC SDU of the set of multiple MAC SDUs based on the obtainment of the set of multiple MAC SDUs.

In some aspects, the outer decoding component 1140 is capable of, configured to, or operable to support a means for generating a decoding message for the set of multiple MAC SDUs based on whether each MAC SDU of the set of multiple MAC SDUs was successfully decoded.

In some aspects, the decoding message is a success message indicative that each MAC SDU of the set of multiple MAC SDUs was successfully decoded.

In some aspects, the decoding message is a failure message indicative that one or more MAC SDUs of the set of multiple MAC SDUs were unsuccessfully decoded.

In some aspects, the control information further indicates at least one of respective indices of the set of multiple TBs, an indication of an outer code used for the outer-encoded MAC PDU, or a coding rate of the outer code.

In some aspects, the outer code includes one of a Raptor code, a RaptorQ code, or a modified XOR code.

In some aspects, the outer code is a supplemental ECC.

In some aspects, to support receiving the control information, the broadcast scheduling component 1145 is capable of, configured to, or operable to support a means for receiving one or more repetitions of the control information.

In some aspects, a modulation and coding scheme used for the control information is associated with a lower useful transmitted bit-to-total transmitted bit ratio than a second modulation and coding scheme used for a second control information that is not associated with the outer-encoded MAC PDU.

In some aspects, the control information is MSI.

In some aspects, the outer-encoded MAC PDU includes a concatenation of the set of multiple MAC SDUs that is appended with a set of multiple parity bits.

In some aspects, a quantity of bits of the outer-encoded MAC PDU is based on a quantity of the set of multiple TBs, a quantity of a set of multiple codeblocks in a TB, and a quantity of a set of multiple parity bits.

In some aspects, the quantity of the set of multiple parity bits is an integer multiple of a quantity of bits of a codeblock.

Additionally, or alternatively, the communications manager 1120 may support wireless communication in accordance with examples as disclosed herein. The outer coding component 1150 is capable of, configured to, or operable to support a means for encoding, at an application layer of the network entity, a set of multiple application-layer packets with an application level outer code to generate outer-encoded application-layer packets. In some aspects, the MAC PDU component 1130 is capable of, configured to, or operable to support a means for generating, at a MAC layer of the network entity, a set of multiple MAC PDUs, where each MAC PDU of the set of multiple MAC PDUs is associated with a respective outer-encoded application-layer packet of the outer-encoded application-layer packets. The TB mapping component 1155 is capable of, configured to, or operable to support a means for mapping, at a physical layer of the network entity, each MAC PDU of the set of multiple MAC PDUs to a respective TB of a set of multiple TBs. In some aspects, the broadcast component 1125 is capable of, configured to, or operable to support a means for broadcasting the set of multiple TBs during one or more slots, where a quantity of TBs broadcast during at least a first slot of the one or more slots is greater than one.

In some aspects, each MAC PDU of the set of multiple MAC PDUs corresponds to a one or more respective codeblocks.

In some aspects, the rate matching component 1175 is capable of, configured to, or operable to support a means for performing, on a slot-by-slot basis, rate matching across TBs mapped to a slot of the one or more slots, where the rate matching across the TBs is based on a total quantity of codeblocks mapped to the slot.

In some aspects, the TB concatenation component 1180 is capable of, configured to, or operable to support a means for concatenating, based on a sequential order of the set of multiple TBs, each codeblock within a slot of the one or more slots in preparation for broadcast of the set of multiple TBs.

In some aspects, the broadcast scheduling component 1145 is capable of, configured to, or operable to support a means for broadcasting a scheduling grant that indicates the first slot is for the broadcast of the quantity of TBs.

In some aspects, to broadcast the scheduling grant, the network entity is configured to broadcast the scheduling grant via control signaling. In some aspects, the control signaling is a DCI message or a MSI message. In some aspects, the quantity of TBs is broadcast via a PDSCH or a PMCH.

In some aspects, the header compression component 1170 is capable of, configured to, or operable to support a means for compress one or more headers for each MAC PDU of the set of multiple MAC PDUs.

In some aspects, the outer-encoded application-layer packets collectively include the set of multiple application-layer packets and one or more parity application-layer packets.

In some aspects, the application level outer code is a supplemental ECC.

Additionally, or alternatively, the communications manager 1120 may support wireless communication in accordance with examples as disclosed herein. In some aspects, the outer coding component 1150 is capable of, configured to, or operable to support a means for encoding, at an application layer of the network entity, a set of multiple application-layer packets with an application level outer code to generate outer-encoded application-layer packets. In some aspects, the MAC PDU component 1130 is capable of, configured to, or operable to support a means for generating, at a MAC layer of the network entity, a set of multiple MAC PDUs, where the set of multiple MAC PDUs are associated with the outer-encoded application-layer packets. In some aspects, the TB mapping component 1155 is capable of, configured to, or operable to support a means for mapping, at a physical layer of the network entity, one or more MAC PDUs of the set of multiple MAC PDUs to a TB of one or more TBs. In some aspects, the broadcast component 1125 is capable of, configured to, or operable to support a means for broadcasting the one or more TBs, where each TB of the one or more TBs is broadcast via a respective slot.

In some aspects, each application layer packet of the set of multiple application-layer packets corresponds to one or more codeblocks of a single TB among the one or more TBs.

In some aspects, the broadcast scheduling component 1145 is capable of, configured to, or operable to support a means for broadcasting a scheduling grant that indicates a first slot for the broadcast of the TB.

In some aspects, to broadcast the scheduling grant, the network entity is configured to broadcast the scheduling grant via control signaling. In some aspects, the control signaling is a DCI message or a MSI message. In some aspects, the TB is broadcast via a PDSCH or a PMCH.

In some aspects, the header compression component 1170 is capable of, configured to, or operable to support a means for compressing one or more headers for each MAC PDU of the set of multiple MAC PDUs.

In some aspects, the outer-encoded application-layer packets collectively include the set of multiple application-layer packets and one or more parity application-layer packets.

In some aspects, the application level outer code is a supplemental ECC.

Additionally, or alternatively, the communications manager 1120 may support wireless communication in accordance with examples as disclosed herein. The MAC SDU component 1160 is capable of, configured to, or operable to support a means for generating a set of multiple MAC SDUs, where each MAC SDU of the set of multiple MAC SDUs is associated with a respective application-layer packet. In some aspects, the outer coding component 1150 is capable of, configured to, or operable to support a means for encoding the set of multiple MAC SDUs with an outer code to generate an outer-encoded MAC PDU. In some aspects, the TB mapping component 1155 is capable of, configured to, or operable to support a means for segmenting the outer-encoded MAC PDU into a set of multiple TBs. In some aspects, the broadcast component 1125 is capable of, configured to, or operable to support a means for broadcasting the set of multiple TBs, where each TB of the set of multiple TBs is broadcast via a respective slot.

In some aspects, the broadcast scheduling component 1145 is capable of, configured to, or operable to support a means for broadcasting control information that indicates the set of multiple TBs include respective segments of the outer-encoded MAC PDU.

In some aspects, the control information is MSI and further indicates respective indices of the set of multiple TBs, an indication of the outer code, or a coding rate of the outer code.

In some aspects, to support broadcasting the control information, the broadcast scheduling component 1145 is capable of, configured to, or operable to support a means for broadcasting one or more repetitions of the control information.

In some aspects, a modulation and coding scheme used for the control information is associated with a lower useful transmitted bit-to-total transmitted bit ratio than a second modulation and coding scheme used for a second control information that is not associated with the outer-encoded MAC PDU.

In some aspects, to support encoding the set of multiple MAC SDUs with the outer code, the outer coding component 1150 is capable of, configured to, or operable to support a means for concatenating the set of multiple MAC SDUs to generate a concatenated MAC SDU. In some aspects, to support encoding the set of multiple MAC SDUs with the outer code, the outer coding component 1150 is capable of, configured to, or operable to support a means for encoding the concatenated MAC SDU with the outer code to generate a set of multiple parity bits. In some aspects, to support encoding the set of multiple MAC SDUs with the outer code, the outer coding component 1150 is capable of, configured to, or operable to support a means for appending the concatenated MAC SDU with the set of multiple parity bits to generate the outer-encoded MAC PDU, where the outer-encoded MAC PDU includes the concatenated MAC SDU and the set of multiple parity bits.

In some aspects, the outer code includes one of a Raptor code, a RaptorQ code, or a modified XOR code.

In some aspects, the outer code is a supplemental ECC.

In some aspects, a quantity of bits of the outer-encoded MAC PDU is based on a quantity of the set of multiple TBs, a quantity of a set of multiple codeblocks in a TB, and a quantity of a set of multiple parity bits.

Figure 12:
FIG. 12 shows a diagram of a system including a device that supports enhanced outer coding for broadcast communications in accordance with one or more aspects of the present disclosure.

FIG. 12 shows a diagram of a system 1200 including a device 1205 that supports enhanced outer coding for broadcast communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some aspects, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some aspects, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting enhanced outer coding for broadcast communications). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some implementations, the at least one processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the at least one processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with ULEs 115 in cooperation with other network entities 105. In some aspects, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for receiving, at a physical layer of the network entity, a set of multiple TBs during one or more slots, where a quantity of TBs received during at least a first slot of the one or more slots is greater than one. The communications manager 1220 is capable of, configured to, or operable to support a means for obtaining, at a MAC layer of the network entity, a set of multiple MAC PDUs from the set of multiple TBs, where each TB of the set of multiple TBs corresponds to a respective MAC PDU of the set of multiple MAC PDUs. The communications manager 1220 is capable of, configured to, or operable to support a means for obtaining, at an application layer of the network entity, outer-encoded application-layer packets, where each MAC PDU of the set of multiple MAC PDUs is associated with a respective outer-encoded application-layer packet of the outer-encoded application-layer packets. The communications manager 1220 is capable of, configured to, or operable to support a means for decoding the outer-encoded application-layer packets to obtain a set of multiple application-layer packets.

Additionally, or alternatively, the communications manager 1220 may support wireless communication in accordance with examples as disclosed herein. For example, the communications manager 1220 is capable of, configured to, or operable to support a means for receiving, at a physical layer of the network entity and via one or more slots, one or more TBs, at least a first TB of the one or more TBs including one or more MAC PDUs, the one or more TBs collectively including a set of multiple MAC PDUs. The communications manager 1220 is capable of, configured to, or operable to support a means for obtaining, at a MAC layer of the network entity, the set of multiple MAC PDUs from the one or more TBs. The communications manager 1220 is capable of, configured to, or operable to support a means for obtaining, at an application layer of the network entity, outer-encoded application-layer packets, where the set of multiple MAC PDUs are associated with the outer-encoded application-layer packets. The communications manager 1220 is capable of, configured to, or operable to support a means for decoding the outer-encoded application-layer packets to obtain a set of multiple application-layer packets.

Additionally, or alternatively, the communications manager 1220 may support wireless communication in accordance with examples as disclosed herein. For example, the communications manager 1220 is capable of, configured to, or operable to support a means for receiving control information that indicates resources for a set of multiple TBs that include respective portions of an outer-encoded MAC PDU. The communications manager 1220 is capable of, configured to, or operable to support a means for receiving, based on the control information, the outer-encoded MAC PDU. The communications manager 1220 is capable of, configured to, or operable to support a means for decoding the outer-encoded MAC PDU to obtain a set of multiple MAC SDUs including the outer-encoded MAC PDU, where each MAC SDU of the set of multiple MAC SDUs is associated with a respective application-layer packet. The communications manager 1220 is capable of, configured to, or operable to support a means for obtaining the respective application-layer packet associated with each MAC SDU of the set of multiple MAC SDUs based on the obtainment of the set of multiple MAC SDUs.

Additionally, or alternatively, the communications manager 1220 may support wireless communication in accordance with examples as disclosed herein. For example, the communications manager 1220 is capable of, configured to, or operable to support a means for encoding, at an application layer of the network entity, a set of multiple application-layer packets with an application level outer code to generate outer-encoded application-layer packets. The communications manager 1220 is capable of, configured to, or operable to support a means for generating, at a MAC layer of the network entity, a set of multiple MAC PDUs, where each MAC PDU of the set of multiple MAC PDUs is associated with a respective outer-encoded application-layer packet of the outer-encoded application-layer packets. The communications manager 1220 is capable of, configured to, or operable to support a means for mapping, at a physical layer of the network entity, each MAC PDU of the set of multiple MAC PDUs to a respective TB of a set of multiple TBs. The communications manager 1220 is capable of, configured to, or operable to support a means for broadcasting the set of multiple TBs during one or more slots, where a quantity of TBs broadcast during at least a first slot of the one or more slots is greater than one.

Additionally, or alternatively, the communications manager 1220 may support wireless communication in accordance with examples as disclosed herein. For example, the communications manager 1220 is capable of, configured to, or operable to support a means for encoding, at an application layer of the network entity, a set of multiple application-layer packets with an application level outer code to generate outer-encoded application-layer packets. The communications manager 1220 is capable of, configured to, or operable to support a means for generating, at a MAC layer of the network entity, a set of multiple MAC PDUs, where the set of multiple MAC PDUs are associated with the outer-encoded application-layer packets. The communications manager 1220 is capable of, configured to, or operable to support a means for mapping, at a physical layer of the network entity, one or more MAC PDUs of the set of multiple MAC PDUs to a TB of one or more TBs. The communications manager 1220 is capable of, configured to, or operable to support a means for broadcasting the one or more TBs, where each TB of the one or more TBs is broadcast via a respective slot.

Additionally, or alternatively, the communications manager 1220 may support wireless communication in accordance with examples as disclosed herein. For example, the communications manager 1220 is capable of, configured to, or operable to support a means for generating a set of multiple MAC SDUs, where each MAC SDU of the set of multiple MAC SDUs is associated with a respective application-layer packet. The communications manager 1220 is capable of, configured to, or operable to support a means for encoding the set of multiple MAC SDUs with an outer code to generate an outer-encoded MAC PDU. The communications manager 1220 is capable of, configured to, or operable to support a means for segmenting the outer-encoded MAC PDU into a set of multiple TBs. The communications manager 1220 is capable of, configured to, or operable to support a means for broadcasting the set of multiple TBs, where each TB of the set of multiple TBs is broadcast via a respective slot.

By including or configuring the communications manager 1220 in accordance with examples as described herein, the device 1205 may support techniques for enhanced application layer outer coding, physical or MAC layer outer coding, or both, which may lead to improved communication reliability, a more efficient utilization of communication resources, and improved coordination between devices.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of enhanced outer coding for broadcast communications as described herein, or the at least one processor 1235 and the at least one memory 1225 may be otherwise configured to, individually or collectively, perform or support such operations.

FIG. 13 shows a flowchart illustrating a method 1300 that supports enhanced outer coding for broadcast communications in accordance with aspects of the present disclosure. The operations of the method 1300 may be implemented by a network entity or its components as described herein. For example, the operations of the method 1300 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1305, the method may include receiving, at a physical layer of the network entity, a set of multiple TBs during one or more slots, where a quantity of TBs received during at least a first slot of the one or more slots is greater than one. The operations of block 1305 may be performed in accordance with examples as disclosed herein. In some aspects, aspects of the operations of 1305 may be performed by a broadcast component 1125 as described with reference to FIG. 11.

At 1310, the method may include obtaining, at a MAC layer of the network entity, a set of multiple MAC PDUs from the set of multiple TBs, where each TB of the set of multiple TBs corresponds to a respective MAC PDU of the set of multiple MAC PDUs. The operations of block 1310 may be performed in accordance with examples as disclosed herein. In some aspects, aspects of the operations of 1310 may be performed by a MAC PDU component 1130 as described with reference to FIG. 11.

At 1315, the method may include obtaining, at an application layer of the network entity, outer-encoded application-layer packets, where each MAC PDU of the set of multiple MAC PDUs is associated with a respective outer-encoded application-layer packet of the outer-encoded application-layer packets. The operations of block 1315 may be performed in accordance with examples as disclosed herein. In some aspects, aspects of the operations of 1315 may be performed by an application-layer packet component 1135 as described with reference to FIG. 11.

At 1320, the method may include decoding the outer-encoded application-layer packets to obtain a set of multiple application-layer packets. The operations of block 1320 may be performed in accordance with examples as disclosed herein. In some aspects, aspects of the operations of 1320 may be performed by an outer decoding component 1140 as described with reference to FIG. 11.

FIG. 14 shows a flowchart illustrating a method 1400 that supports enhanced outer coding for broadcast communications in accordance with aspects of the present disclosure. The operations of the method 1400 may be implemented by a network entity or its components as described herein. For example, the operations of the method 1400 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1405, the method may include receiving, at a physical layer of the network entity, a set of multiple TBs during one or more slots, where a quantity of TBs received during at least a first slot of the one or more slots is greater than one. The operations of block 1405 may be performed in accordance with examples as disclosed herein. In some aspects, aspects of the operations of 1405 may be performed by a broadcast component 1125 as described with reference to FIG. 11.

At 1410, the method may include communicating, from the physical layer of the network entity to a MAC layer of the network entity, each TB of the set of multiple TBs. The operations of block 1410 may be performed in accordance with examples as disclosed herein. In some aspects, aspects of the operations of 1410 may be performed by a physical layer component 1165 as described with reference to FIG. 11.

At 1415, the method may include obtaining, at the MAC layer of the network entity, a set of multiple MAC PDUs from the set of multiple TBs, where each TB of the set of multiple TBs corresponds to a respective MAC PDU of the set of multiple MAC PDUs. The operations of block 1415 may be performed in accordance with examples as disclosed herein. In some aspects, aspects of the operations of 1415 may be performed by a MAC PDU component 1130 as described with reference to FIG. 11.

At 1420, the method may include obtaining, at an application layer of the network entity, outer-encoded application-layer packets, where each MAC PDU of the set of multiple MAC PDUs is associated with a respective outer-encoded application-layer packet of the outer-encoded application-layer packets. The operations of block 1420 may be performed in accordance with examples as disclosed herein. In some aspects, aspects of the operations of 1420 may be performed by an application-layer packet component 1135 as described with reference to FIG. 11.

At 1425, the method may include decoding the outer-encoded application-layer packets to obtain a set of multiple application-layer packets. The operations of block 1425 may be performed in accordance with examples as disclosed herein. In some aspects, aspects of the operations of 1425 may be performed by an outer decoding component 1140 as described with reference to FIG. 11.

FIG. 15 shows a flowchart illustrating a method 1500 that supports enhanced outer coding for broadcast communications in accordance with aspects of the present disclosure. The operations of the method 1500 may be implemented by a network entity or its components as described herein. For example, the operations of the method 1500 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1505, the method may include receiving, at a physical layer of the network entity and via one or more slots, one or more TBs, at least a first TB of the one or more TBs including one or more MAC PDUs, the one or more TBs collectively including a set of multiple MAC PDUs. The operations of block 1505 may be performed in accordance with examples as disclosed herein. In some aspects, aspects of the operations of 1505 may be performed by a broadcast component 1125 as described with reference to FIG. 11.

At 1510, the method may include obtaining, at a MAC layer of the network entity, the set of multiple MAC PDUs from the one or more TBs. The operations of block 1510 may be performed in accordance with examples as disclosed herein. In some aspects, aspects of the operations of 1510 may be performed by a MAC PDU component 1130 as described with reference to FIG. 11.

At 1515, the method may include obtaining, at an application layer of the network entity, outer-encoded application-layer packets, where the set of multiple MAC PDUs are associated with the outer-encoded application-layer packets. The operations of block 1515 may be performed in accordance with examples as disclosed herein. In some aspects, aspects of the operations of 1515 may be performed by an application-layer packet component 1135 as described with reference to FIG. 11.

At 1520, the method may include decoding the outer-encoded application-layer packets to obtain a set of multiple application-layer packets. The operations of block 1520 may be performed in accordance with examples as disclosed herein. In some aspects, aspects of the operations of 1520 may be performed by an outer decoding component 1140 as described with reference to FIG. 11.

FIG. 16 shows a flowchart illustrating a method 1600 that supports enhanced outer coding for broadcast communications in accordance with aspects of the present disclosure. The operations of the method 1600 may be implemented by a network entity or its components as described herein. For example, the operations of the method 1600 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1605, the method may include receiving, at a physical layer of the network entity and via one or more slots, one or more TBs, at least a first TB of the one or more TBs including one or more MAC PDUs, the one or more TBs collectively including a set of multiple MAC PDUs. The operations of block 1605 may be performed in accordance with examples as disclosed herein. In some aspects, aspects of the operations of 1605 may be performed by a broadcast component 1125 as described with reference to FIG. 11.

At 1610, the method may include communicating, from the physical layer of the network entity to a MAC layer of the network entity, information associated with at least one codeblock of each of the one or more TBs. The operations of block 1610 may be performed in accordance with examples as disclosed herein. In some aspects, aspects of the operations of 1610 may be performed by a physical layer component 1165 as described with reference to FIG. 11.

At 1615, the method may include obtaining, at the MAC layer of the network entity, the set of multiple MAC PDUs from the one or more TBs. The operations of block 1615 may be performed in accordance with examples as disclosed herein. In some aspects, aspects of the operations of 1615 may be performed by a MAC PDU component 1130 as described with reference to FIG. 11.

At 1620, the method may include obtaining, at an application layer of the network entity, outer-encoded application-layer packets, where the set of multiple MAC PDUs are associated with the outer-encoded application-layer packets. The operations of block 1620 may be performed in accordance with examples as disclosed herein. In some aspects, aspects of the operations of 1620 may be performed by an application-layer packet component 1135 as described with reference to FIG. 11.

At 1625, the method may include decoding the outer-encoded application-layer packets to obtain a set of multiple application-layer packets. The operations of block 1625 may be performed in accordance with examples as disclosed herein. In some aspects, aspects of the operations of 1625 may be performed by an outer decoding component 1140 as described with reference to FIG. 11.

FIG. 17 shows a flowchart illustrating a method 1700 that supports enhanced outer coding for broadcast communications in accordance with aspects of the present disclosure. The operations of the method 1700 may be implemented by a network entity or its components as described herein. For example, the operations of the method 1700 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1705, the method may include receiving control information that indicates resources for a set of multiple TBs that include respective portions of an outer-encoded MAC PDU. The operations of block 1705 may be performed in accordance with examples as disclosed herein. In some aspects, aspects of the operations of 1705 may be performed by a broadcast scheduling component 1145 as described with reference to FIG. 11.

At 1710, the method may include receiving, based on the control information, the outer-encoded MAC PDU. The operations of block 1710 may be performed in accordance with examples as disclosed herein. In some aspects, aspects of the operations of 1710 may be performed by a MAC PDU component 1130 as described with reference to FIG. 11.

At 1715, the method may include decoding the outer-encoded MAC PDU to obtain a set of multiple MAC SDUs including the outer-encoded MAC PDU, where each MAC SDU of the set of multiple MAC SDUs is associated with a respective application-layer packet. The operations of block 1715 may be performed in accordance with examples as disclosed herein. In some aspects, aspects of the operations of 1715 may be performed by an outer decoding component 1140 as described with reference to FIG. 11.

At 1720, the method may include obtaining the respective application-layer packet associated with each MAC SDU of the set of multiple MAC SDUs based on the obtainment of the set of multiple MAC SDUs. The operations of block 1720 may be performed in accordance with examples as disclosed herein. In some aspects, aspects of the operations of 1720 may be performed by an application-layer packet component 1135 as described with reference to FIG. 11.

FIG. 18 shows a flowchart illustrating a method 1800 that supports enhanced outer coding for broadcast communications in accordance with aspects of the present disclosure. The operations of the method 1800 may be implemented by a network entity or its components as described herein. For example, the operations of the method 1800 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1805, the method may include receiving control information that indicates resources for a set of multiple TBs that include respective portions of an outer-encoded MAC PDU.

The operations of block 1805 may be performed in accordance with examples as disclosed herein. In some aspects, aspects of the operations of 1805 may be performed by a broadcast scheduling component 1145 as described with reference to FIG. 11.

At 1810, the method may include receiving, based on the control information, the outer-encoded MAC PDU. The operations of block 1810 may be performed in accordance with examples as disclosed herein. In some aspects, aspects of the operations of 1810 may be performed by a MAC PDU component 1130 as described with reference to FIG. 11.

At 1815, the method may include decoding the outer-encoded MAC PDU to obtain a set of multiple MAC SDUs including the outer-encoded MAC PDU, where each MAC SDU of the set of multiple MAC SDUs is associated with a respective application-layer packet. The operations of block 1815 may be performed in accordance with examples as disclosed herein. In some aspects, aspects of the operations of 1815 may be performed by an outer decoding component 1140 as described with reference to FIG. 11.

At 1820, the method may include generating a decoding message for the set of multiple MAC SDUs based on whether each MAC SDU of the set of multiple MAC SDUs was successfully decoded. The operations of block 1820 may be performed in accordance with examples as disclosed herein. In some aspects, aspects of the operations of 1820 may be performed by an outer decoding component 1140 as described with reference to FIG. 11.

At 1825, the method may include obtaining the respective application-layer packet associated with each MAC SDU of the set of multiple MAC SDUs based on the obtainment of the set of multiple MAC SDUs. The operations of block 1825 may be performed in accordance with examples as disclosed herein. In some aspects, aspects of the operations of 1825 may be performed by an application-layer packet component 1135 as described with reference to FIG. 11.

FIG. 19 shows a flowchart illustrating a method 1900 that supports enhanced outer coding for broadcast communications in accordance with aspects of the present disclosure. The operations of the method 1900 may be implemented by a network entity or its components as described herein. For example, the operations of the method 1900 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 1905, the method may include encoding, at an application layer of the network entity, a set of multiple application-layer packets with an application level outer code to generate outer-encoded application-layer packets. The operations of block 1905 may be performed in accordance with examples as disclosed herein. In some aspects, aspects of the operations of 1905 may be performed by an outer coding component 1150 as described with reference to FIG. 11.

At 1910, the method may include generating, at a MAC layer of the network entity, a set of multiple MAC PDUs, where each MAC PDU of the set of multiple MAC PDUs is associated with a respective outer-encoded application-layer packet of the outer-encoded application-layer packets. The operations of block 1910 may be performed in accordance with examples as disclosed herein. In some aspects, aspects of the operations of 1910 may be performed by a MAC PDU component 1130 as described with reference to FIG. 11.

At 1915, the method may include mapping, at a physical layer of the network entity, each MAC PDU of the set of multiple MAC PDUs to a respective TB of a set of multiple TBs. The operations of block 1915 may be performed in accordance with examples as disclosed herein. In some aspects, aspects of the operations of 1915 may be performed by a TB mapping component 1155 as described with reference to FIG. 11.

At 1920, the method may include broadcasting the set of multiple TBs during one or more slots, where a quantity of TBs broadcast during at least a first slot of the one or more slots is greater than one. The operations of block 1920 may be performed in accordance with examples as disclosed herein. In some aspects, aspects of the operations of 1920 may be performed by a broadcast component 1125 as described with reference to FIG. 11.

FIG. 20 shows a flowchart illustrating a method 2000 that supports enhanced outer coding for broadcast communications in accordance with aspects of the present disclosure. The operations of the method 2000 may be implemented by a network entity or its components as described herein. For example, the operations of the method 2000 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 2005, the method may include encoding, at an application layer of the network entity, a set of multiple application-layer packets with an application level outer code to generate outer-encoded application-layer packets. The operations of block 2005 may be performed in accordance with examples as disclosed herein. In some aspects, aspects of the operations of 2005 may be performed by an outer coding component 1150 as described with reference to FIG. 11.

At 2010, the method may include generating, at a MAC layer of the network entity, a set of multiple MAC PDUs, where each MAC PDU of the set of multiple MAC PDUs is associated with a respective outer-encoded application-layer packet of the outer-encoded application-layer packets. The operations of block 2010 may be performed in accordance with examples as disclosed herein. In some aspects, aspects of the operations of 2010 may be performed by a MAC PDU component 1130 as described with reference to FIG. 11.

At 2015, the method may include mapping, at a physical layer of the network entity, each MAC PDU of the set of multiple MAC PDUs to a respective TB of a set of multiple TBs. The operations of block 2015 may be performed in accordance with examples as disclosed herein. In some aspects, aspects of the operations of 2015 may be performed by a TB mapping component 1155 as described with reference to FIG. 11.

At 2020, the method may include broadcasting a scheduling grant that indicates a first slot is for the broadcast of a quantity of TBs. The operations of block 2020 may be performed in accordance with examples as disclosed herein. In some aspects, aspects of the operations of 2020 may be performed by a broadcast scheduling component 1145 as described with reference to FIG. 11.

At 2025, the method may include broadcasting the set of multiple TBs during one or more slots, where the quantity of TBs broadcast during at least the first slot of the one or more slots is greater than one. The operations of block 2025 may be performed in accordance with examples as disclosed herein. In some aspects, aspects of the operations of 2025 may be performed by a broadcast component 1125 as described with reference to FIG. 11.

FIG. 21 shows a flowchart illustrating a method 2100 that supports enhanced outer coding for broadcast communications in accordance with aspects of the present disclosure. The operations of the method 2100 may be implemented by a network entity or its components as described herein. For example, the operations of the method 2100 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 2105, the method may include encoding, at an application layer of the network entity, a set of multiple application-layer packets with an application level outer code to generate outer-encoded application-layer packets. The operations of block 2105 may be performed in accordance with examples as disclosed herein. In some aspects, aspects of the operations of 2105 may be performed by an outer coding component 1150 as described with reference to FIG. 11.

At 2110, the method may include generating, at a MAC layer of the network entity, a set of multiple MAC PDUs, where the set of multiple MAC PDUs are associated with the outer-encoded application-layer packets. The operations of block 2110 may be performed in accordance with examples as disclosed herein. In some aspects, aspects of the operations of 2110 may be performed by a MAC PDU component 1130 as described with reference to FIG. 11.

At 2115, the method may include mapping, at a physical layer of the network entity, one or more MAC PDUs of the set of multiple MAC PDUs to a TB of one or more TBs. The operations of block 2115 may be performed in accordance with examples as disclosed herein. In some aspects, aspects of the operations of 2115 may be performed by a TB mapping component 1155 as described with reference to FIG. 11.

At 2120, the method may include broadcasting the one or more TBs, where each TB of the one or more TBs is broadcast via a respective slot. The operations of block 2120 may be performed in accordance with examples as disclosed herein. In some aspects, aspects of the operations of 2120 may be performed by a broadcast component 1125 as described with reference to FIG. 11.

FIG. 22 shows a flowchart illustrating a method 2200 that supports enhanced outer coding for broadcast communications in accordance with aspects of the present disclosure. The operations of the method 2200 may be implemented by a network entity or its components as described herein. For example, the operations of the method 2200 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 2205, the method may include encoding, at an application layer of the network entity, a set of multiple application-layer packets with an application level outer code to generate outer-encoded application-layer packets. The operations of block 2205 may be performed in accordance with examples as disclosed herein. In some aspects, aspects of the operations of 2205 may be performed by an outer coding component 1150 as described with reference to FIG. 11.

At 2210, the method may include generating, at a MAC layer of the network entity, a set of multiple MAC PDUs, where the set of multiple MAC PDUs are associated with the outer-encoded application-layer packets. The operations of block 2210 may be performed in accordance with examples as disclosed herein. In some aspects, aspects of the operations of 2210 may be performed by a MAC PDU component 1130 as described with reference to FIG. 11.

At 2215, the method may include mapping, at a physical layer of the network entity, one or more MAC PDUs of the set of multiple MAC PDUs to a TB of one or more TBs. The operations of block 2215 may be performed in accordance with examples as disclosed herein. In some aspects, aspects of the operations of 2215 may be performed by a TB mapping component 1155 as described with reference to FIG. 11.

At 2220, the method may include broadcasting a scheduling grant that indicates a first slot for the broadcast of the TB. The operations of block 2220 may be performed in accordance with examples as disclosed herein. In some aspects, aspects of the operations of 2220 may be performed by a broadcast scheduling component 1145 as described with reference to FIG. 11.

At 2225, the method may include broadcasting the one or more TBs, where each TB of the one or more TBs is broadcast via a respective slot. The operations of block 2225 may be performed in accordance with examples as disclosed herein. In some aspects, aspects of the operations of 2225 may be performed by a broadcast component 1125 as described with reference to FIG. 11.

FIG. 23 shows a flowchart illustrating a method 2300 that supports enhanced outer coding for broadcast communications in accordance with aspects of the present disclosure. The operations of the method 2300 may be implemented by a network entity or its components as described herein. For example, the operations of the method 2300 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 2305, the method may include generating a set of multiple MAC SDUs, where each MAC SDU of the set of multiple MAC SDUs is associated with a respective application-layer packet. The operations of block 2305 may be performed in accordance with examples as disclosed herein. In some aspects, aspects of the operations of 2305 may be performed by a MAC SDU component 1160 as described with reference to FIG. 11.

At 2310, the method may include encoding the set of multiple MAC SDUs with an outer code to generate an outer-encoded MAC PDU. The operations of block 2310 may be performed in accordance with examples as disclosed herein. In some aspects, aspects of the operations of 2310 may be performed by an outer coding component 1150 as described with reference to FIG. 11.

At 2315, the method may include segmenting the outer-encoded MAC PDU into a set of multiple TBs. The operations of block 2315 may be performed in accordance with examples as disclosed herein. In some aspects, aspects of the operations of 2315 may be performed by a TB mapping component 1155 as described with reference to FIG. 11.

At 2320, the method may include broadcasting the set of multiple TBs, where each TB of the set of multiple TBs is broadcast via a respective slot. The operations of block 2320 may be performed in accordance with examples as disclosed herein. In some aspects, aspects of the operations of 2320 may be performed by a broadcast component 1125 as described with reference to FIG. 11.

FIG. 24 shows a flowchart illustrating a method 2400 that supports enhanced outer coding for broadcast communications in accordance with aspects of the present disclosure. The operations of the method 2400 may be implemented by a network entity or its components as described herein. For example, the operations of the method 2400 may be performed by a network entity as described with reference to FIGS. 1 through 12. In some aspects, a network entity may execute a set of instructions to control the functional elements of the network entity to perform the described functions. Additionally, or alternatively, the network entity may perform aspects of the described functions using special-purpose hardware.

At 2405, the method may include generating a set of multiple MAC SDUs, where each MAC SDU of the set of multiple MAC SDUs is associated with a respective application-layer packet. The operations of block 2405 may be performed in accordance with examples as disclosed herein. In some aspects, aspects of the operations of 2405 may be performed by a MAC SDU component 1160 as described with reference to FIG. 11.

At 2410, the method may include encoding the set of multiple MAC SDUs with an outer code to generate an outer-encoded MAC PDU. The operations of block 2410 may be performed in accordance with examples as disclosed herein. In some aspects, aspects of the operations of 2410 may be performed by an outer coding component 1150 as described with reference to FIG. 11.

At 2415, the method may include segmenting the outer-encoded MAC PDU into a set of multiple TBs. The operations of block 2415 may be performed in accordance with examples as disclosed herein. In some aspects, aspects of the operations of 2415 may be performed by a TB mapping component 1155 as described with reference to FIG. 11.

At 2420, the method may include broadcasting control information that indicates the set of multiple TBs include respective segments of the outer-encoded MAC PDU. The operations of block 2420 may be performed in accordance with examples as disclosed herein. In some aspects, aspects of the operations of 2420 may be performed by a broadcast scheduling component 1145 as described with reference to FIG. 11.

At 2425, the method may include broadcasting the set of multiple TBs, where each TB of the set of multiple TBs is broadcast via a respective slot. The operations of block 2425 may be performed in accordance with examples as disclosed herein. In some aspects, aspects of the operations of 2425 may be performed by a broadcast component 1125 as described with reference to FIG. 11.

The following provides an overview of aspects of the present disclosure:

Aspect 1: A method for wireless communication at a network entity, comprising: receiving, at a physical layer of the network entity, a plurality of TBs during one or more slots, wherein a quantity of TBs received during at least a first slot of the one or more slots is greater than one; obtaining, at a MAC layer of the network entity, a plurality of MAC PDUs from the plurality of TBs, wherein each TB of the plurality of TBs corresponds to a respective MAC PDU of the plurality of MAC PDUs; obtaining, at an application layer of the network entity, outer-encoded application-layer packets, wherein each MAC PDU of the plurality of MAC PDUs is associated with a respective outer-encoded application-layer packet of the outer-encoded application-layer packets; and decoding the outer-encoded application-layer packets to obtain a plurality of application-layer packets.

Aspect 2: The method of aspect 1, wherein obtaining the plurality of MAC PDUs comprises: communicating, from the physical layer of the network entity to the MAC layer of the network entity, each TB of the plurality of TBs.

Aspect 3: The method of any of aspects 1 through 2, wherein each TB of the plurality of TBs corresponds to one or more respective codeblock.

Aspect 4: The method of any of aspects 1 through 3, wherein respective codeblocks of each TB of the quantity of TBs are received via the first slot in a sequential order.

Aspect 5: The method of any of aspects 1 through 4, further comprising: receiving a scheduling grant that indicates the first slot is for a reception of the quantity of TBs.

Aspect 6: The method of aspect 5, wherein each TB of the quantity of TBs received via the first slot are rate matched based at least in part on a total quantity of codeblocks mapped to the first slot.

Aspect 7: The method of any of aspects 5 through 6, wherein codeblocks of each TB of the quantity of TBs received via the first slot are concatenated based on a sequential order of the quantity of TBs.

Aspect 8: The method of any of aspects 5 through 7, wherein to receive the scheduling grant, the network entity is configured to receive the scheduling grant via control signaling, the control signaling is a DCI message or a MSI message, and the quantity of TBs is received via a PDSCH or a PMCH.

Aspect 9: The method of any of aspects 1 through 8, wherein each MAC PDU of the plurality of MAC PDUs comprises a plurality of headers, each header of the plurality of headers being associated with a respective layer of a plurality of layers that includes a MAC layer and other layers above the MAC layer; and one or more headers of the plurality of headers for each MAC PDU of the plurality of MAC PDUs are compressed.

Aspect 10: The method of any of aspects 1 through 9, wherein the outer-encoded application-layer packets collectively comprise the plurality of application-layer packets and one or more parity application-layer packets.

Aspect 11: A method for wireless communication at a network entity, comprising: receiving, at a physical layer of the network entity and via one or more slots, one or more TBs, at least a first TB of the one or more TBs comprising one or more MAC PDUs, the one or more TBs collectively comprising a plurality of MAC PDUs; obtaining, at a MAC layer of the network entity, the plurality of MAC PDUs from the one or more TBs; obtaining, at an application layer of the network entity, outer-encoded application-layer packets, wherein the plurality of MAC PDUs are associated with the outer-encoded application-layer packets; and decoding the outer-encoded application-layer packets to obtain a plurality of application-layer packets.

Aspect 12: The method of aspect 11, wherein obtaining the plurality of MAC PDUs comprises: communicating, from the physical layer of the network entity to the MAC layer of the network entity, information associated with at least one codeblock of each of the one or more TBs.

Aspect 13: The method of any of aspects 11 through 12, wherein each application-layer packet of the plurality of application-layer packets corresponds to one or more codeblocks of a TB among the one or more TBs.

Aspect 14: The method of any of aspects 11 through 13, wherein each MAC PDU of the plurality of MAC PDUs comprises a plurality of headers, each header of the plurality of headers being associated with a respective layer of a plurality of layers; and one or more headers of the plurality of headers for each MAC PDU of the plurality of MAC PDUs are compressed.

Aspect 15: The method of any of aspects 11 through 14, wherein the outer-encoded application-layer packets collectively comprise the plurality of application-layer packets and one or more parity application-layer packets.

Aspect 16: A method for wireless communication at a network entity, comprising: receiving control information that indicates resources for a plurality of TBs that comprise respective portions of an outer-encoded MAC PDU; receiving, based on the control information, the outer-encoded MAC PDU; decoding the outer-encoded MAC PDU to obtain a plurality of MAC SDUs comprising the outer-encoded MAC PDU, wherein each MAC SDU of the plurality of MAC SDUs is associated with a respective application-layer packet; and obtaining the respective application-layer packet associated with each MAC SDU of the plurality of MAC SDUs based on the obtainment of the plurality of MAC SDUs.

Aspect 17: The method of aspect 16, further comprising: generating a decoding message for the plurality of MAC SDUs based on whether each MAC SDU of the plurality of MAC SDUs was successfully decoded.

Aspect 18: The method of aspect 17, wherein the decoding message is a success message indicative that each MAC SDU of the plurality of MAC SDUs was successfully decoded.

Aspect 19: The method of any of aspects 17 through 18, wherein the decoding message is a failure message indicative that one or more MAC SDUs of the plurality of MAC SDUs were unsuccessfully decoded.

Aspect 20: The method of any of aspects 16 through 19, wherein the control information further indicates at least one of respective indices of the plurality of TBs, an indication of an outer code used for the outer-encoded MAC PDU, or a coding rate of the outer code.

Aspect 21: The method of aspect 20, wherein the outer code comprises one of a Raptor code, a RaptorQ code, or a modified XOR code.

Aspect 22: The method of any of aspects 20 through 21, wherein the outer code is a supplemental ECC.

Aspect 23: The method of any of aspects 16 through 22, wherein receiving the control information comprises: receiving one or more repetitions of the control information.

Aspect 24: The method of any of aspects 16 through 23, wherein a modulation and coding scheme used for the control information is associated with a lower useful transmitted bit-to-total transmitted bit ratio than a second modulation and coding scheme used for a second control information that is not associated with the outer-encoded MAC PDU.

Aspect 25: The method of any of aspects 16 through 24, wherein the control information is MSI.

Aspect 26: The method of any of aspects 16 through 25, wherein the outer-encoded MAC PDU comprises a concatenation of the plurality of MAC SDUs that is appended with a plurality of parity bits.

Aspect 27: The method of any of aspects 16 through 26, wherein a quantity of bits of the outer-encoded MAC PDU is based on a quantity of the plurality of TBs, a quantity of a plurality of codeblocks in a TB, and a quantity of a plurality of parity bits.

Aspect 28: The method of aspect 27, wherein the quantity of the plurality of parity bits is an integer multiple of a quantity of bits of a codeblock.

Aspect 29: A method for wireless communication at a network entity, comprising: encoding, at an application layer of the network entity, a plurality of application-layer packets with an application level outer code to generate outer-encoded application-layer packets; generating, at a MAC layer of the network entity, a plurality of MAC PDUs, wherein each MAC PDU of the plurality of MAC PDUs is associated with a respective outer-encoded application-layer packet of the outer-encoded application-layer packets; mapping, at a physical layer of the network entity, each MAC PDU of the plurality of MAC PDUs to a respective TB of a plurality of TBs; and broadcasting the plurality of TBs during one or more slots, wherein a quantity of TBs broadcast during at least a first slot of the one or more slots is greater than one.

Aspect 30: The method of aspect 29, wherein each MAC PDU of the plurality of MAC PDUs corresponds to a one or more respective codeblocks.

Aspect 31: The method of aspect 30, further comprising: performing, on a slot-by-slot basis, rate matching across TBs mapped to a slot of the one or more slots, wherein the rate matching across the TBs is based on a total quantity of codeblocks mapped to the slot.

Aspect 32: The method of any of aspects 30 through 31, further comprising: concatenating, based on a sequential order of the plurality of TBs, each codeblock within a slot of the one or more slots in preparation for broadcast of the plurality of TBs.

Aspect 33: The method of any of aspects 29 through 32, further comprising: broadcasting a scheduling grant that indicates the first slot is for the broadcast of the quantity of TBs.

Aspect 34: The method of aspect 33, wherein to broadcast the scheduling grant, the network entity is configured to broadcast the scheduling grant via control signaling, the control signaling is a DCI message or a MSI message, and the quantity of TBs is broadcast via a PDSCH or a PMCH.

Aspect 35: The method of any of aspects 29 through 34, wherein each MAC PDU of the plurality of MAC PDUs comprises a plurality of headers and each header of the plurality of headers is associated with a respective layer of a plurality of layers that includes the MAC layer and other layers above the MAC layer, and the network entity is further configured to: compress one or more headers for each MAC PDU of the plurality of MAC PDUs.

Aspect 36: The method of any of aspects 29 through 35, wherein the outer-encoded application-layer packets collectively comprise the plurality of application-layer packets and one or more parity application-layer packets.

Aspect 37: The method of any of aspects 29 through 36, wherein the application level outer code is a supplemental ECC.

Aspect 38: A method for wireless communication at a network entity, comprising: encoding, at an application layer of the network entity, a plurality of application-layer packets with an application level outer code to generate outer-encoded application-layer packets; generating, at a MAC layer of the network entity, a plurality of MAC PDUs, wherein the plurality of MAC PDUs are associated with the outer-encoded application-layer packets; mapping, at a physical layer of the network entity, one or more MAC PDUs of the plurality of MAC PDUs to a TB of one or more TBs; and broadcasting the one or more TBs, wherein each TB of the one or more TBs is broadcast via a respective slot.

Aspect 39: The method of aspect 38, wherein each application layer packet of the plurality of application-layer packets corresponds to one or more codeblocks of a single TB among the one or more TBs.

Aspect 40: The method of any of aspects 38 through 39, further comprising: broadcasting a scheduling grant that indicates a first slot for the broadcast of the TB.

Aspect 41: The method of aspect 40, wherein to broadcast the scheduling grant, the network entity is configured to broadcast the scheduling grant via control signaling, the control signaling is a DCI message or a MSI message, and the TB is broadcast via a PDSCH or a PMCH.

Aspect 42: The method of any of aspects 38 through 41, wherein each MAC PDU of the plurality of MAC PDUs comprises a plurality of headers and each header of the plurality of headers is associated with a respective layer of a plurality of layers that includes the MAC layer and other layers above the MAC layer, and the network entity is further configured to: compress one or more headers for each MAC PDU of the plurality of MAC PDUs.

Aspect 43: The method of any of aspects 38 through 42, wherein the outer-encoded application-layer packets collectively comprise the plurality of application-layer packets and one or more parity application-layer packets.

Aspect 44: The method of any of aspects 38 through 43, wherein the application level outer code is a supplemental ECC.

Aspect 45: A method for wireless communication at a network entity, comprising: generating a plurality of MAC SDUs, wherein each MAC SDU of the plurality of MAC SDUs is associated with a respective application-layer packet; encoding the plurality of MAC SDUs with an outer code to generate an outer-encoded MAC PDU; segmenting the outer-encoded MAC PDU into a plurality of TBs; and broadcasting the plurality of TBs, wherein each TB of the plurality of TBs is broadcast via a respective slot.

Aspect 46: The method of aspect 45, further comprising: broadcasting control information that indicates the plurality of TBs comprise respective segments of the outer-encoded MAC PDU.

Aspect 47: The method of aspect 46, wherein the control information is MSI and further indicates respective indices of the plurality of TBs, an indication of the outer code, or a coding rate of the outer code.

Aspect 48: The method of any of aspects 46 through 47, wherein broadcasting the control information comprises: broadcasting one or more repetitions of the control information.

Aspect 49: The method of any of aspects 46 through 48, wherein a modulation and coding scheme used for the control information is associated with a lower useful transmitted bit-to-total transmitted bit ratio than a second modulation and coding scheme used for a second control information that is not associated with the outer-encoded MAC PDU.

Aspect 50: The method of any of aspects 45 through 49, wherein encoding the plurality of MAC SDUs with the outer code comprises: concatenating the plurality of MAC SDUs to generate a concatenated MAC SDU; encoding the concatenated MAC SDU with the outer code to generate a plurality of parity bits; and appending the concatenated MAC SDU with the plurality of parity bits to generate the outer-encoded MAC PDU, wherein the outer-encoded MAC PDU comprises the concatenated MAC SDU and the plurality of parity bits.

Aspect 51: The method of any of aspects 45 through 50, wherein the outer code comprises one of a Raptor code, a RaptorQ code, or a modified XOR code.

Aspect 52: The method of any of aspects 45 through 51, wherein the outer code is a supplemental ECC.

Aspect 53: The method of any of aspects 45 through 52, wherein a quantity of bits of the outer-encoded MAC PDU is based on a quantity of the plurality of TBs, a quantity of a plurality of codeblocks in a TB, and a quantity of a plurality of parity bits.

Aspect 54: A network entity for wireless communication, comprising a processing system configured to perform a method of any of aspects 1 through 10.

Aspect 55: A network entity for wireless communication, comprising at least one means for performing a method of any of aspects 1 through 10.

Aspect 56: A non-transitory computer-readable medium storing code for wireless communication, the code comprising instructions executable by a processor to perform a method of any of aspects 1 through 10.

Aspect 57: A network entity for wireless communication, comprising a processing system configured to perform a method of any of aspects 11 through 15.

Aspect 58: A network entity for wireless communication, comprising at least one means for performing a method of any of aspects 11 through 15.

Aspect 59: A non-transitory computer-readable medium storing code for wireless communication, the code comprising instructions executable by a processor to perform a method of any of aspects 11 through 15.

Aspect 60: A network entity for wireless communication, comprising a processing system configured to perform a method of any of aspects 16 through 28.

Aspect 61: A network entity for wireless communication, comprising at least one means for performing a method of any of aspects 16 through 28.

Aspect 62: A non-transitory computer-readable medium storing code for wireless communication, the code comprising instructions executable by a processor to perform a method of any of aspects 16 through 28.

Aspect 63: A network entity for wireless communication, comprising a processing system configured to perform a method of any of aspects 29 through 37.

Aspect 64: A network entity for wireless communication, comprising at least one means for performing a method of any of aspects 29 through 37.

Aspect 65: A non-transitory computer-readable medium storing code for wireless communication, the code comprising instructions executable by a processor to perform a method of any of aspects 29 through 37.

Aspect 66: A network entity for wireless communication, comprising a processing system configured to perform a method of any of aspects 38 through 44.

Aspect 67: A network entity for wireless communication, comprising at least one means for performing a method of any of aspects 38 through 44.

Aspect 68: A non-transitory computer-readable medium storing code for wireless communication, the code comprising instructions executable by a processor to perform a method of any of aspects 38 through 44.

Aspect 69: A network entity for wireless communication, comprising a processing system configured to perform a method of any of aspects 45 through 53.

Aspect 70: A network entity for wireless communication, comprising at least one means for performing a method of any of aspects 45 through 53.

Aspect 71: A non-transitory computer-readable medium storing code for wireless communication, the code comprising instructions executable by a processor to perform a method of any of aspects 45 through 53.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other aspects and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the aspects that may be implemented or that are within the scope of the claims. The term "aspect" or "example" used herein means "serving as an aspect, example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described aspects.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the aspects and designs described herein but is to be accorded the broadest scope consistent with the principles and novel features disclosed herein.

What is claimed is:

1. A network entity for wireless communication, comprising:
   a processing system configured to:
      receive a scheduling grant that indicates a first slot of one or more slots is for a reception of a quantity of transport blocks of a plurality of transport blocks, wherein the quantity of transport blocks is greater than one;
      receive, at a physical layer of the network entity, the plurality of transport blocks via the one or more slots, wherein the quantity of transport blocks received via at least the first slot of the one or more slots is greater than one in accordance with the scheduling grant;
      obtain, at a medium access control (MAC) layer of the network entity, a plurality of MAC packet data units (PDUs) from the plurality of transport blocks, wherein each transport block of the plurality of transport blocks corresponds to a respective MAC PDU of the plurality of MAC PDUs;
      obtain, at an application layer of the network entity, outer-encoded application-layer packets, wherein each MAC PDU of the plurality of MAC PDUs is associated with a respective outer-encoded application-layer packet of the outer-encoded application-layer packets; and
      decode the outer-encoded application-layer packets to obtain a plurality of application-layer packets.

2. The network entity of claim 1, wherein, to obtain the plurality of MAC PDUs, the network entity is configured to:
   communicate, from the physical layer of the network entity to the MAC layer of the network entity, each transport block of the plurality of transport blocks.

3. The network entity of claim 1, wherein each transport block of the plurality of transport blocks corresponds to one or more respective codeblock.

4. The network entity of claim 1, wherein respective codeblocks of each transport block of the quantity of transport blocks are received via the first slot in a sequential order.

5. The network entity of claim 1, wherein each transport block of the quantity of transport blocks received via the first slot are rate matched based on a total quantity of codeblocks mapped to the first slot.

6. The network entity of claim 1, wherein codeblocks of each transport block of the quantity of transport blocks received via the first slot are concatenated based on a sequential order of the quantity of transport blocks.

7. The network entity of claim 1, wherein, to receive the scheduling grant, the network entity is configured to receive the scheduling grant via control signaling, wherein the control signaling is a downlink control information (DCI) message or a multicast scheduling information (MSI) message, and wherein the quantity of transport blocks is received via a physical downlink shared channel (PDSCH) or a physical multicast channel (PMCH).

8. The network entity of claim 1, wherein:

each MAC PDU of the plurality of MAC PDUs comprises a plurality of headers;

each header of the plurality of headers is associated with a respective layer of a plurality of layers that includes a MAC layer and other layers above the MAC layer; and one or more headers of the plurality of headers for each MAC PDU of the plurality of MAC PDUs are compressed.

9. The network entity of claim 1, wherein the outer-encoded application-layer packets collectively comprise the plurality of application-layer packets and one or more parity application-layer packets.

10. A network entity for wireless communication, comprising:

a processing system configured to:

receive a scheduling grant that indicates a first slot of one or more slots is for a reception of a first transport block of one or more transport blocks;

receive, at a physical layer of the network entity and via the one or more slots, the one or more transport blocks, wherein at least the first transport block of the one or more transport blocks is received via the first slot and comprises one or more medium access control (MAC) packet data units (PDUs), and wherein the one or more transport blocks collectively comprise a plurality of MAC PDUs;

obtain, at a MAC layer of the network entity, the plurality of MAC PDUs from the one or more transport blocks;

obtain, at an application layer of the network entity, outer-encoded application-layer packets, wherein the plurality of MAC PDUs are associated with the outer-encoded application-layer packets; and decode the outer-encoded application-layer packets to obtain a plurality of application-layer packets.

11. The network entity of claim 10, wherein, to obtain the plurality of MAC PDUs, the network entity is configured to:

communicate, from the physical layer of the network entity to the MAC layer of the network entity, information associated with at least one codeblock of each of the one or more transport blocks.

12. The network entity of claim 10, wherein each application-layer packet of the plurality of application-layer packets corresponds to one or more codeblocks of a transport block among the one or more transport blocks.

13. The network entity of claim 10, wherein:

each MAC PDU of the plurality of MAC PDUs comprises a plurality of headers;

each header of the plurality of headers is associated with a respective layer of a plurality of layers that includes the MAC layer and other layers above the MAC layer; and one or more headers of the plurality of headers for each MAC PDU of the plurality of MAC PDUs are compressed.

14. The network entity of claim 10, wherein the outer-encoded application-layer packets collectively comprise the plurality of application-layer packets and one or more parity application-layer packets.

15. A network entity for wireless communication, comprising:

a processing system configured to:

receive control information that indicates resources for a plurality of transport blocks that comprise respective portions of an outer-encoded medium access control (MAC) packet data unit (PDU), wherein the control information further indicates an outer code used for the outer-encoded MAC PDU, and wherein the outer code comprises one of a Raptor code, a RaptorQ code, or a modified XOR code;

receive, based on the control information, the outer-encoded MAC PDU;

decode the outer-encoded MAC PDU to obtain a plurality of MAC Service Data Units (SDUs) that comprise the outer-encoded MAC PDU, wherein each MAC SDU of the plurality of MAC SDUs is associated with a respective application-layer packet; and obtain the respective application-layer packet associated with each MAC SDU of the plurality of MAC SDUs based on the obtainment of the plurality of MAC SDUs.

16. The network entity of claim 15, wherein the network entity is further configured to:

generate a decoding message for the plurality of MAC SDUs based on whether each MAC SDU of the plurality of MAC SDUs was successfully decoded.

17. The network entity of claim 16, wherein the decoding message is a success message indicative that each MAC SDU of the plurality of MAC SDUs was successfully decoded.

18. The network entity of claim 16, wherein the decoding message is a failure message indicative that one or more MAC SDUs of the plurality of MAC SDUs were unsuccessfully decoded.

19. The network entity of claim 15, wherein:

the control information further indicates at least one of respective indices of the plurality of transport blocks, or a coding rate of the outer code.

20. The network entity of claim 19, wherein the outer code is a supplemental error correction code.

21. The network entity of claim 15, wherein, to receive the control information, the network entity is configured to:

receive one or more repetitions of the control information.

22. The network entity of claim 15, wherein a modulation and coding scheme used for the control information is associated with a lower useful transmitted bit-to-total transmitted bit ratio than a second modulation and coding scheme used for a second control information that is not associated with the outer-encoded MAC PDU.

23. The network entity of claim 15, wherein the control information is multicast scheduling information.

24. The network entity of claim 15, wherein the outer-encoded MAC PDU comprises a concatenation of the plurality of MAC SDUs that is appended with a plurality of parity bits.

25. The network entity of claim 15, wherein a quantity of bits of the outer-encoded MAC PDU is based on a quantity of the plurality of transport blocks, a quantity of a plurality of codeblocks in a transport block, and a quantity of a plurality of parity bits.

26. The network entity of claim 25, wherein the quantity of the plurality of parity bits is an integer multiple of a quantity of bits of a codeblock.

27. A network entity for wireless communication, comprising:

a processing system configured to:

encode, at an application layer of the network entity, a plurality of application-layer packets with an application level outer code to generate outer-encoded application-layer packets;

generate, at a medium access control (MAC) layer of the network entity, a plurality of MAC packet data units (PDUs), wherein each MAC PDU of the plurality of MAC PDUs is associated with a respective outer-encoded application-layer packet of the outer-encoded application-layer packets;

map, at a physical layer of the network entity, each MAC PDU of the plurality of MAC PDUs to a respective transport block of a plurality of transport blocks;

broadcast a scheduling grant that indicates a first slot of one or more slots is for a broadcast of a quantity of transport blocks of the plurality of transport blocks, wherein the quantity of transport blocks is greater than one; and broadcast the plurality of transport blocks via the one or more slots, wherein the quantity of transport blocks broadcast via at least the first slot of the one or more slots is greater than one in accordance with the scheduling grant.

28. The network entity of claim 27, wherein each MAC PDU of the plurality of MAC PDUs corresponds to a one or more respective codeblocks.

* * * * *